US012646428B2

(12) United States Patent
Povilaitis

(10) Patent No.: US 12,646,428 B2
(45) Date of Patent: Jun. 2, 2026

(54) MOUNTING BRACKET AND SYSTEM FOR HANGING A BANNER

(71) Applicant: Darius A. Povilaitis, Chicago, IL (US)

(72) Inventor: Darius A. Povilaitis, Chicago, IL (US)

(73) Assignee: ALPINA MANUFACTURING LLC, Chicago, IL (US)

( * ) Notice: Subject to any disclaimer, the term of this patent is extended or adjusted under 35 U.S.C. 154(b) by 0 days.

(21) Appl. No.: 18/637,506

(22) Filed: Apr. 17, 2024

(65) Prior Publication Data

US 2024/0363038 A1 Oct. 31, 2024

Related U.S. Application Data

(60) Provisional application No. 63/542,647, filed on Oct. 5, 2023, provisional application No. 63/499,173, filed on Apr. 28, 2023.

(51) Int. Cl.
*G09F 17/00* (2006.01)

(52) U.S. Cl.
CPC ...... *G09F 17/00* (2013.01); *G09F 2017/0041* (2013.01)

(58) Field of Classification Search
CPC . G09F 17/00; G09F 2017/0041; F16M 11/00; F16M 11/06; F16M 13/00; F16M 13/022
See application file for complete search history.

(56) References Cited

U.S. PATENT DOCUMENTS

| | | | | |
|---|---|---|---|---|
| 3,272,463 A * | 9/1966 | Greig | H01B 17/16 | |
| | | | 248/65 | |
| 3,393,777 A * | 7/1968 | Sacchini | F16B 1/04 | |
| | | | 192/223.4 | |
| 3,850,401 A | 11/1974 | Snediker | | |
| 4,005,341 A * | 1/1977 | Uptegraff, Jr. | H01F 27/02 | |
| | | | 361/37 | |
| 4,880,195 A | 11/1989 | Lepley | | |

(Continued)

FOREIGN PATENT DOCUMENTS

| | | | |
|---|---|---|---|
| FR | 2780194 | A1 | 12/1999 |
| WO | WO-2006065865 | A2 | 6/2006 |
| WO | WO-2019099369 | A2 | 5/2019 |

OTHER PUBLICATIONS

Concentric springs (Year: 2022).*
International Application No. PCT/US2024/024836, International Search Report and Written Opinion, mailed Jul. 24, 2024.

*Primary Examiner* — Monica E Millner
(74) *Attorney, Agent, or Firm* — MARSHALL, GERSTEIN & BORUN LLP; Michael P. Furmanek

(57) ABSTRACT

A mounting bracket for hanging a banner includes a pole holder configured to secure a banner pole and a pivot base pivotably connected to the pole holder. The pole holder is configured to rotate only around a single axis and is biased to a predetermined rotational position around the single axis. The pole holder is configured to hold a banner pole a few degrees from 90 degrees from the longitudinal axis of the mounting bracket. At least two springs are used to bias the pole holder toward a predetermined location on the mounting bracket. A spacer may be used with the springs to prevent over-stretching and fatigue of the springs. A bolt used to connect the components of the mounting bracket may be "T" shaped at one end.

20 Claims, 45 Drawing Sheets

(56) References Cited

U.S. PATENT DOCUMENTS

| | | | | | |
|---|---|---|---|---|---|
| 4,926,987 | A * | 5/1990 | Honma | F16D 49/02 192/223.4 |
| 5,388,794 | A | 2/1995 | Wolff | |
| 5,463,973 | A | 11/1995 | Tait | |
| 5,702,081 | A * | 12/1997 | Gallemore, II | G09F 7/18 248/219.4 |
| 6,378,820 | B1 * | 4/2002 | Mooney | G09F 17/00 40/604 |
| 6,565,052 | B1 | 5/2003 | Doublet | |
| 6,575,652 | B2 | 6/2003 | Krauss | |
| 7,234,685 | B2 | 6/2007 | Britten | |
| 7,264,219 | B2 | 9/2007 | Kicher et al. | |
| 7,451,720 | B2 | 11/2008 | Somers | |
| 7,810,265 | B2 | 10/2010 | Beatty | |
| 8,109,225 | B2 | 2/2012 | McCudden et al. | |
| 8,327,575 | B1 * | 12/2012 | Zalewski | A01K 97/10 248/538 |
| 8,732,999 | B1 | 5/2014 | Hughes | |
| 9,183,768 | B2 | 11/2015 | Maguire et al. | |
| 9,230,457 | B2 | 1/2016 | Lin | |
| 9,852,668 | B2 | 12/2017 | Peters | |
| 9,916,783 | B2 | 3/2018 | Ashworth et al. | |
| 10,297,177 | B1 | 5/2019 | Schwartz | |
| 10,410,553 | B2 | 9/2019 | Holyfield et al. | |
| 10,672,303 | B1 | 6/2020 | Armata | |
| 10,672,308 | B2 * | 6/2020 | Peters | F16B 2/005 |
| 10,679,529 | B1 | 6/2020 | Wicken et al. | |
| 10,885,816 | B2 | 1/2021 | Peters | |
| 11,176,852 | B2 | 11/2021 | Mosby | |
| 11,584,277 | B1 * | 2/2023 | Sosa | B60N 2/888 |
| 2003/0017038 | A1 * | 1/2003 | Harkcom | B60P 1/433 414/537 |
| 2007/0256275 | A1 * | 11/2007 | Winkler | E05F 3/104 16/53 |
| 2010/0018095 | A1 | 1/2010 | Molla | |
| 2012/0234990 | A1 | 9/2012 | Lewis | |
| 2013/0185969 | A1 | 7/2013 | Britten et al. | |
| 2013/0187018 | A1 | 7/2013 | Canfield et al. | |
| 2013/0200240 | A1 * | 8/2013 | Lindblad | F16M 13/022 248/372.1 |
| 2015/0075045 | A1 | 3/2015 | Wilkinson | |
| 2016/0210888 | A1 | 7/2016 | Hsu | |
| 2020/0273386 | A1 | 8/2020 | Kreider | |

* cited by examiner

MOUNTING BRACKET AND SYSTEM FOR HANGING A BANNER

CROSS-REFERENCE TO RELATED APPLICATIONS

Priority is claimed to U.S. Provisional Patent Application No. 63/499,173, filed Apr. 28, 2023, and U.S. Provisional Patent Application No. 63/542,647, filed Oct. 5, 2023, the entire contents of each of which are hereby incorporate by reference herein.

FIELD OF THE DISCLOSURE

The present disclosure generally relates to brackets and systems for hanging a banner and, more particularly, to brackets and systems for hanging a banner that limit movement of the banner pole holder to rotating only around a single axis and bias the banner pole holder to a predetermined rotational position.

BACKGROUND

Banners are routinely hung in outdoor environments for decorative and/or informative purposes. For example, some cities hang banners on their streetlight poles to celebrate a holiday, provide details about an upcoming event, or simply create a pleasing aesthetic. Businesses or homeowners may choose to mount a banner on a wall or from a porch for similar reasons. Most mounting systems for banners are static and not configured to move regardless of the forces exerted upon the banner. As a result, the existing mounting systems are typically unable to flex or rotate to deflect wind. Even when mounting systems are able to flex or rotate, the banner poles sometimes flex inward toward each other, causing the banner to assume a parachute shape that traps rather than deflects the wind. The result is that the wind routinely damages banners and/or mounting systems, causing expensive and time-consuming repairs or replacements.

SUMMARY

Examples within the scope of the present invention are directed to a mounting bracket for hanging a banner including a pole holder and a pivot base. The pole holder is configured to secure a banner pole. The pivot base is pivotably connected to the pole holder. The pivot base includes a direction limiting plate disposed adjacent to the pole holder and configured to limit movement of the pole holder to rotating only around a single axis. The pivot base also includes a biasing device disposed between the pivot base and the pole holder. The biasing device is configured to bias the pole holder to a predetermined rotational position around the single axis.

In an approach, the mounting bracket may include at least one stop coupled to the pivot base and configured to selectively engage and limit a range of rotation of the pole holder around the single axis, wherein the stop limits the range of rotation of the pole holder around the single axis to approximately 90 degrees. The range of rotation of the pole holder from the predetermined rotational position may be approximately 45 degrees in a first direction and approximately 45 degrees in a second direction.

In an approach, the mounting bracket may include a lock configured for placement through the pole holder and the banner pole to lock the banner pole in the pole holder.

In an approach, the pivot base may include a banner connection point for securing the banner to the pivot base to prevent the banner from slipping off the banner pole.

In an approach, the biasing device may include one or more springs. The biasing device may include a first spring offset from a first side of the pole holder and a second spring offset from a second side of the pole holder. A spring plate may couple the one or more springs and the pole holder. The biasing device may include a first spring and a second spring, and the spring plate may include an aperture through which the pole holder extends, a first end fastened to the first spring, and a second end fastened to the second spring.

In an approach, the pivot base may include a first torsion spring to bias the pole holder toward the predetermined rotational position in a first direction, and a second torsion spring to bias the hole holder toward the predetermined rotational position in a second direction. The pivot base may include a mast rod having a first rotational rod around which the first torsion spring is secured, a second rotational rod around which the second torsion spring is secured, and an extension to which the pole holder is connected.

Examples within the scope of the present invention are also directed to a mounting bracket for hanging a banner including a pole holder, a pivot base, a first spring, and a spring plate. The pole holder has a first end, a second end, a body extending between the first end and the second end along a longitudinal axis, a cavity within the body extending from the first end toward the second end along the longitudinal axis, and a bore extending across the longitudinal axis through the body between the cavity and the second end. The pivot base includes a base plate, a first wall extending outwardly from the base plate, a second wall extending outwardly from the base plate, and a pin pivotably connected to the first wall, extending through the bore of the pole holder, and pivotably connected to the second wall. The first spring is connected to the base plate and extends outwardly from the base plate. The spring plate is connected to the first spring and the pole holder.

In an approach, the pin may extend along a single axis, and the pole holder may be limited to rotating only around the single axis by the pin, the first wall, and the second wall.

In an approach, the mounting bracket may further include a second spring connected to the base plate and extending outwardly from the base plate, the second spring further connected to the spring plate. The first wall and the second wall may define a channel, first spring positioned across the channel from the second spring.

In an approach, the first wall and the second wall may define a channel, the pin may divide the channel into a first side and a second side, a first shaft may extend across the channel on the first side, and a second shaft may extend across the channel on the second side. The pin may extend along a single axis, and the first shaft and the second shaft may limit a range of rotation of the pole holder around the single axis to approximately 90 degrees.

In an approach, the base plate may include a plurality of mounting apertures, each mounting aperture having a width and a height that is greater than the width.

In an approach, the mounting bracket may further include a top flange plate secured adjacent the spring plate and having an outer edge extending beyond a perimeter of the spring plate, a bottom flange plate secured adjacent the base plate and having an outer edge extending beyond a perimeter of the base plate, and a sleeve securable to the outer edge of the top flange plate and the outer edge of the bottom flange plate.

In an approach, the pole holder may include a locking pathway to the cavity through the body. The pivot base may be connected by a chain to a locking bar configured for placement within the locking pathway, and an exterior clasp may be connected to a first end of the locking bar and selectively connectable to a second end of the locking bar.

In an approach, a D-ring may be mounted to an exterior surface of the base plate.

In an approach, the first spring may comprise a different material than the second spring.

In an approach, the pivot base may further include a fitting strap slot located between the central portion of the pivot base and a portion of the pivot base configured to contact a mounting surface when the pivot base is in use, the fitting strap slot configured to accept a fitting strap for use when adjusting a position of a banner mounting assembly along a mounting surface.

In an approach, the pivot base may include a curved underside and a slot, the pole holder may be slidably disposed within the slot by the biasing device, and the single axis may be a center of rotation of the curved underside.

In an approach, the direction limiting plate may be a first protrusion, and the pivot base may further include a second protrusion configured to limit movement of the pole holder to rotating only around the single axis.

In an approach, the pivot base may include sharp edges formed between one of a plurality of sides of the pivot base and a curved underside of the pivot base. The sharp edges may be configured to contact a mounting surface when the mounting bracket is in use. Each sharp edge may have an angle between the one of the plurality of sides of the pivot base and the curved underside that is less than or equal to 50 degrees.

In an approach, the biasing device may further include a securing screw. The pivot plate may be configured to accept a proximal end of the securing screw and the slot may be configured to allow a longer portion of the securing screw to pass through for connection to the pole holder.

In an approach, the biasing device may include first spring and a second spring, further wherein the first spring and the second spring are configured coaxially, with the first spring surrounding the second spring.

In an approach, the biasing device may further include a cylindrical spacer located interior to the second spring, the cylindrical spacer configured to limit compression of the first and second springs when the banner mounting assembly is in use.

In an approach, the pivot base may include a slot configured to accept a hook and loop strap.

In an approach, the pole holder may include an opening configured to accept a quick-release pin, the quick release pin connected to a lanyard and a ring.

In an approach, the ring is configured to accept a tie which passes through a grommet of a banner.

Examples within the scope of the present invention are also directed to a mounting bracket for hanging a banner including a pole holder, a mast rod, a pivot base, a first torsion spring, and a second torsion spring. The pole holder has a first end, a second end, a body extending between the first end and the second end along a longitudinal axis, and a cavity within the body extending from the first end toward the second end along the longitudinal axis. The mast rod has an extension extending along the longitudinal axis and connected to the pole holder. The mast rod includes a first rotational rod and a second rotational rod. The pivot base includes a base plate, a first wall extending outwardly from the base plate and pivotably connected to the first rotational rod of the mast rod, and a second wall extending outwardly from the base plate and pivotably connected to the second rotational rod of the mast rod. The first torsion spring is secured around the first rotational rod of the mast rod. The first torsion spring includes a first hooked leg positioned around the extension of the mast rod and a first plate leg positioned against the base plate of the pivot base. The second torsion spring is secured around the second rotational rod of the mast rod, the second torsion spring includes a second hooked leg positioned around the extension of the mast rod and a second plate leg positioned against the base plate of the pivot base.

In an approach, the first rotational rod and the second rotational rod may extend along a single axis. The pole holder may be limited to rotating only around the single axis by the first rotational rod, the second rotational rod, the first wall, and the second wall.

In an approach, the first wall and the second wall may define a channel, and the first rotational rod and the second rotational rod may divide the channel into a first side and a second side. A first shaft may extend extending across the channel on the first side, and a second shaft may extend across the channel on the second side.

In an approach, the first rotational rod and the second rotational rod may extend along a single axis, and the first shaft and the second shaft may limit a range of rotation of the pole holder around the single axis to approximately 90 degrees.

Examples within the scope of the present invention are also directed to a mounting system for hanging a banner including an upper mounting plate, an upper mounting bracket, a lower mounting plate and a lower mounting bracket. The upper mounting plate includes an exterior surface and upper extension plates extending outwardly from the exterior surface. Each upper extension plate has an upper placement surface that is angled relative to the exterior surface such that a distance between a top of a respective upper placement surface and the exterior surface is less than a distance between a bottom of the respective upper placement surface and the exterior surface. The upper mounting bracket is mountable upon the upper mounting plate. The upper mounting bracket includes a pole holder, a pivot base to which the pole holder is rotatably mounted, and a spring operably connected to the pivot base and the pole holder. The lower mounting plate includes an exterior surface and lower extension plates extending outwardly from the exterior surface. Each lower extension plate has a lower placement surface that is angled relative to the exterior surface such that a distance between a top of a respective lower placement surface and the exterior surface is greater than a distance between a bottom of the respective lower placement surface and the exterior surface. A lower mounting bracket is mountable upon the lower mounting plate. The lower mounting bracket includes a pole holder, a pivot base to which the pole holder is rotatably mounted, and a spring operably connected to the pivot base and the pole holder.

In an approach, the pivot base of the upper mounting bracket may have a channel within which the pole holder is rotatably mounted by a pin and a spring plate connected to the spring and the pole holder. The pivot base of the lower mounting bracket may have a channel within which the pole holder is rotatably mounted by a pin and a spring plate connected to the spring and the pole holder.

In an approach, the upper mounting bracket may include a mast rod. The spring of the upper mounting bracket may be a first torsion spring, and the upper mounting bracket may further include a second torsion spring operably connected to the pivot base and the pole holder. The lower mounting bracket may further include a mast rod. The spring of the upper mounting bracket may be a first torsion spring, and the upper mounting bracket may further include a second torsion spring operably connected to the pivot base and the pole holder.

In an approach, the upper mounting plate may include a first pair of upper extension plates and a second pair of upper extension plates. A bolt and a retaining ring may be located between the first pair of upper extension plates. A bolt and a retaining ring may be located between the second pair of upper extension plates. The lower mounting plate may include a first pair of lower extension plates and a second pair of lower extension plates. A bolt and a retaining ring may be located between the first pair of lower extension plates. A bolt and a retaining ring may be located between the second pair of lower extension plates.

In an approach, the upper mounting plate and the lower mounting plate may each be mountable upon a structure having an outer surface, the upper extension plates configured such that each upper placement surface is positioned adjacent the outer surface when the upper mounting plate is mounted, and the lower extension plates configured such that each lower placement surface is positioned adjacent the outer surface when the lower mounting plate is mounted.

In an approach, the structure may be a pole having a cylindrical outer surface. The upper mounting plate may have a width bifurcated by a latitudinal axis, and a distance between an upper placement surface of a respective upper extension plate and the exterior surface of the upper mounting plate may increase as a distance between the respective upper extension plate and the latitudinal axis of the upper mounting plate increases. The lower mounting plate may have a width bifurcated by a latitudinal axis, and a distance between a lower placement surface of a respective lower extension plate and the exterior surface of the lower mounting plate may increase as a distance between the respective lower extension plate and the latitudinal axis of the lower mounting plate increases. The upper mounting strap may be configured to extend between the upper mounting plate and the upper mounting bracket and further configured to wrap around the pole. An upper hook and loop strap may be configured to extend through the channel of the pivot base of the upper mounting bracket and further configured to wrap around the pole. A lower mounting strap may be configured to extend between the lower mounting plate and the lower mounting bracket and further configured to wrap around the pole. A lower hook and loop strap may be configured to extend through the channel of the pivot base of the lower mounting bracket and further configured to wrap around the pole.

In an approach, the structure may be a wall having a flat outer surface. The upper mounting plate may have lateral flanges configured to be positioned adjacent the flat outer surface, each lateral flange of the upper mounting plate including a mounting hole. The lower mounting plate may have lateral flanges configured to be positioned adjacent the flat outer surface, each lateral flange of the lower mounting plate including a mounting hole.

Examples within the scope of the present invention are also directed to a banner mounting assembly including a pole holder, a pivot base, and a biasing device. The pole holder includes a pole holder support and an aperture. The pivot base includes a central portion positioned between a first protrusion and a second protrusion along a longitudinal axis of the pivot base. The central portion includes a slot positioned substantially perpendicular to the longitudinal axis. The central portion has an underside with a center of rotation at a single axis.

In an approach, the biasing device may include a securing screw. The securing screw may be positioned through the aperture of the pole holder and positioned within the slot of the pivot base to rotate around the single axis. Springs may be secured around the securing screw to bias the pole holder to a predetermined rotational position.

In an approach, the securing screw may have a T-shape including a short portion configured to move along the underside of the pivot base.

In an approach, the pole holder may further include a first opening configured to retain an end of a banner supporting pole, and a second opening configured to accept a quick-release pin. The quick-release pin may be configured to pass through an opening in the banner supporting pole and to be retained by a pivoting end of the quick-release pin.

In an approach, the quick-release pin comprises a ring connecting the quick-release pin and the lanyard. The ring may be configured to attach to a tie that attaches a banner to the ring.

In an approach, the pivot base may further include sharp edges formed between one of a plurality of sides of the pivot base and a curved underside of the pivot base. The sharp edges may be configured to contact a mounting surface when the banner mounting assembly is in use. Each sharp edge may have an angle between the one of the plurality of sides of the pivot base and the curved underside that is less than or equal to 50 degrees.

In an approach, the pole holder may be configured to be positioned over the center portion and constrained by the first protrusion and the second protrusion to ensure that the pole holder rotates only around the single axis.

In an approach, the spring assembly may include a first spring and a second spring, the first spring and second spring situated coaxially about the securing screw.

In an approach, the spring assembly may further include a cylindrical spacer, the cylindrical spacer positioned coaxially around the securing screw interior to the first and second springs.

BRIEF DESCRIPTION OF THE DRAWINGS

The above needs are at least partially met through provision of one, more than one, or any combination of the approaches for applicator systems for applying a cosmetic product described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various approaches, a mounting system for hanging a banner is provided that allows the banner to move to deflect wind without forming a parachute-shape that instead traps wind. The banner will assume a parachute-shape in response to wind when the banner poles at the top and bottom of the banner move inwardly toward one another. In that situation, because the banner is no longer tightly stretched between the two banner poles, the banner curves in on itself and traps air. The disclosed systems addresses this issue in two key ways. First, the disclosed systems provide mounting brackets that only allow the pole holder, and thus the banner poles, to rotate around a single axis, specifically an axis that is substantially vertical when the mounting bracket is mounted. As a result, the pole holders and banner poles can rotate substantially horizontally to deflect wind but cannot move vertically inward toward one another. Second, the mounting brackets are mounted on mounting plates that position the upper mounting bracket at an angle slightly above horizontal and the lower mounting bracket at an angle slightly below horizontal. As a result, the banner poles are deflected toward one another slightly when inserted into the banner and are slightly biased away from one another, which ensures that the banner stays tightly stretched between the banner poles. By virtue of these features, the disclosed systems are able to avoid damage from the wind, reducing the need for repairs and replacements.

Figure 1:
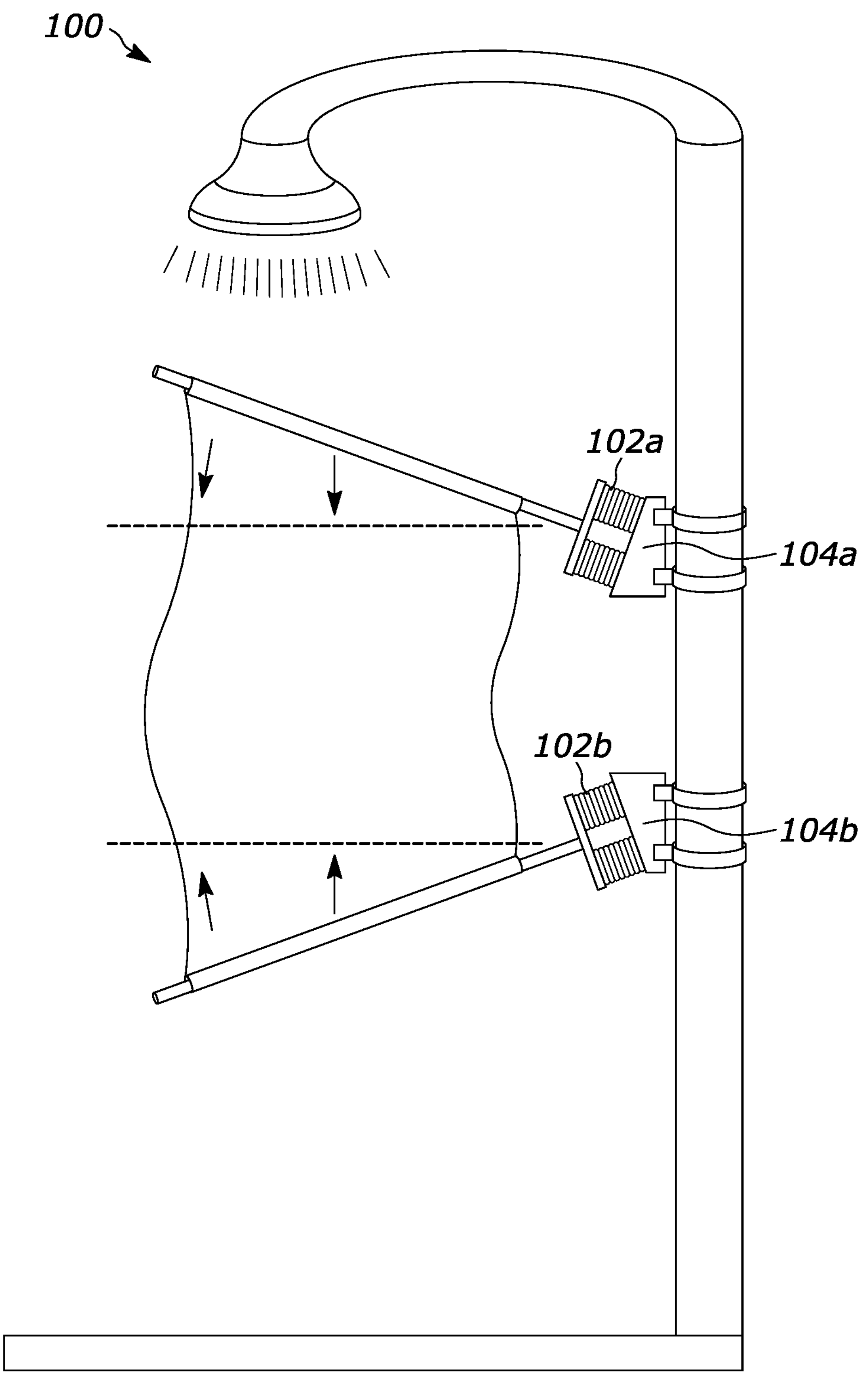
FIG. 1 illustrates a side view of a mounting system on a streetlight pole in accordance with various arrangements.

As shown in FIG. 1, the mounting system 100 can be mounted on a streetlight pole and includes an upper mounting bracket 102*a* mounted on an upper mounting plate 104*a* and a lower mounting bracket 102*b* mounted on a lower mounting plate 104*b*. As discussed in greater detail with respect to FIGS. 14-18 below, the upper mounting plate 104*a* positions the upper mounting bracket 102*a* at an angle such that a pole holder 106*a* of the upper mounting bracket 102*a* extends at an angle $\alpha$ above a horizontal axis H. The lower mounting plate 104*b* positions the lower mounting bracket 102*b* at an angle such that the pole holder 106*b* of the lower mounting bracket 102*b* extends at an angle $\beta$ below a horizontal axis H. When a banner is mounted on the mounting system 100, the slight outward biasing at angles $\alpha$ and $\beta$ of the banner poles ensures that the banner is stretched tightly and is unlikely to trap wind. The angles $\alpha$ and $\beta$ may be, for example, in a range between 1 and 5 degrees and, more specifically, between 3 and 4 degrees.

Figure 2:
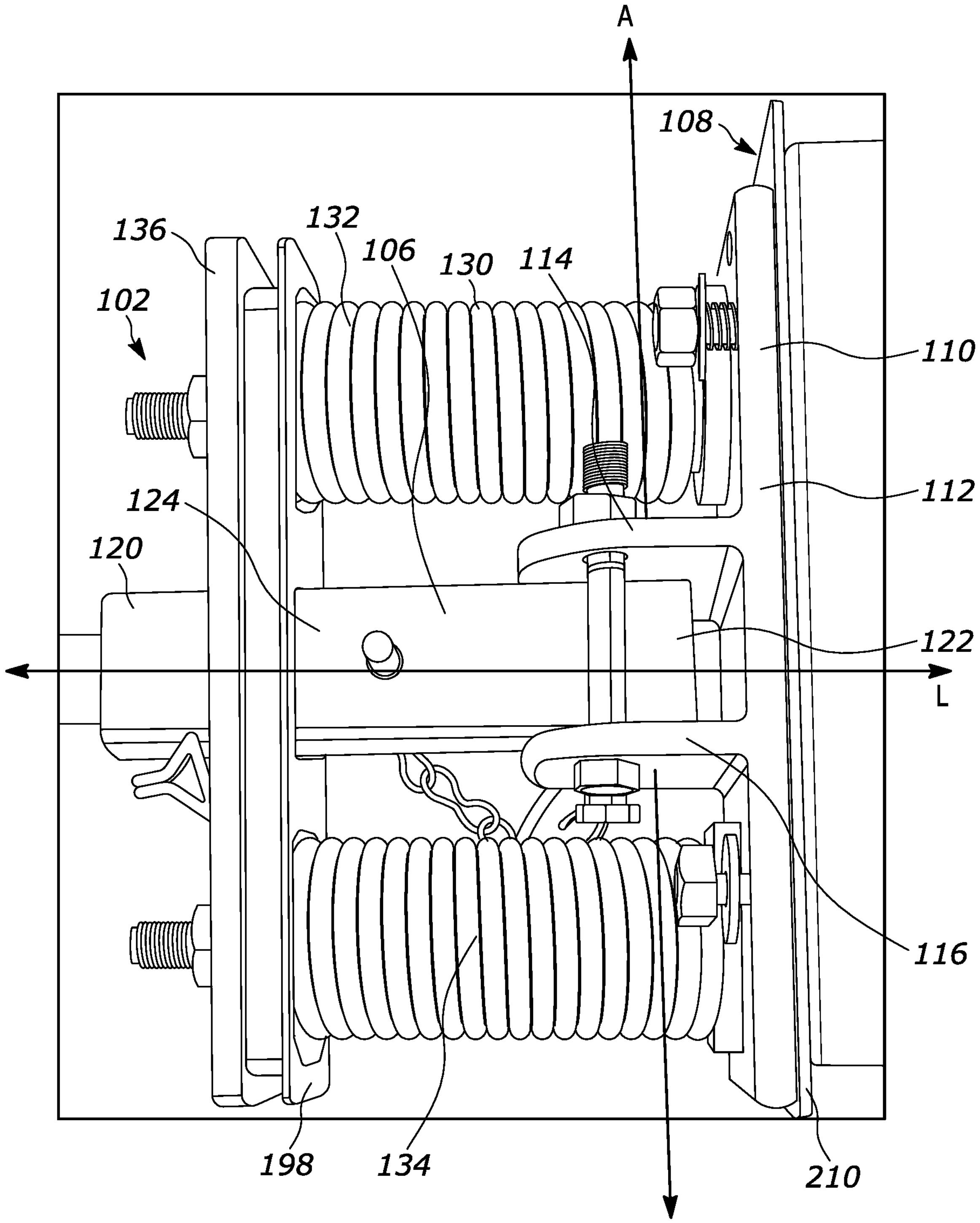
FIG. 2 illustrates a side view of a mounting bracket in accordance with various arrangements.

Turning to FIG. 2, a mounting bracket 102 (which could be used as upper mounting bracket 102*a* or lower mounting bracket 102*b* in mounting system 100) includes the pole holder 106 configured to secure a banner pole and a pivot base 108 pivotably connected to the pole holder 106. The pivot base 108 includes a direction limiting plate 110 disposed adjacent to the pole holder 106 and configured to limit movement of the pole holder 106 to rotating only around a single axis A. In some arrangements, the direction limiting plate 110 may be a base plate 112 having a first wall 114 and a second wall 116 extending outwardly from the base plate. A pin 118 (shown in FIG. 4) is pivotably connected to the first wall 114 and the second wall 116 along the single axis A. So configured, the pole holder 106 rotates about the single axis A and pin 118. In the disclosed version, the pole holder 106 is otherwise immovable, i.e., pin 118 and base plate 112, first wall 114, and second wall 116 of the direction limiting plate 110 restrict all other movement of the pole holder 106 relative thereto.

Figure 4:
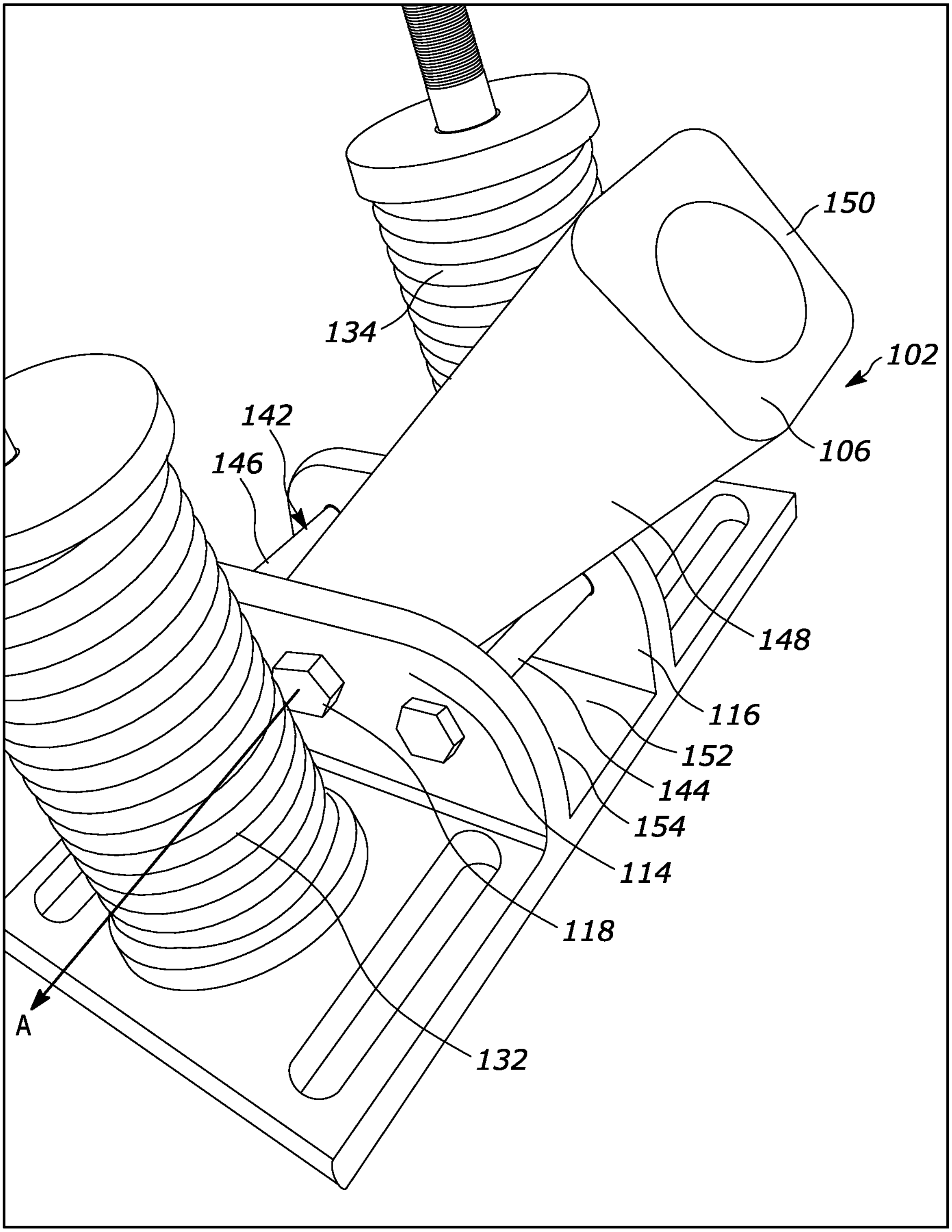
FIG. 4 illustrates a perspective view of the mounting bracket of FIGS. 2 and 3 in a partially assembled state.

As shown in FIG. 2, the pole holder 106 has a first end 120, a second end 122, a body 124 extending between the first end 120 and the second end 122 along a longitudinal axis L. A cavity 126 within the body 124 (shown in FIG. 6) extends from the first end 120 toward the second end 122 along the longitudinal axis L. A bore 128 (shown in FIG. 6) extends across the longitudinal axis A through the body 124 between the cavity 126 and the second end 122. The pin 118 extends through the bore 128 of the pole holder 106 (as shown in FIG. 4).

As shown in FIG. 2, a biasing device 130 is disposed between the pivot base 108 and the pole holder 106. The biasing device 130 is configured to bias the pole holder 106 to a predetermined rotational position around the single axis A. For example, the predetermined rotational position may be a central position in which the pole holder 106 is arranged substantially orthogonal to the pivot base 108. In the arrangement shown, the biasing device 130 includes a first spring 132 and a second spring 134, each connected to the base plate 112 and extending outwardly from the base plate 112. A spring plate 136 is connected to the first spring 132, the second spring 134, and the pole holder 106. In other arrangements, the biasing device 130 may include only a single spring or may include more than two springs. In other arrangements, the biasing device 130 may utilize other biasing techniques that may include us of, for example, a hydraulic mechanism, an elastic material, electronic controls, or the like.

Figure 3:
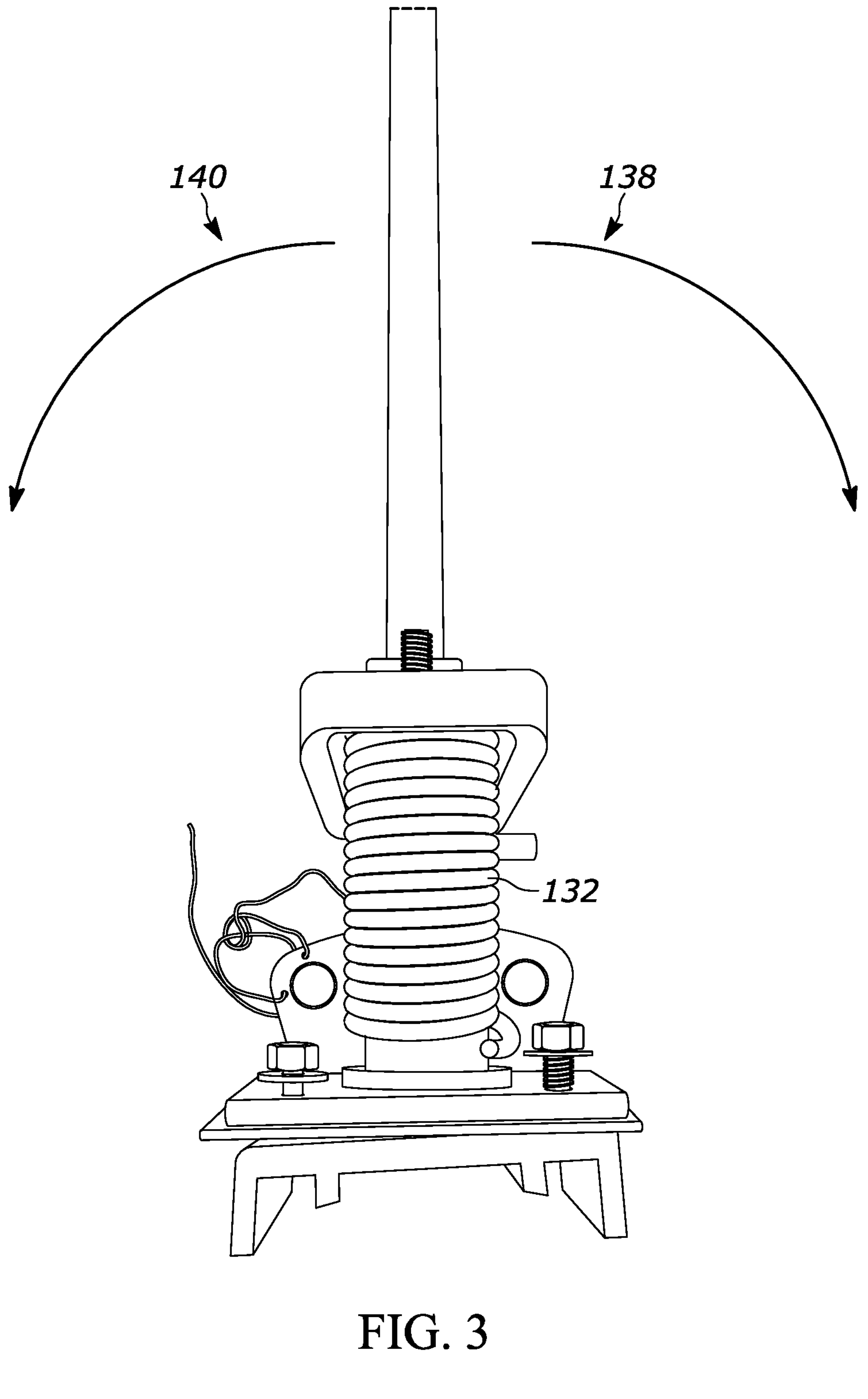
FIG. 3 illustrates a top view of the mounting bracket of FIG. 2.

FIG. 3 illustrates the rotation of the pole holder 106 (shown in FIG. 2 and obscured here by first spring 132) from its predetermined rotational position around the single axis A. As shown, the pole holder 106 can rotate in a first direction shown by arrow 138 from the predetermined rotational position or in a second direction shown by arrow 140 in a second direction from the predetermined rotational position. When the mounting bracket 106 is mounted, the first direction corresponds with a first substantially horizontal direction and the second direction corresponds with a second substantially horizontal direction. For example, if the mounting bracket 106 were mounted with the longitudinal axis L (shown in FIG. 2) of the pole holder 106 positioned from east to west, the pole holder 106 would pivot toward the north when rotating in the first direction shown by arrow 138 in response to a north blowing wind, and the pole holder would pivot toward the south when rotating in the second direction shown by arrow 140 in respond to a south blowing wind. Because of this rotation, the wind would then be deflected rather than becoming trapped by a banner.

The mounting bracket 102 may be configured to limit the rotation around the single axis A. In the arrangement shown in FIG. 4, the mounting bracket includes a stop 142 coupled to the pivot base 108 and configured to selectively engage and limit a range of rotation of the pole holder 106 around the single axis A. In the arrangement shown in FIG. 4, the stop 142 limits the range of rotation of the pole holder 106 around the single axis A to approximately 90 degrees. Specifically, the range of rotation of the pole holder 106 from the predetermined rotational position is approximately 45 degrees in a first direction (i.e., the first direction shown by arrow 138 in FIG. 3) and approximately 45 degrees in a second direction. (i.e., the second direction shown by arrow 140 in FIG. 3).

Specifically, in FIG. 4, the stop 142 includes a first shaft 144 and a second shaft 146 that limit the range of rotation of the pole holder around the single axis A to approximately 90 degrees. In the arrangement shown, the first spring 132 of the biasing device 130 is located offset from a first side 148 of the pole holder 106 and the second spring 134 of the biasing device 130 is located offset from a second side 150 of the pole holder 106. The pin 118 extends along the single axis A, and the pole holder 106 is limited to rotating only around the single axis A by the pin 118, the first wall 114, and the second wall 116. The first wall 114 and the second wall 116 define a channel 152. The first spring 132 is positioned across the channel 152 from the second spring 134. The pin 118 divides the channel 152 into a first side 154 and a second side 156 (shown in FIG. 5). As shown in FIG. 4, the first shaft 144 extends across the channel 152 on the first side 154, and the second shaft 146 extends across the channel 152 on the second side 156.

Figure 5:
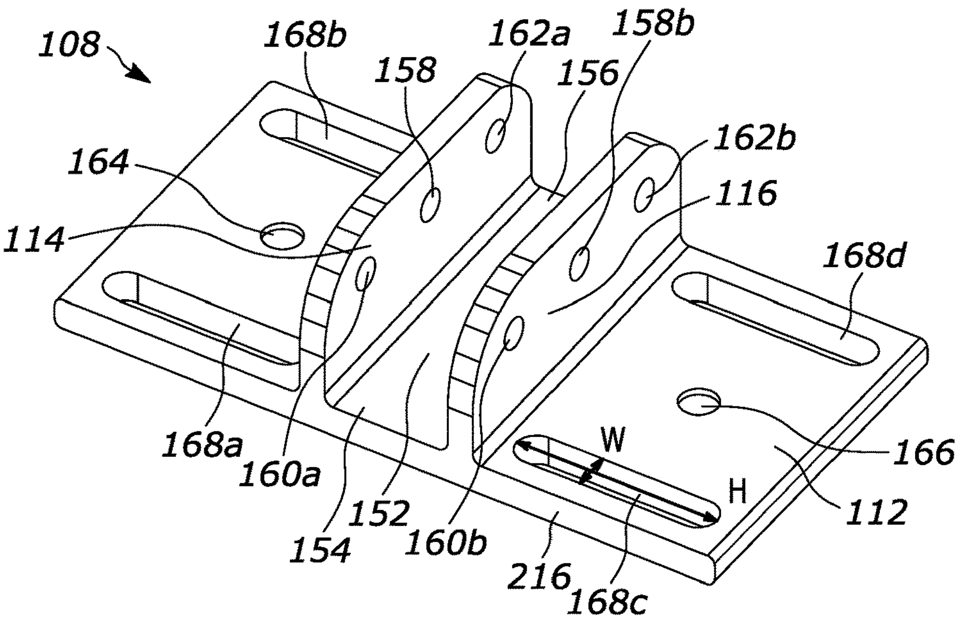
FIG. 5 illustrates a perspective view of a pivot base of the mounting bracket of FIGS. 2-4.

FIG. 5 illustrates the pivot base 108 including the base plate 112, first wall 114, second wall 116, and channel 152. Apertures 158*a* and 158*b* for the pin 118 are shown in the first wall 114 and the second wall 116, respectively. Apertures 160*a* and 160*b* for the first shaft 144 are shown in the first wall 114 and the second wall 116, respectively. Apertures 162*a* and 162*b* for the second shaft 146 are shown in the first wall 114 and the second wall 116, respectively. A first spring aperture 164 is shown for connecting the base plate 112 to the first spring 132, and a second spring aperture 166 is shown for connecting the base plate 12 to the second spring 134. The base plate 112 includes a plurality of mounting apertures 168 (168*a*, 168*b*, 168*c*, and 168*d*) that each have a width W and a height H that is greater than the respective width W. As a result, a bolt or other connection mechanism can be positioned at multiple locations along the height of each of the plurality of mounting apertures 168, which allows the base plate 112 to be repositioned relative to the surface to which it is connected by simply adjusting the position of the connection mechanisms within the plurality of mounting apertures 168 as opposed to moving or altering the surface (e.g., drilling new holes to mount the base plate 112).

Figure 6:
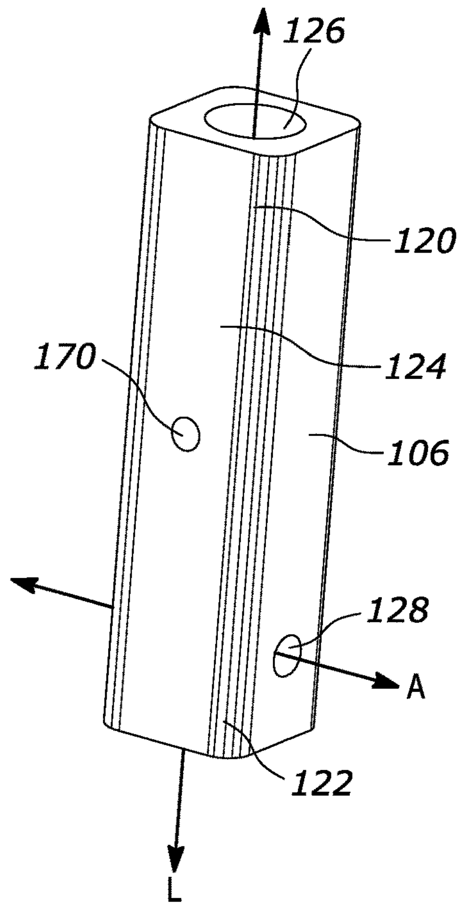
FIG. 6 illustrates a perspective view of a pole holder of the mounting bracket of FIGS. 2-4.

FIG. 6 illustrates the pole holder 106 of the mounting bracket 102 including the first end 120, the second end 122, the body 124 extending along the longitudinal axis L, the cavity 126 for a banner pole, and the bore 128 for the pin 118. The pole holder 106 further includes a locking pathway 170 to the cavity 126 through the body 124 for use in locking a banner pole within the pole holder 106 (as discussed in greater detail with respect to FIGS. 8 and 9 below).

Figure 7:
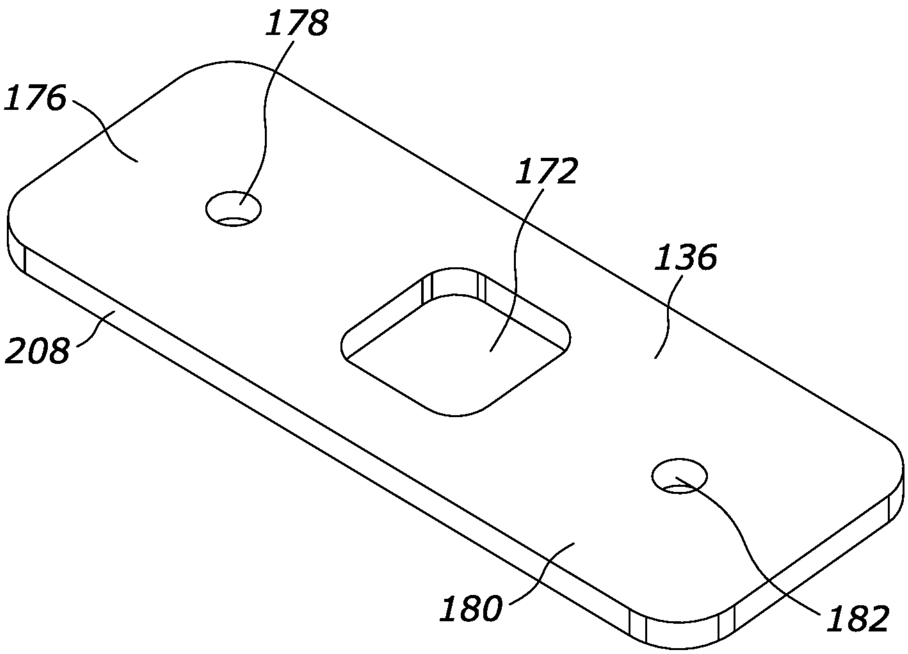
FIG. 7 illustrates a perspective view of a spring plate of the mounting bracket of FIGS. 2-4.

FIG. 7 illustrates the spring plate 136 that couples the first spring 132, the second spring 134, and the pole holder 106. The spring plate 136 includes an aperture 172 through which the pole holder 106 extends. The spring plate also has a first end 176 with a first spring aperture 178 for connecting to the first spring 132, and a second end 180 with a second spring aperture 182 for connecting to the second spring 134.

Figure 8:
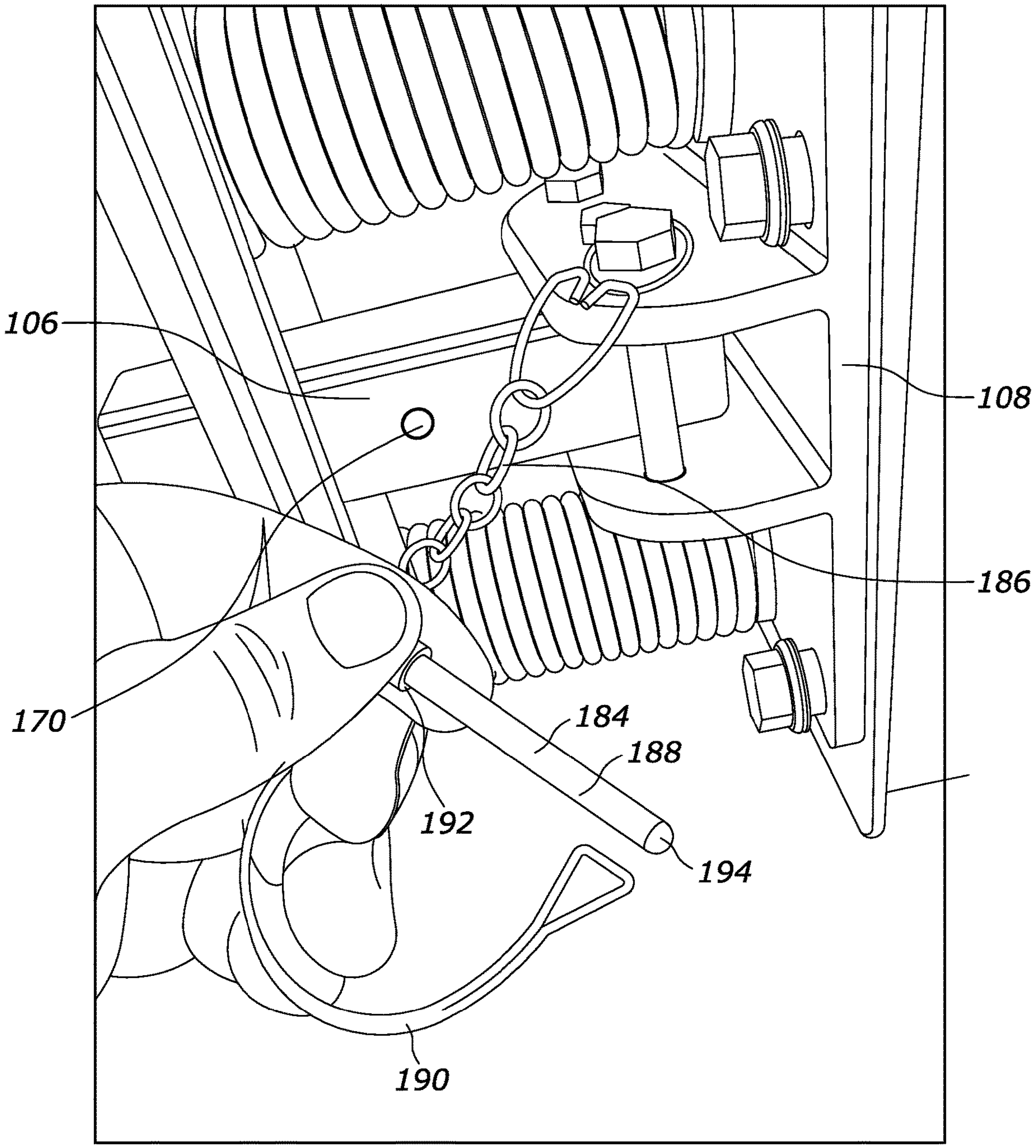
FIG. 8 illustrates a locking bar and a locking pathway of the mounting bracket of FIGS. 2-4 in an unlocked position.
Figure 9:
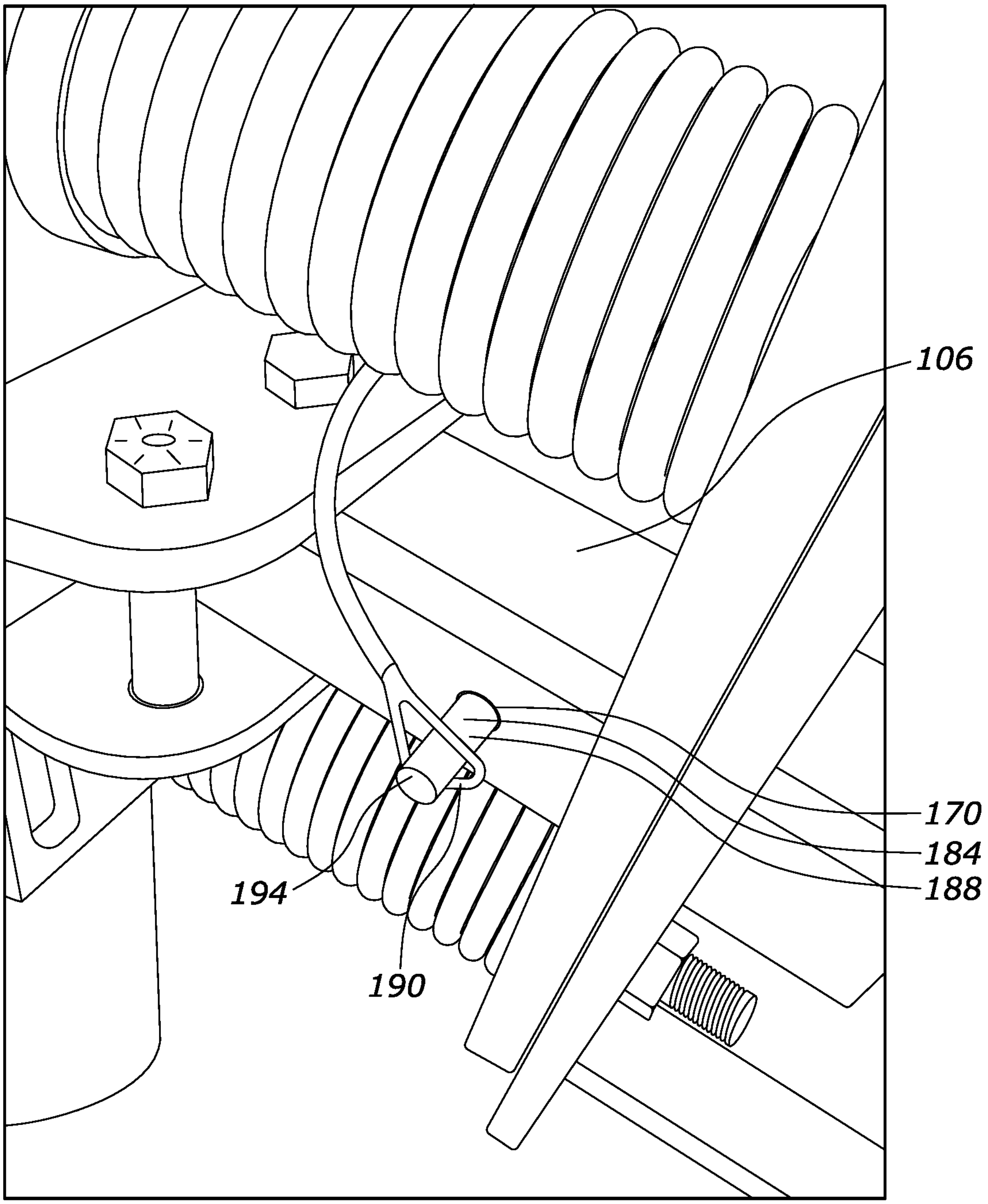
FIG. 9 illustrates the locking bar and locking pathway of FIG. 8 in a locked position.

FIGS. 8 and 9 illustrate how a banner pole can be locked within the pole holder 106. The mounting bracket includes a lock 184 configured for placement through the pole holder 106 and the banner pole to lock the banner pole in the pole holder 106. Specifically, as discussed with respect to FIG. 6, the pole holder 106 includes a locking pathway 170. As shown in FIG. 8, the pivot base 108 is connected by a chain 186 to a locking bar 188 configured for placement within the locking pathway 170. An exterior clasp 190 is connected to a first end 192 of the locking bar and is selectively connectable to a second end 194 of the locking bar 188. FIG. 9 shows the locking bar 188 positioned within the locking pathway 170 with the exterior clasp 190 securing the locking bar 188 in place by the exterior clasp 190, which is connected to the second end 194 of the locking bar 188. In other arrangements now shown herein, other locking mechanisms may be used to secure a banner pole within the pole holder 106.

Figure 10:
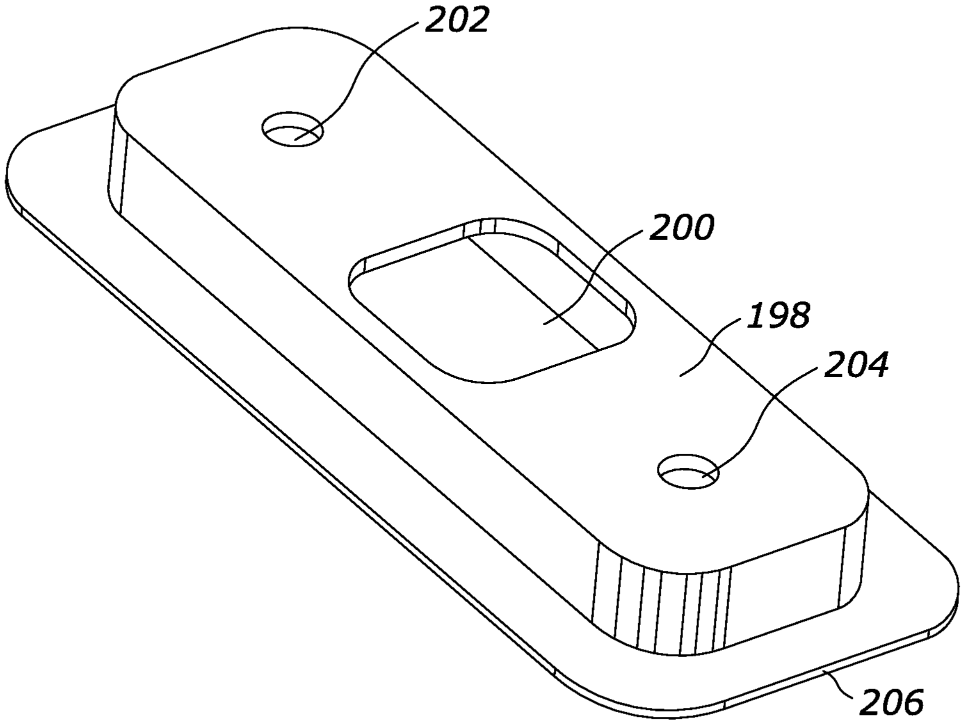
FIG. 10 illustrates a top flange plate of the mounting bracket of FIGS. 2-4.
Figure 11:
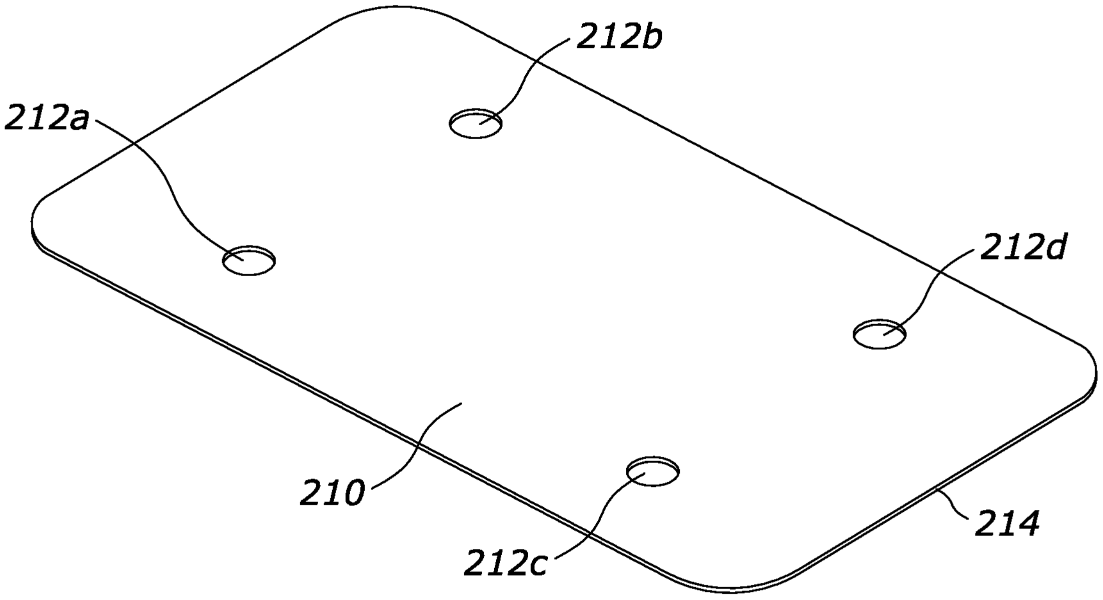
FIG. 11 illustrates a bottom flange plate of the mounting bracket of FIGS. 2-4.
Figure 12:
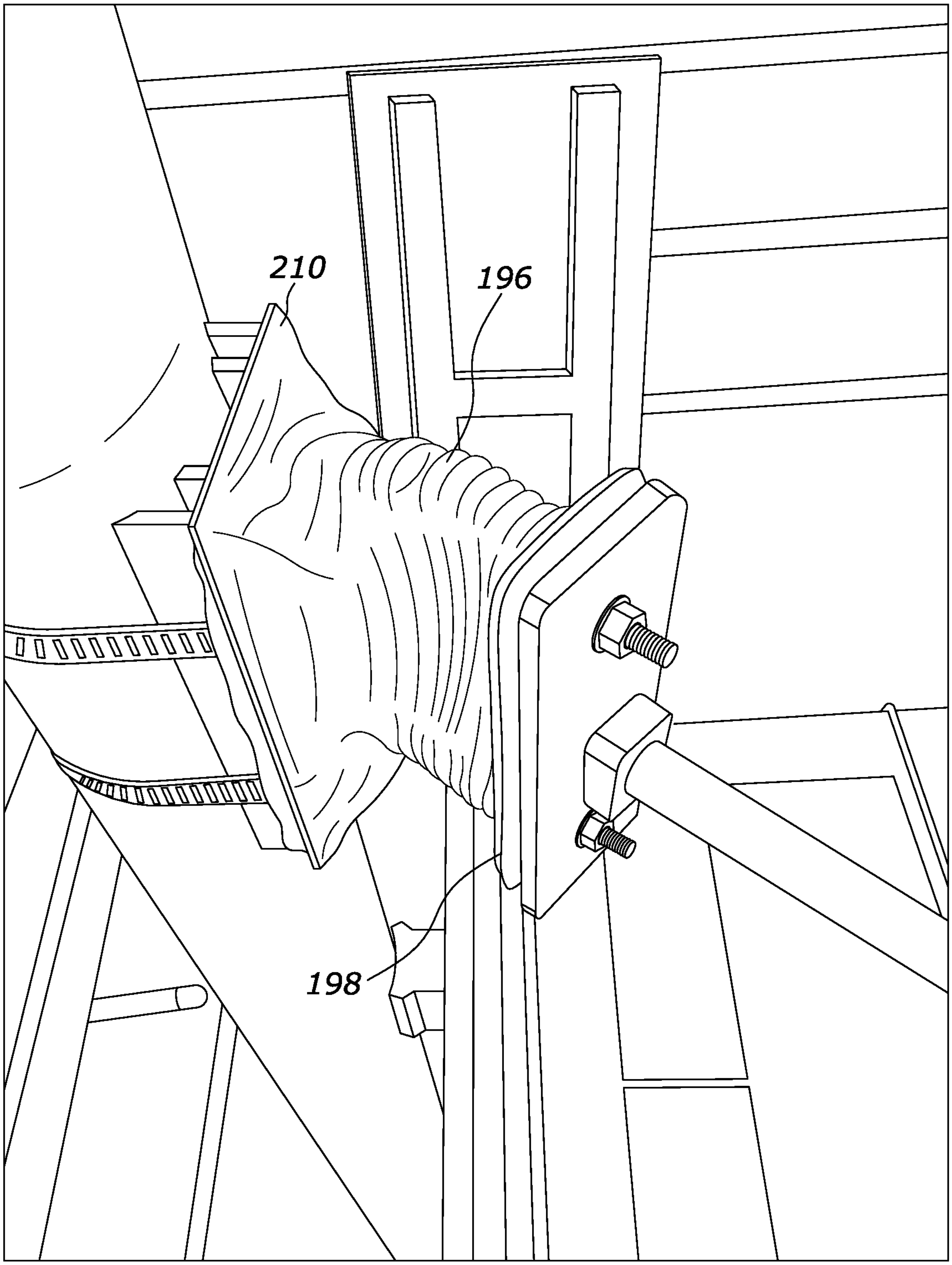
FIG. 12 illustrates a sleeve secured to the top flange plate and the bottom flange plate of the mounting bracket of FIGS. 2-4.

FIGS. 10-12 illustrate how a sleeve 196 can be secured on a mounting bracket 106 to cover the mounting bracket 106. FIG. 10 illustrates a top flange plate 198 that is secured adjacent the spring plate 136 shown in FIG. 2. As shown in FIG. 10, the top flange plate 198 includes an aperture 200 through which the pole holder 106 is inserted, a first spring aperture 202 for connecting to the first spring 132, and a second spring aperture 204 for connecting to the second spring 134. The top flange plate 198 has an outer edge 206 (shown in FIG. 10) that extends beyond a perimeter 208 of spring plate 136 (shown in FIG. 7). FIG. 11 illustrates a bottom flange plate 210 that is secured adjacent to the base plate 112 as shown in FIG. 2. As shown in FIG. 11, the bottom flange plate 210 includes a plurality of mounting apertures 212 (212*a*, 212*b*, 212*c*, and 212*d*) for mounting the mounting bracket 102. The plurality of mounting apertures 212 of the bottom flange plate 210 align with the plurality of mounting apertures 168 of the base plate 112 (shown in FIG. 5). As shown in FIG. 11, the bottom flange plate 210 has an outer edge 214 extending beyond a perimeter 216 of the base plate 112 (shown in FIG. 5). As shown in FIG. 12, the sleeve 196 is securable to the outer edge 206 of the top flange plate 198 and the outer edge 214 of the bottom flange plate 210. The sleeve 196 may comprise a material to protect the mounting bracket 106 from the elements. Further, the sleeve 196 may have a desired visual characteristic (e.g., a color).

Figure 13:
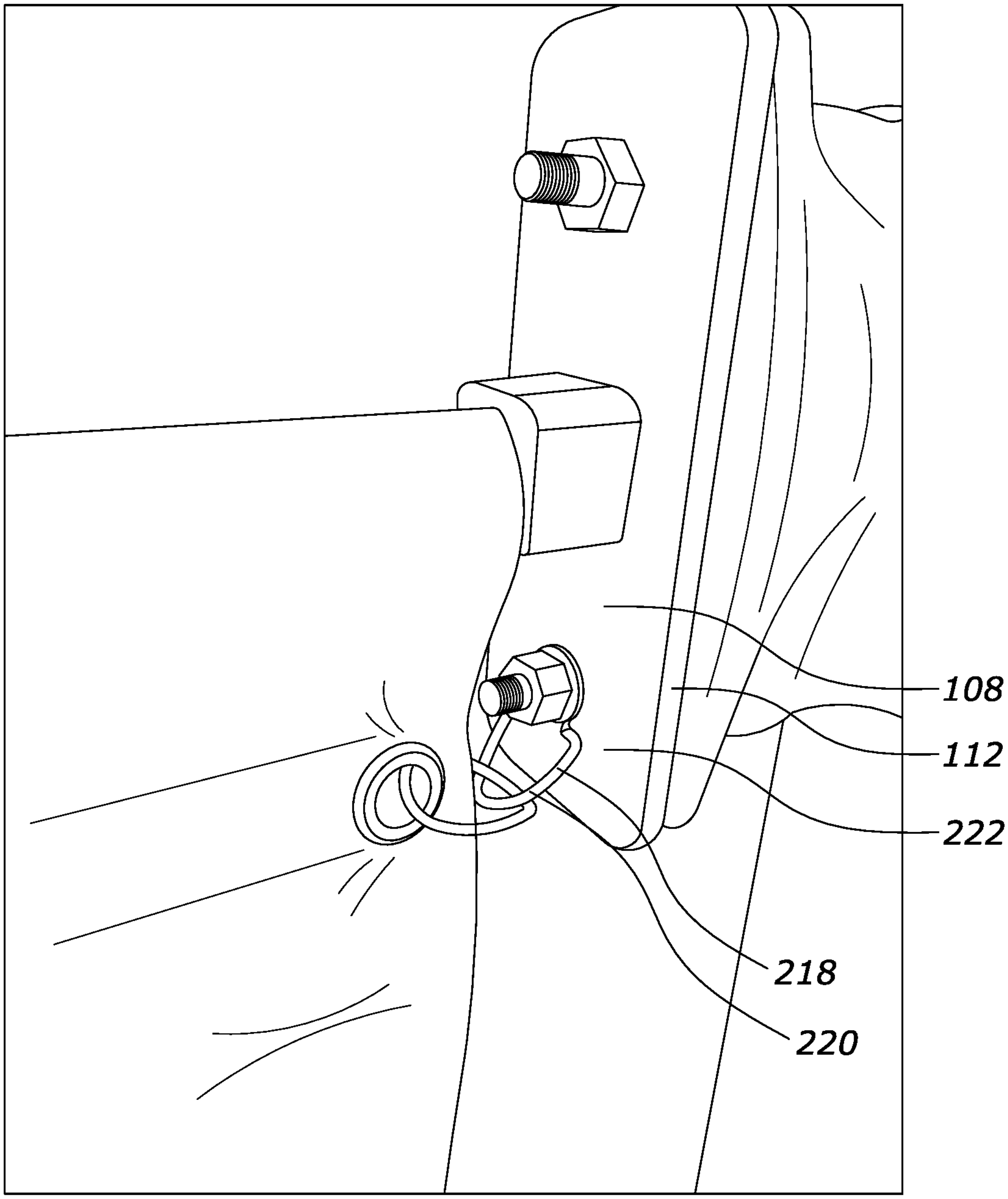
FIG. 13 illustrates a D-ring mounted to an exterior surface of a base plate of a pivot base of the mounting bracket of FIGS. 2-4.

FIG. 13 illustrates a banner connection point 218 for securing a banner to the pivot base 108 to prevent the banner from slipping off the banner pole. In the arrangement shown in FIG. 13, the banner connection point 218 includes a D-ring 220 mounted to an exterior surface 222 of base plate 112. The D-ring 220 is connected by a zip tie to a rivet in the banner. In other arrangements, the banner connection point may include a clip, hook, or other known fastening mechanism.

Figure 14:
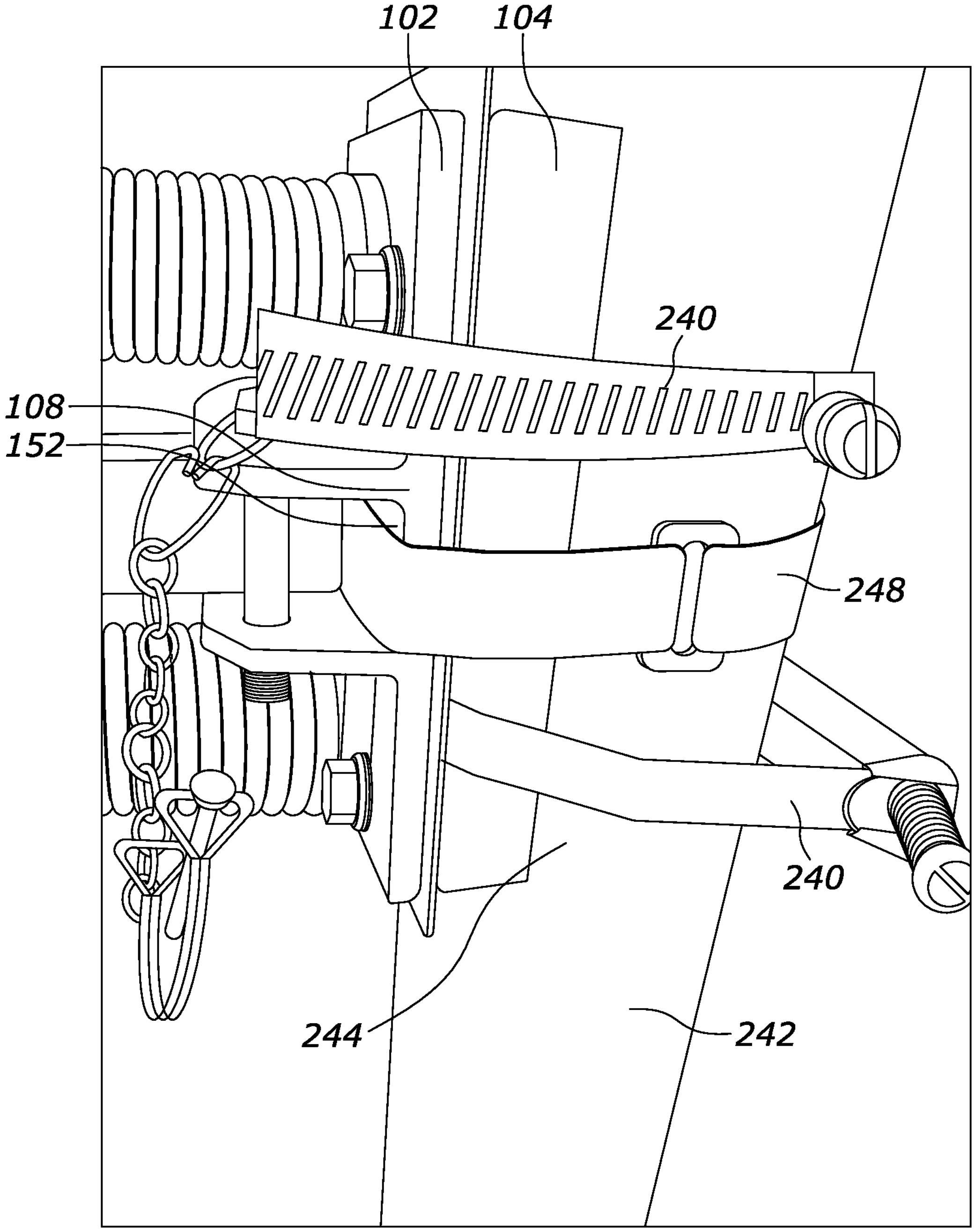
FIG. 14 illustrates a lower mounting bracket of the mounting system of FIG. 1.

FIG. 14 illustrates a mounting bracket 102 connected to a mounting plate 104 mounted on a pole. In the manner that the mounting plate 104 is mounted, the mounting bracket 102 and mounting plate 104 are positioned as a lower mounting bracket 102*b* and lower mounting plate 104*b* in the mounting system 100 of FIG. 1. If the mounting plate 104 were rotated 180 degrees within the vertical plane and mounted, the mounting bracket 102 and mounting plate 104 would be positioned as an upper mounting bracket 102*a* and upper mounting plate 104*a* in the mounting system 100 of FIG. 1. Using the same design for both the upper mounting plate 104*a* and the lower mounting plate 104*b*, and using the same mounting bracket 102 in both applications, is efficient for manufacturing and installation.

Figure 15:
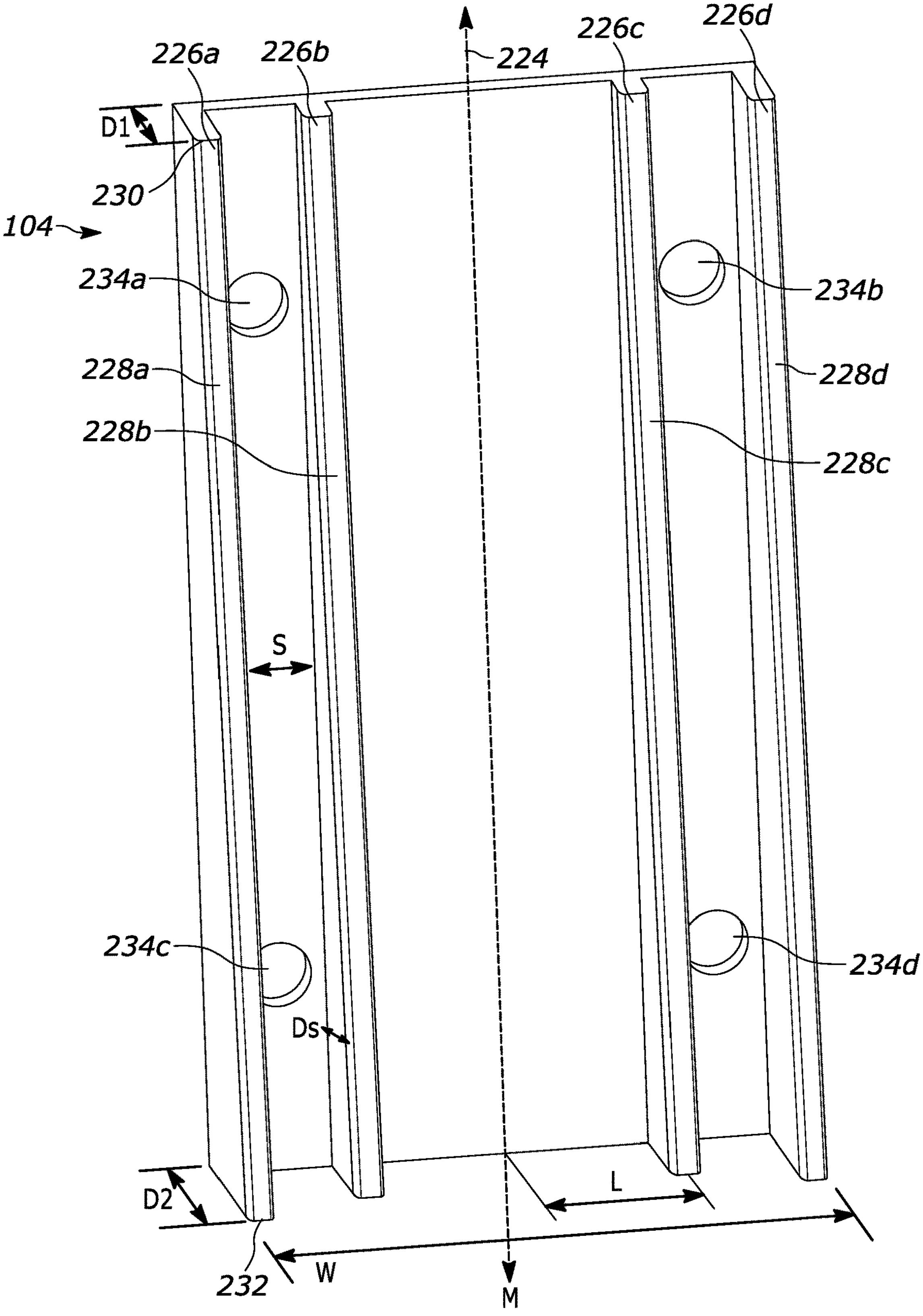
FIG. 15 illustrates a perspective view of a mounting plate for a streetlight pole in accordance with various embodiment.
Figure 16:
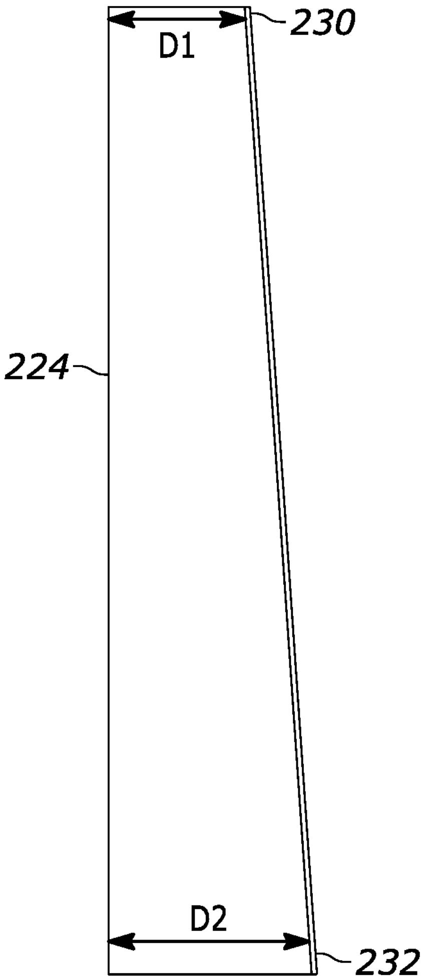
FIG. 16 illustrates a side view of the mounting plate of FIG. 15.

As shown in FIG. 15, the mounting plate 104 has an exterior surface 224 and a plurality of extension plates 226 (226*a*, 226*b*, 226*c*, 226*d*) extending outwardly from the exterior surface 224. Each extension plate 226 (226*a*, 226*b*, 226*c*, 226*d*) has a respective placement surface 228 (228*a*, 228*b*, 228*c*, 228*d*) that is angled relative to the exterior surface 224. When the mounting plate 104 is positioned as a lower mounting plate 104*b* as shown in FIG. 13, the extension plates 226 (226*a*, 226*b*, 226*c*, 226*d*) are lower extension plates having lower placement surfaces 228 (228*a*, 228*b*, 228*c*, 228*d*) that are angled relative to the exterior surface 224 such that, as shown in FIG. 16, a distance D1 between a top 230 of a respective lower placement surface 228 and the exterior surface 224 is greater than a distance D2 between a bottom 232 of the respective lower placement surface 228 and the exterior surface 224. If the mounting plate 104 were rotated to be mounted as an upper mounting plate 104*a*, the extension plates 226 (226*a*, 226*b*, 226*c*, 226*d*) would be upper extension plates having upper placement surfaces 228 (228*a*, 228*b*, 228*c*, 228*d*) that are angled relative to the exterior surface 224. Due to the rotation, the top 230 would become a bottom 230 of the upper placement surface and the bottom 232 would become a top 232 of the upper placement surface 228. In that position, the distance D2 between a top 232 of a respective upper placement surface 228 and the exterior surface 224 is less than the distance D1 between a bottom 230 of the respective upper placement surface 228 and the exterior surface 224.

Figure 18:
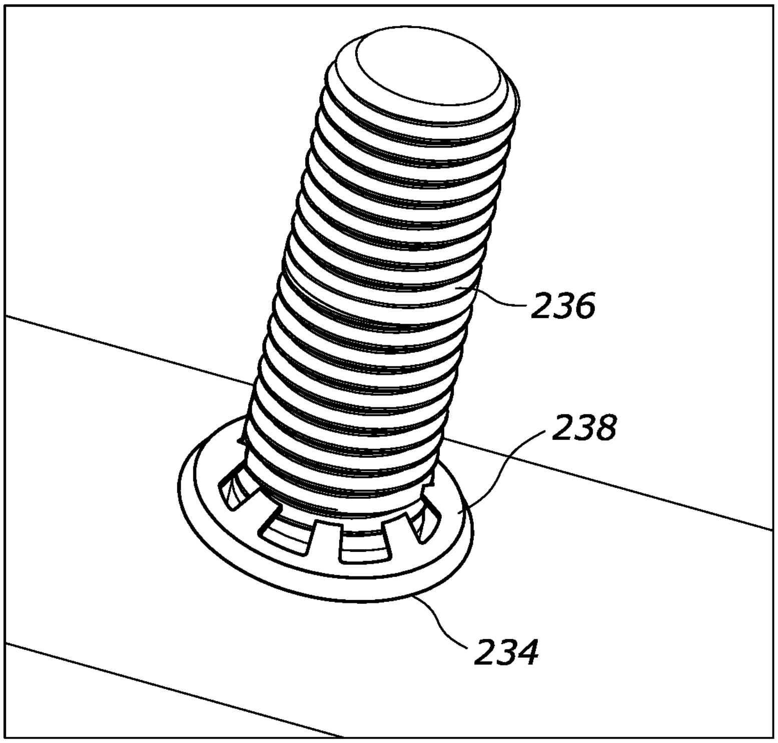
FIG. 18 illustrates a bolt and retaining ring mounted in the mounting plate of FIGS. 15-18.

As shown in FIG. 15, the mounting plate 104 further includes mounting apertures 234 (234*a*, 234*b*, 234*c*, 234*d*) that each accommodate a bolt 236 (shown in FIG. 18). As shown in FIG. 15, each mounting aperture 234 is located between a pair of extension plates 226, and the mounting plate 104 includes a first pair (extension plate 226*a* and 226*b*) and a second pair (extension plates 226*c* and 226*d*). For example, mounting aperture 234*a* is mounted between the pair of extension plates 226 including extension plate 226*a* and 226*b*. To adequately secure a bolt in place, the space S between each pair of extension plates 226 is sufficient only to accommodate a head of a bolt 236. As shown in FIG. 18, a retaining ring 238 may be provided on each bolt 236 to further secure the bolt 236 in place.

The mounting plate 104 may be mounted on a variety of different surfaces. In general, looking again to FIG. 1, the upper mounting plate 104*a* and the lower mounting plate 104*b* are each mountable on a structure 242 having an outer surface 244. The upper extension plates 226 are configured such that each upper placement surface 228 (discussed above with respect to FIG. 15) is positioned adjacent the outer surface 244 when the upper mounting plate 104*a* is mounted, and the lower extension plates 226 are configured such that each lower placement surface 228 (discussed above with respect to FIG. 15) is positioned adjacent the outer surface when the lower mounting plate is mounted.

Figure 17:
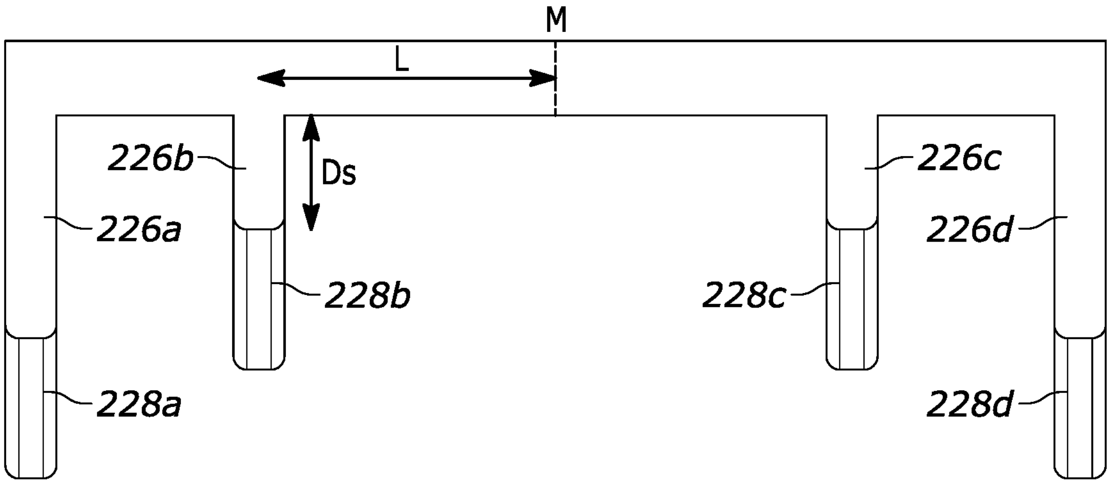
FIG. 17 illustrates a top view of the mounting plate of FIGS. 15 and 16.

Specifically, the structure 242 may be a pole having a cylindrical outer surface 244. As shown in FIG. 15, a mounting plate 104 for a pole has a width W bifurcated by a latitudinal axis M in the middle. As shown in FIG. 17, a distance Ds between a placement surface 228 of a respective extension plate 226 and the exterior surface 224 of the mounting plate 104 increases as a length L between the respective upper extension plate 226 and the latitudinal axis M increases. (The Ds at the top/bottom 230 is D1 and the Ds at the top/bottom 232 is D2). This applies whether the mounting plate 104 is an upper mounting plate 104*a* or a lower mounting plate 104*b*.

When the structure 242 is a pole, as shown in FIG. 14, the mounting plate 104 may be further secured to a structure (e.g., a pole) by one or more mounting straps 240. In the arrangement shown in FIG. 14, two metal mounting straps 240 secure the mounting plate 104 to a pole. Each mounting strap 240 extends between the mounting plate 104 and the mounting bracket 102 and wraps around the pole. Optionally, a hook and loop strap 248 may be used to preliminarily secure the mounting plate 104 and/or mounting bracket 102 to the pole as other securement mechanisms (e.g., the bolts 236 and mounting straps 240) are secured to the mounting plate 104. The hook and loop strap 248 may extend through the channel 152 of the pivot base 108 (shown in FIG. 5). The hook and loop strap 248 may be removed after the mounting plate 104 is mounted by other securement mechanisms or may be left in place. The mounting straps 240 and hook and loop strap 248 may be used with either an upper mounting plate 104*a* or a lower mounting plate 104*b*.

Figure 19:
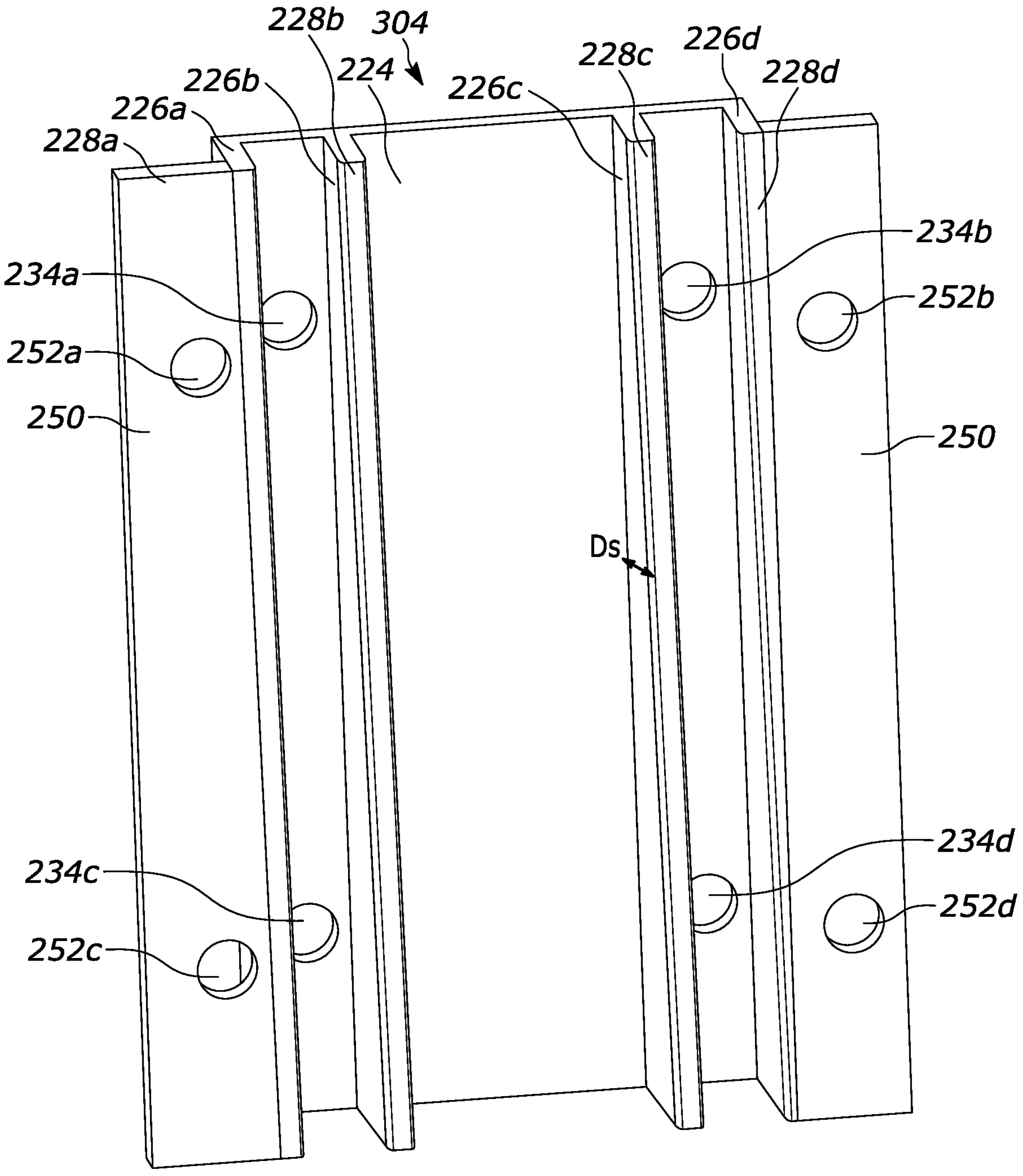
FIG. 19 illustrates a perspective view of a mounting plate for a wall in accordance with various embodiments.
Figure 20:
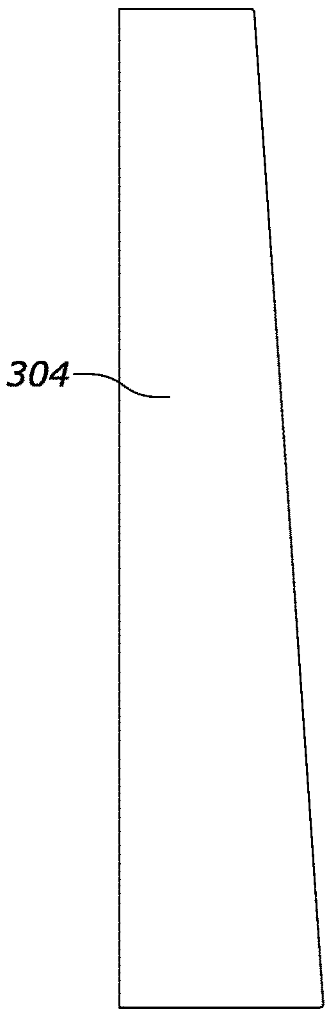
FIG. 20 illustrates a side view of the mounting plate of FIG. 18.
Figure 21:
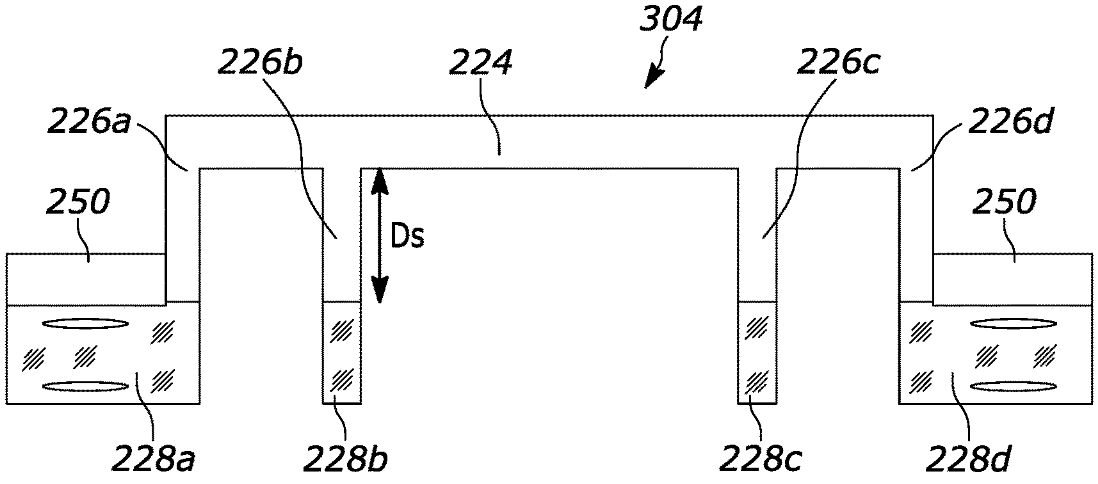
FIG. 21 illustrates a top view of the mounting plate of FIGS. 18 and 19.

As another example, the structure 242 may be a wall having a flat outer surface 244. FIGS. 19-21 illustrate an alternate mounting plate 304 for a wall having all the same features as the mounting plate 104 with the following changes. Unlike the arrangement shown in FIG. 15, the distance Ds between a placement surface 228 and the exterior surface 224 of the mounting plate 104 shown in FIG. 19 is the same for all extension plates 226. As shown in FIG. 19, the mounting plate 304 has lateral flanges 250 configured to be positioned adjacent the flat outer surface 244. In addition to the mounting apertures 234 (234*a*, 234*b*, 234*c*, 234*d*), each lateral flange 250 of the mounting plate 104 includes mounting holes 252 (252*a*, 252*b*, 252*c*, 252*d*) for securing the mounting plate 104 to the flat outer surface 244. These features are included whether the mounting plate 104 is an upper mounting plate 104*a* or a lower mounting plate 104*b*.

Figure 22:
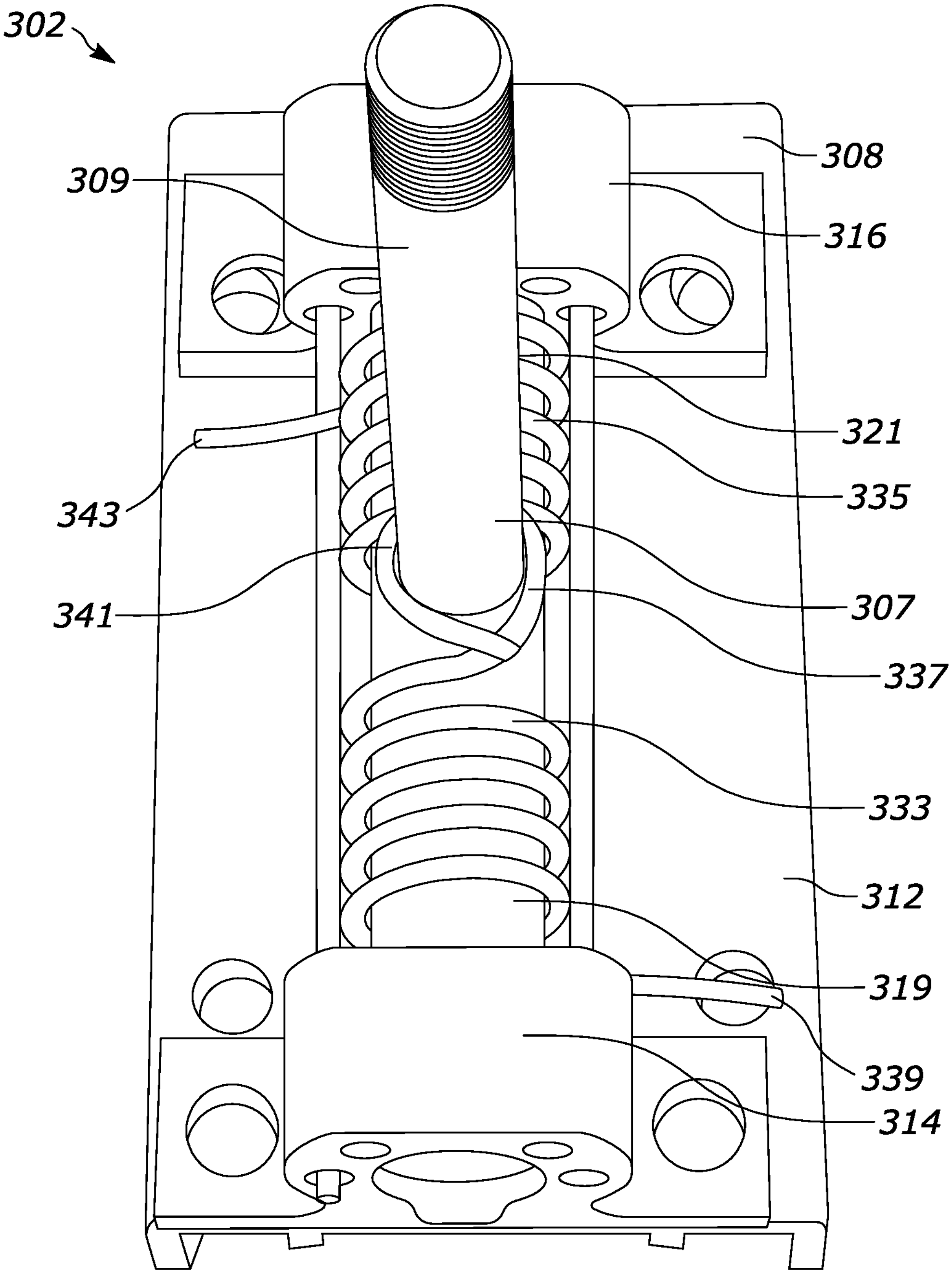
FIG. 22 illustrates a perspective view of an alternate mounting bracket in a in accordance with various arrangements.
Figure 23:
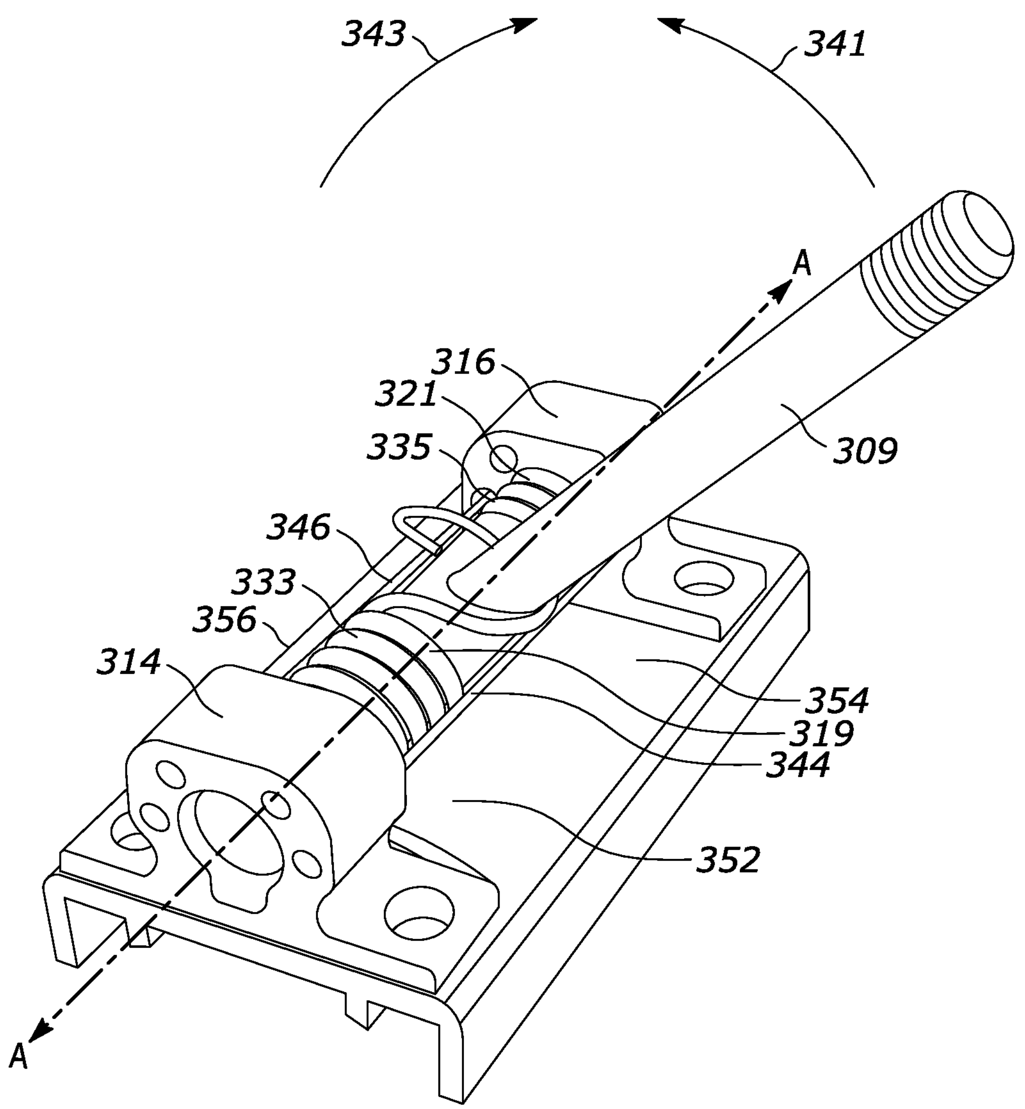
FIG. 23 illustrates a perspective view of the alternate mounting bracket of FIG. 22 with a torsion spring exerting a biasing force on a mast rod.
Figure 24:
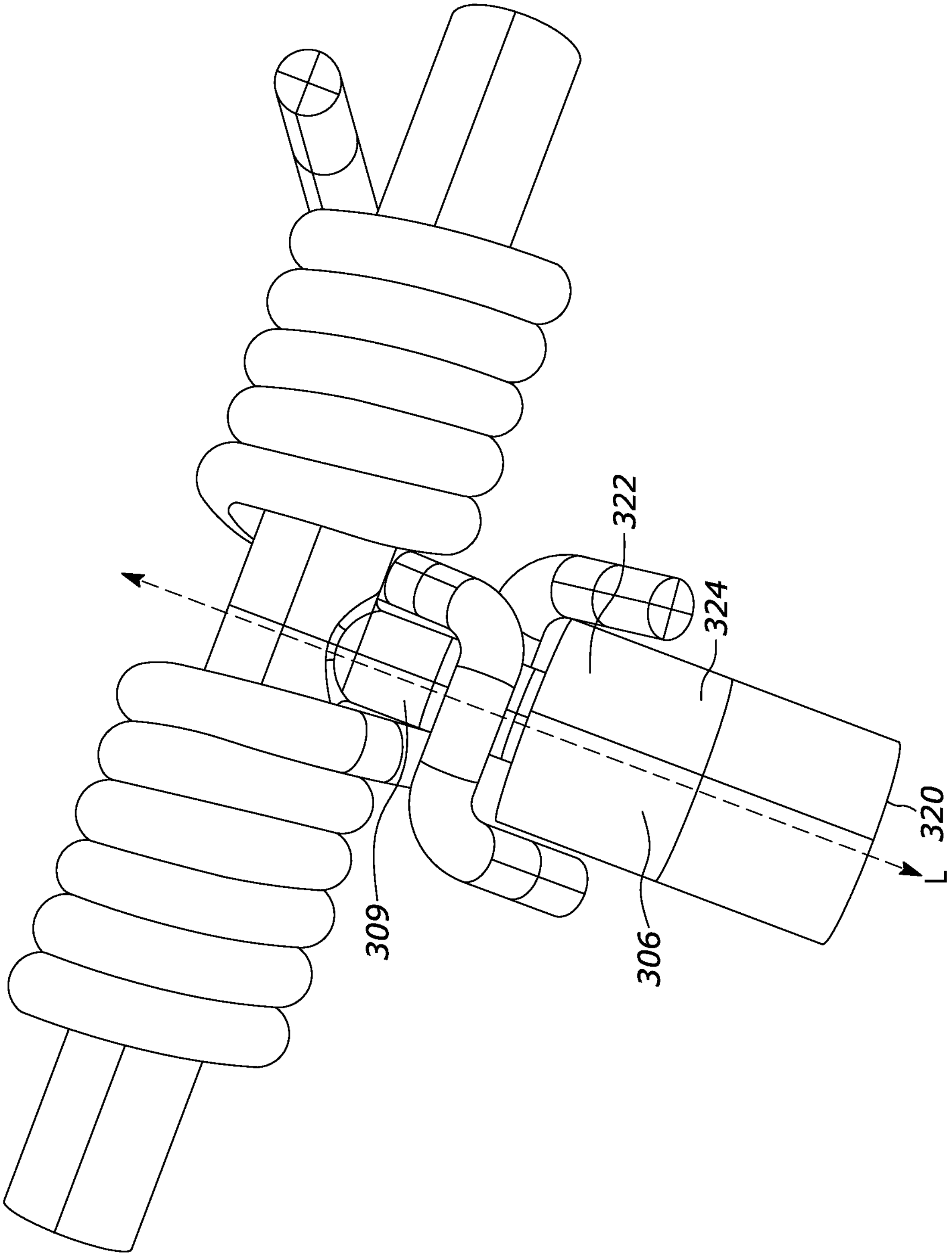
FIG. 24 illustrates a perspective view of a pole holder connected to the mast rod in the alternate mounting bracket of FIGS. 22 and 23.

FIGS. 22-24 illustrate an alternate mounting bracket 302 that could be used in mounting system 100 in place of one or both of mounting brackets 102*a* and 102*b*. Features shared with the mounting bracket 102 are referred to by the same reference number increased by two hundred. Common features are not described in substantial additional detail. Unique features are identified by unique reference numbers. Any combination or sub-combination of features described in regard mounting bracket 102 may be incorporated into mounting bracket 302 and vice-versa.

FIG. 22 illustrates a perspective view of an alternate mounting bracket 302. The pivot base 308 includes a first torsion spring 333 and a second torsion spring 335. The pivot base 308 includes a mast rod 307 having a first rotational rod 319 around which the first torsion spring 333 is secured, and a second rotational rod 321 around which the second torsion spring 335 is secured. The mast rod 307 further includes an extension 309. As shown in FIG. 24, the extension 309 connects to the pole holder 306. In the arrangement shown in FIG. 22, the extension 309 is externally threaded to facilitate connection to the pole holder 306. The pole holder 306 may include a compatible connection mechanism, such as internal threading. As shown in FIG. 24, the pole holder 306 has a first end 320, a second end 322, and a body 324 extending between the first end 320 and the second end 322 along a longitudinal axis L. A cavity (like cavity 126 in FIG. 6) within the body 324 extends from the first end 320 toward the second end 322 along the longitudinal axis L and is configured to hold a banner pole. The extension 309 extends along the longitudinal axis L.

Returning to FIG. 22, the pivot base 308 includes a base plate 312, a first wall 314 extending outwardly from the base plate 312 and pivotably connected to the first rotational rod 319 of the mast rod 307, and a second wall 316 extending outwardly from the base plate 312 and pivotably connected to the second rotational rod 321 of the mast rod 307.

As shown in FIG. 22, the first torsion spring 333 includes a first hooked leg 337 positioned around the extension 309 of the mast rod 307 and a first plate leg 339 positioned against the base plate 312 of the pivot base 308. The second torsion spring 335 is secured around the second rotational rod 321 of the mast rod 307. The second torsion spring 335 includes a second hooked leg 341 positioned around the extension 309 of the mast rod 307 and a second plate leg 343 positioned against the base plate 312 of the pivot base 308.

As shown in FIG. 23, the first rotational rod 319 and the second rotational rod 321 extend along a single axis A. The extension 309 and consequently the pole holder 306 (shown in FIG. 24) are therefore limited to rotating only around the single axis A by the first rotational rod 319, the second rotational rod 321, the first wall 314, and the second wall 316. The first wall 314 and the second wall 316 define a channel 352, and the first rotational rod 319 and the second rotational rod 321 divide the channel 352 into a first side 354 and a second side 356. A first shaft 344 extends across the channel 352 on the first side 354, and a second shaft 346 extends across the channel 352 on the second side 356. The first shaft 344 and the second shaft 346 limit a range of rotation of the extension 309 and consequently the pole holder 306 around the single axis A to approximately 90 degrees. The first torsion spring 333 biases the extension 309 and consequently the pole holder 306 (shown in FIG. 24) in a first direction shown by arrow 341 toward the predetermined rotational position shown in FIG. 23. As shown in FIG. 22, the second torsion spring 335 biases the pole holder 306 (shown in FIG. 24) in a second direction shown by arrow 343 toward the predetermined rotational position. As a result, the extension 309 of the mast rod 307 and consequently the pole holder 306 are urged toward the predetermined rotational position.

An alternate mounting assembly 400 and associated fittings are shown in FIGS. 25-53. It will be appreciated that the mounting assembly 400 illustrated in FIGS. 25-53 may include similar features to the mounting brackets 102 discussed above. While the mounting brackets described above and the mounting assembly described below both have the ability to limit the rotation of supported banner poles about a single axis A through the use of a biasing device, to be secured to a light pole using a hook and loop strap and mounting straps, and to bias an upper banner pole θ degrees above horizontal and a lower banner pole θ degrees below horizontal, there are structural differences for achieving these functions. The mounting brackets 102 described above include a pivot base 108 which is connected to a pole holder 106 which pivots about a pin 118. The pole holder 106 is biased by a biasing device 130 that utilizes two springs or two sets of springs in two distinct locations on either side of the pole holder 106. In contrast, in the mounting assembly 400 shown in FIG. 25 a biasing device 430 with a single location for springs is used. An additional difference is the manner in which the banner pole holder (116, 410) pivots. As mentioned, the pole holder 106 pivots about a fixed pin 118 described with respect to the mounting bracket. The banner pole holder 410 of the mounting assembly 400 pivots via the movement of a connecting screw 440 in a slot in the pivot base 420, with the movement of the screw being possible in part due to the unique end portion of the screw 440. These and other features of the mounting assembly 400 will be described in greater detail below. Any combination or sub-combination of features described in regard to the mounting assembly 400 may be incorporated into the mounting brackets 102, and vice-versa.

As with the mounting brackets described above, the mounting assemblies described herein have features which provide improved performance of the assemblies. These features may be utilized individually or together in multiple combinations. The mounting assembly prevents parachuting out of banners by utilizing a pivot base that is inclined with respect to a surface of an attached light pole, thus biasing banner poles held by the assembly in a direction that is a few degrees from horizontal. Protrusions on the pivot base, which prevent a mating holder plate from moving along more than one axis A, further prevent parachuting of an attached banner. The mounting assemblies described herein also allow for improved gripping of a street light pole with the use of sharp edges where the pivot base contacts the surface of the light pole. Reduction of the probability of failure of the mounting assembly with respect to the ability to return a banner to its original, predetermined position about a single axis is facilitated by redundant, coaxially arranged springs in the biasing device. A spacer with a smaller diameter than the spring of the biasing device helps with biasing a banner to return to a predetermined location, and the spacer also helps to prevent over compression of the springs of the biasing device, thus preventing early fatiguing and failure of the springs. The mounting assembly is able to be adjusted once it is placed on a street light pole through the use of a slot or channel on the pivot base for the attachment of a hook and loop strap for placement of the mounting assembly on a light pole. The hook and loop strap provides sufficient support to hold the mounting assembly to a light pole while its location along the pole is refined, for example after a banner is attached. The use of a specialized securing screw, for example a securing screw that has a "T" shaped end that is rounded, allows the end to slide through a slot in the pivot base and along the top of a cavity in the pivot base that has an arcuate cross-section. Adjustment to the initial compression of the spring or springs of the biasing device without removal of the mounting assembly is possible because of the "T" shaped end of the securing screw in conjunction with the configuration of the cavity and slot of the pivot base. These features improve the case of use of a mounting assembly, as well as help to prevent damage to banners supported by mounting assemblies having such features.

Figure 25:
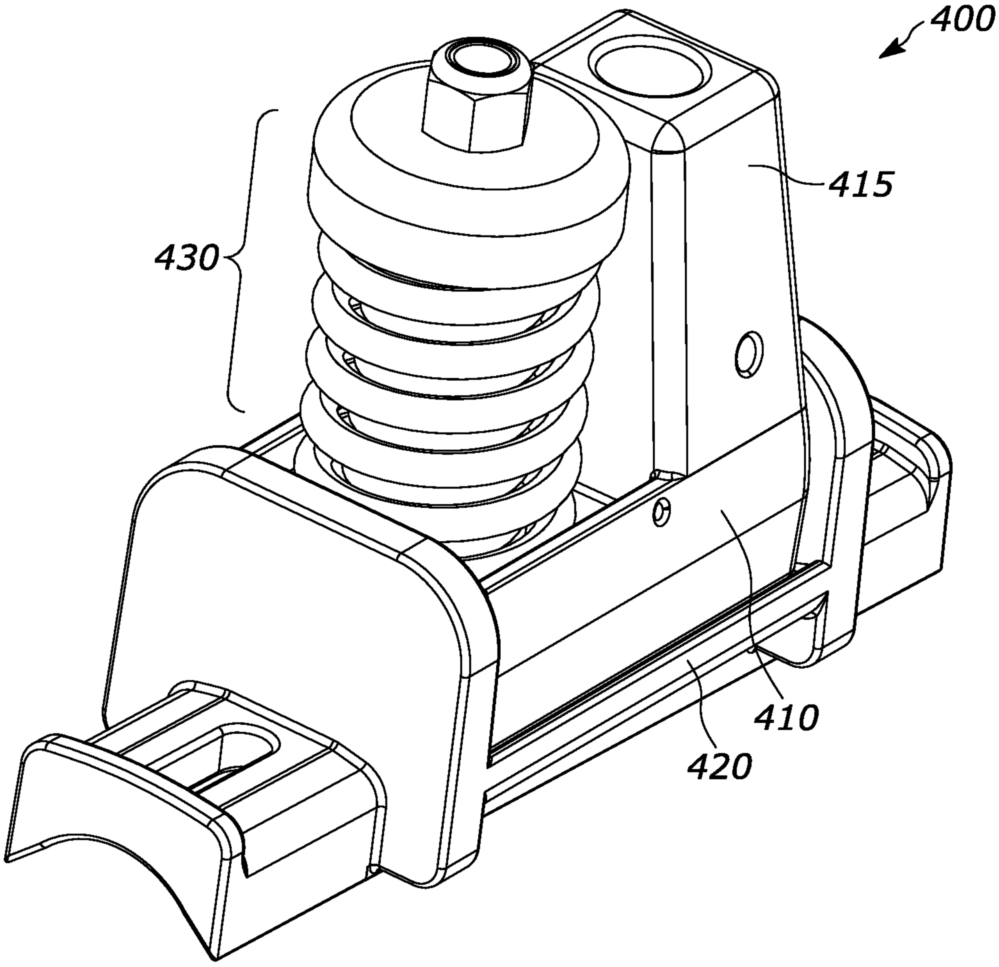
FIG. 25 illustrates a perspective view of one mounting bracket assembly for a pole on a street light pole according to various arrangements.

FIG. 25 illustrates a perspective view of an alternate banner mounting bracket assembly 400 for a pole on a street light pole according to various arrangements. The banner mounting bracket assembly 400 includes a biasing device 430 including a securing screw or bolt 440, a pole holder 410 and a pivot base 420. The pole holder 410 has a pole holder portion 415.

Figure 26:
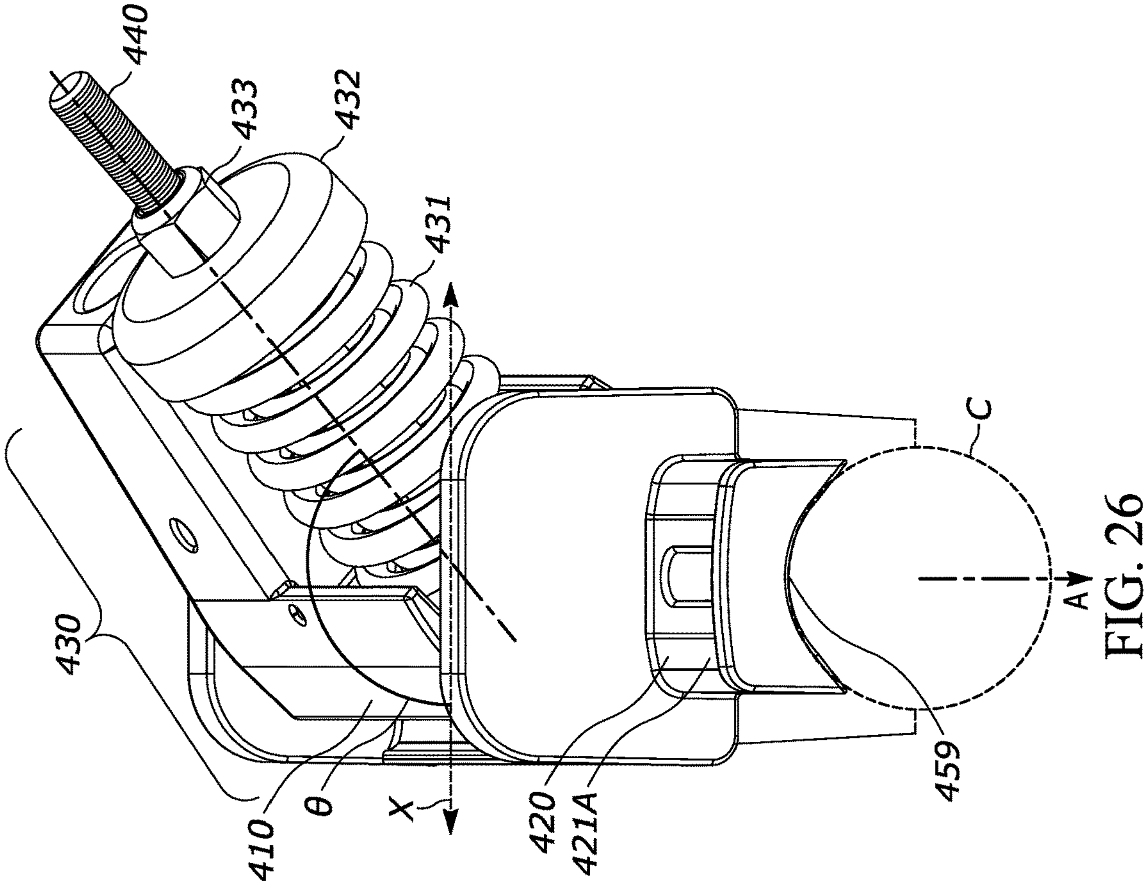
FIG. 26 illustrates a perspective view of a mounting bracket with a spring assembly bent in a first direction, to the right in the figure, according to some arrangements.
Figure 27:
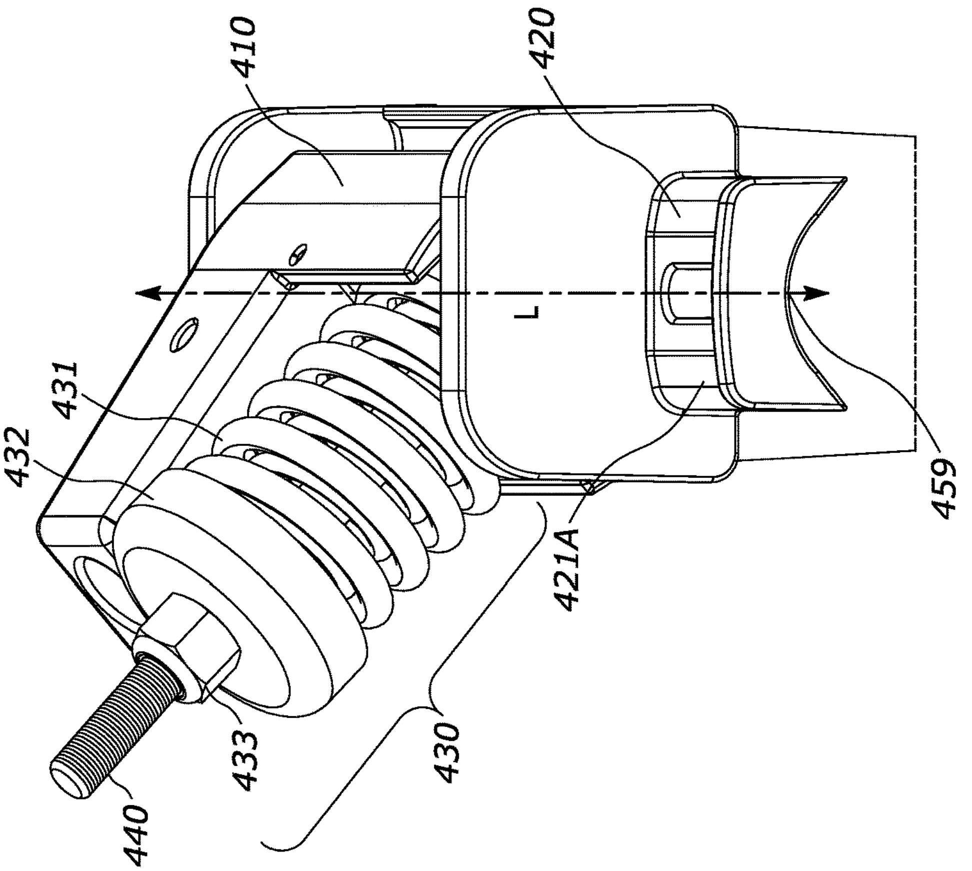
FIG. 27 illustrates a perspective view of a mounting bracket with a spring assembly bent in a second direction, to the left in the figure, according to some arrangements.

FIGS. 26 and 27 illustrate a perspective view of the mounting bracket assembly 400 with a biasing device 430 tilted in a first direction, to the right (FIG. 26), and in a second direction, to the left (FIG. 27), relative to the longitudinal axis L of the mounting bracket, according to some arrangements. The biasing device 430 includes a securing screw or bolt 440, a spring 431, a cap washer 432 located in the area of the distal end of the securing screw 440, and a nut 433 that secures to the screw 440, such as via threads at the distal end of the screw 440. The pole holder 410 has a lower surface 411 that contacts the top surface of the pivot base 420. The pivot base 420 is shown to also have lowered areas (e.g., grooves) 421 where bands for securing the assembly 400 to a light pole can be located when the banner mounting assembly 400 is in use. These figures illustrate the range of motion, in a rotational manner, that the pole holder 410 has with respect to the pivot base 420 while the biasing device 430 is compressed. When the pole holder 410 is moved so that the biasing device 430 is bent extremely to the first or second direction (e.g., to the right or left as viewed in FIGS. 26 and 27), the lower surface 411 of the pole holder 410 is in intermittent or partial contact with the top surface of the pivot base 420. The biasing device 430 is configured to return the pole holder 410 to a predetermined rotational position after a force, such as that caused by wind, has passed. The predetermined rotational position may cause the pole holder to have increased contact between the lower surface 411 of the pole holder 410 and the pivot base 420 as compared to when the banner, and in turn the mounting assembly 400, are under load.

Figure 28:
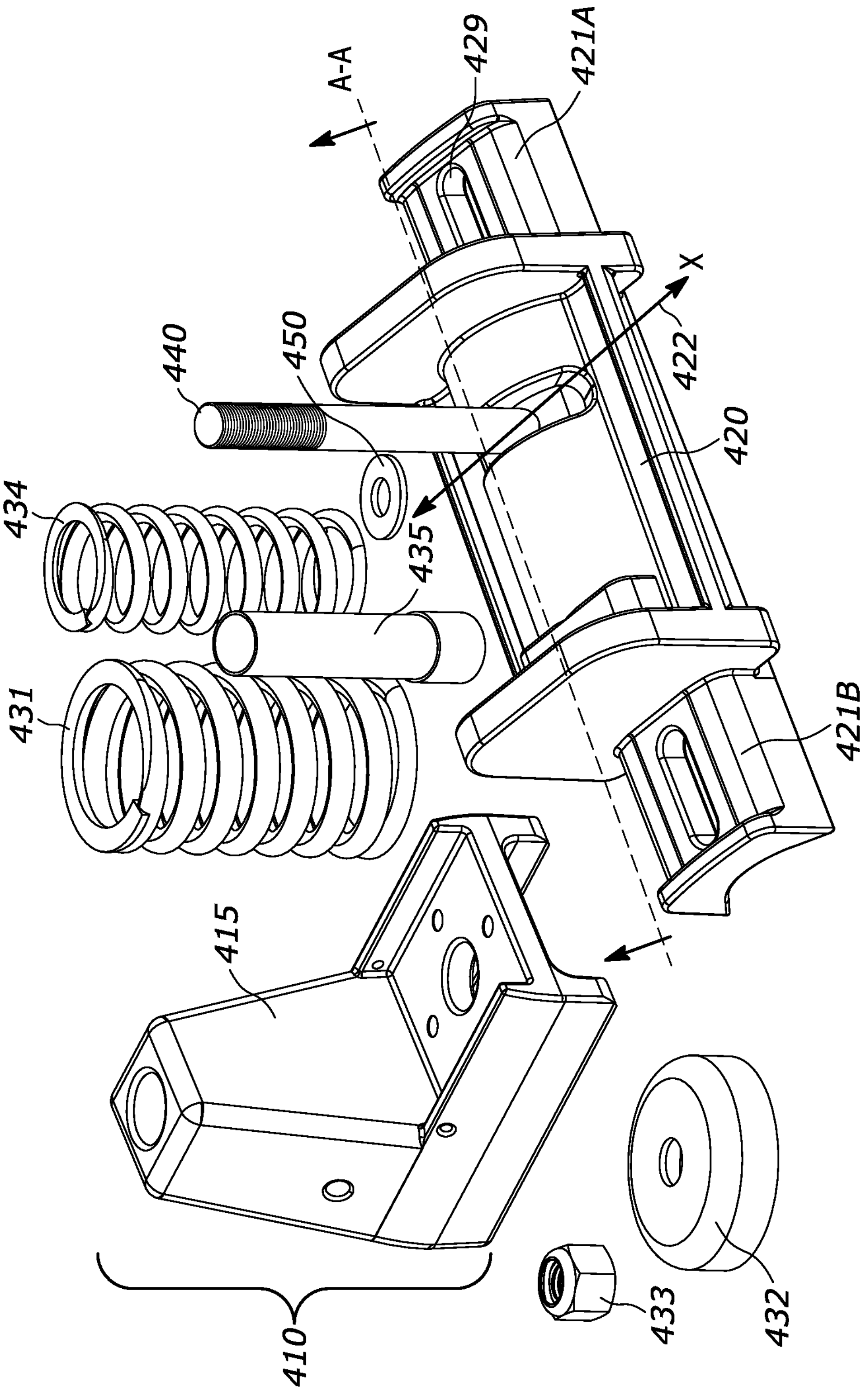
FIG. 28 illustrates components of a mounting bracket assembly according to various arrangements.

FIG. 27 shows the longitudinal axis L of the pivot base 420, and FIG. 26 shows an X axis which is orthogonal to the longitudinal axis L. Specifically, as shown in FIG. 28 below, the X axis is aligned with a slot (422 in FIG. 28) within the pivot base 420. The screw 440 is slidably secured within the slot 422. As shown in FIG. 26, the pivot base 420 has an underside 459 that the screw 440 is configured to engage after insertion through the slot (422 in FIG. 28). The underside 459 is curved such that the underside 459 forms a portion of a cylinder having a center of rotation at axis A. A dotted circle C illustrates a cross-sectional of the cylinder partially formed by the underside 459. Because the screw slides along the underside 459, the screw 440 rotates around axis A, thereby causing the pole holder 410 to rotate around axis A. The rotation of the pole holder 410 and attached biasing device 430 about the axis A may be measured in degrees θ.

FIG. 28 illustrates components of a mounting bracket assembly 400 according to various arrangements. These components include: a pole holder 410, a pivot base 420, a large spring 431, a cap washer 432, a nut 433, a smaller diameter spring 434, a spacer cylinder 435, a screw or bolt 440, and a washer 450. The pole holder 410 has a pole holder support 415 on one side of the plate. The pole holder support 415 is a raised area of the pole holder 410 that is shown in FIG. 28 as having a shape like a truncated pyramid (i.e., a pyramid with the top portion removed along a plane parallel to the base). The pivot base 420 has areas 421 where binding straps contact the mounting assembly 400 when the assembly 400 is attached to a light pole, including slots where fittings for attachment to a pole may be inserted in lieu of, or in addition to, using a binding strap. The pivot base 420 also includes a slot 422 through which the screw 440 passes.

Figure 29:
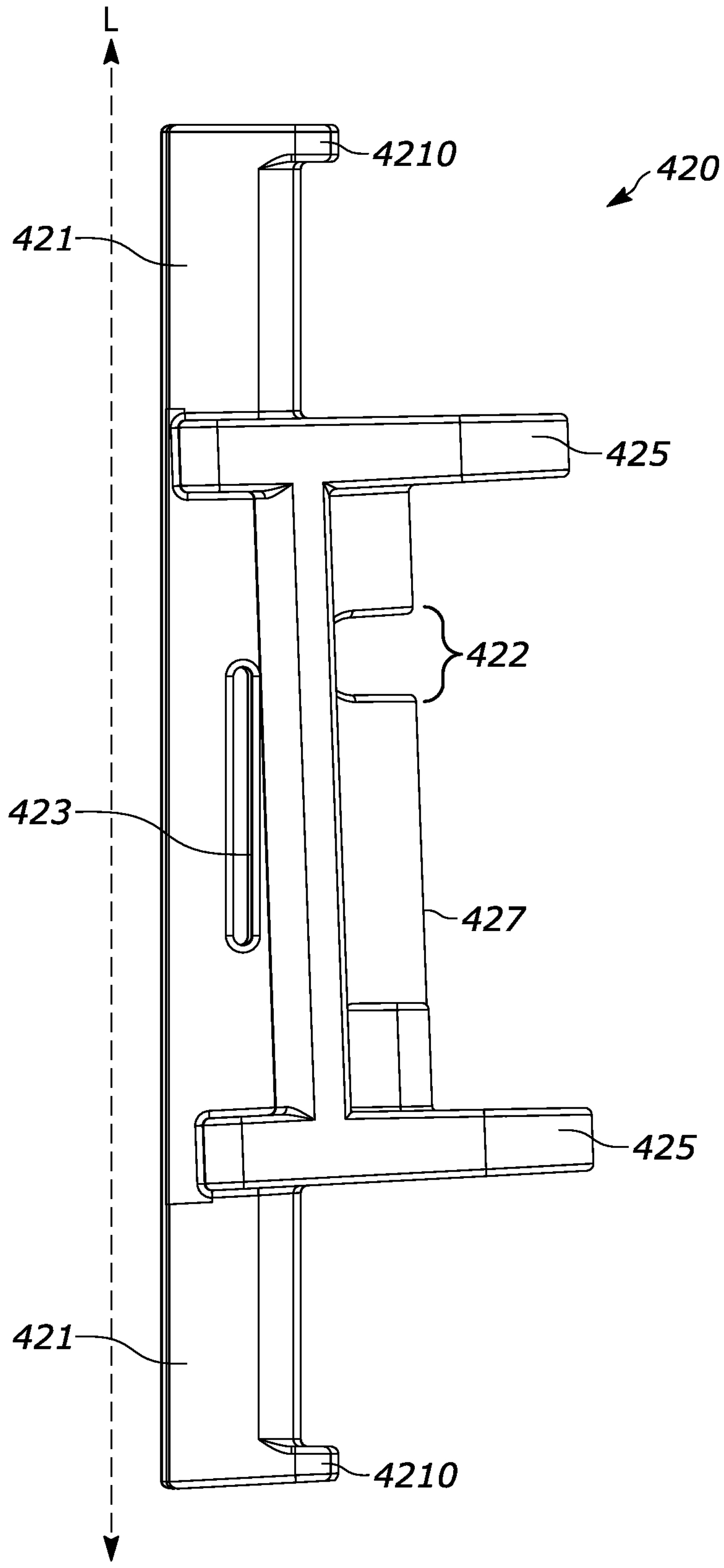
FIG. 29 illustrates a side view of a base plate of a mounting bracket assembly according to various arrangements.
Figure 30:
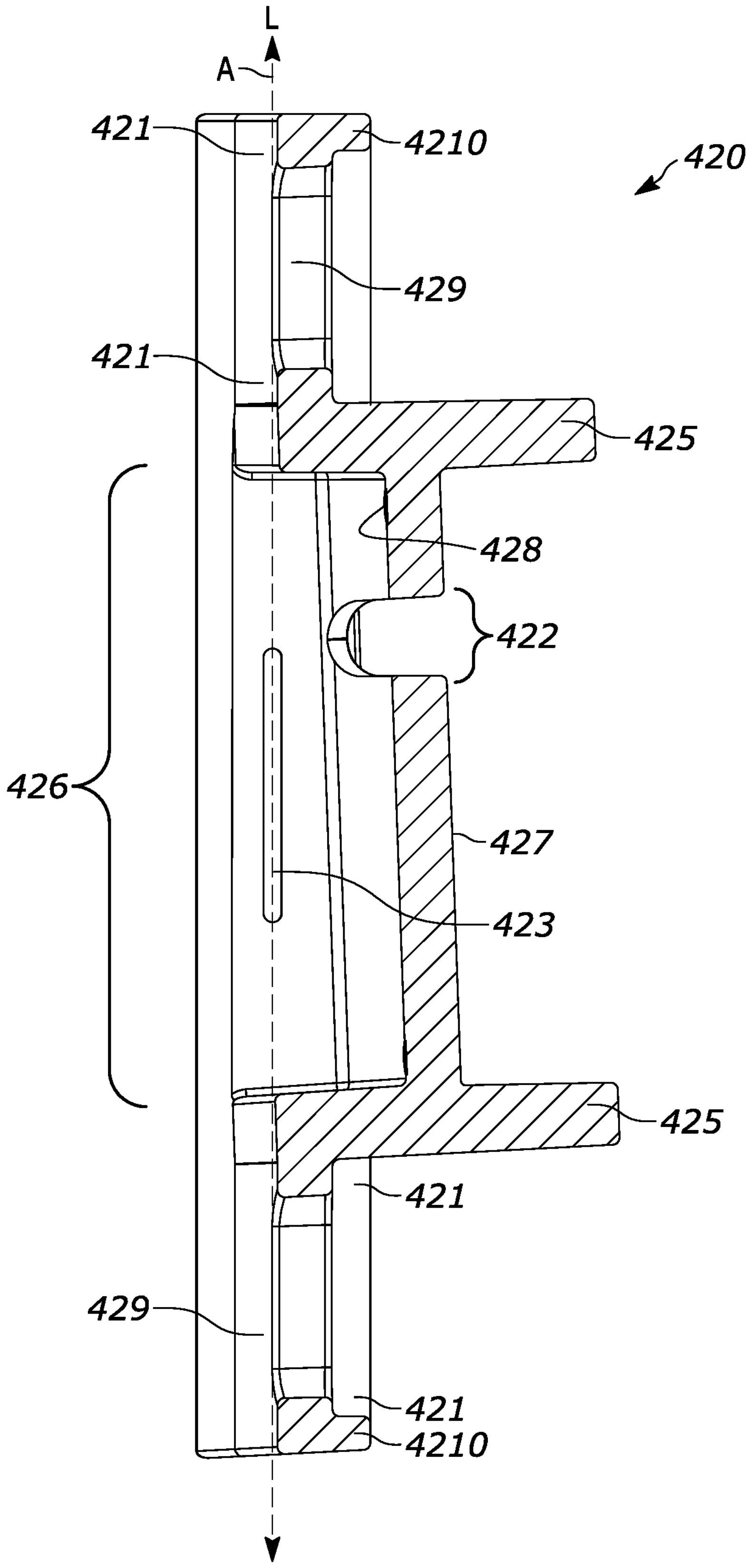
FIG. 30 illustrates a section view of the base plate shown in FIG. 29, the section taken across line A-A of FIG. 28.

FIG. 29 illustrates a side view of the pivot base 420 of a mounting bracket assembly 400 according to various arrangements. FIG. 30 illustrates a section view of the pivot base 420 shown in FIG. 29 taken across the line A-A shown in FIG. 28. In these figures, the pivot base 420 is shown with three areas along the length of the plate. Areas 421A, 421B where binding straps contact the pivot base 420 are at the extremities, that is at the ends, one area at each end of the pivot base 420. At each end of the pivot base 420, is a lip 4210, or outward protrusion, which can help retain a binding strap within the groove 421A, 421B. FIG. 30 shows a slot 429 located within each groove 421A, 421B. These slots 429 can be used with fittings, such as nails or screws, to affix the pivot base 420 to a surface, including a light pole. This is an alternate way to secure the banner mounting assembly 400 to a surface and may be used along with one or more binding, straps. Groove 421 A is bounded by a protrusion 425 A on a first side and a lip on a second side, and groove 421B is bounded by a protrusion 425B and a lip in a similar manner.

The pivot base 420 has a central portion 427 on which the pole holder 410 sits when the banner mounting assembly 400 is in use. In other words, the central portion 427 of the pivot base 420 is configured to receive the pole holder 410.

A slot 422 is shown FIGS. 29 and 30. This slot 422 is configured to allow a screw or bolt to pass through and to slide in a direction perpendicular to a longitudinal axis L of the pivot base 420, i.e., within the plane including the X axis. The pivot base 420 has a single axis A about which the screw rotates when the mounting assembly 400 is complete and in use.

The slot 422 corresponds to an opening on the pole holder 410, and the slot 422 in conjunction with a screw or bolt is part of the means for securing the pivot base 420 and the pole holder 410 to each other. The central portion 427 is bounded longitudinally (along the longitudinal axis L) by a pair of protrusions 425A, 425B, with 425A being closer to the slot 422 than 425B. Protrusion 425A bounds the central portion 427 on a first side, and separates the central portion from groove 421A. Protrusion 425B bounds the central portion on a second side, and separates the central portion 427 from second groove 421B.

Protrusions 425A, 425B are sized to prevent any movement of the pole holder 410 along the longitudinal axis L of the pivot base 420, and so the protrusions 425A, 425B allow for the thickness of the pole holder 410. The protrusions 425A, 425B prevent the pole holder 410 on an upper assembly from moving closer toward a pole holder plate on a lower assembly when the banner the assemblies are supporting experiences wind forces. In other words, the protrusions 425A, 425B maintain the movement of the pole holder 410 to only substantially about the single axis A and help to maintain the biases of the banner poles that are attached to each pole holder 410 when a pair of mounting assemblies 400 are supporting a banner, and thus preventing undesirable deformation in the banner.

FIG. 30 shows a cavity 426 in the central portion 427. This cavity 426 is shaped like a half-cylinder, split along its length. The slot 422 allows a screw or bolt 440 to contact the surface 428 of the cavity. As is shown in other figures, a screw or bolt 440 may contact the cavity surface 428 with the aid of a curved washer or via a component that is integrated into the screw or bolt.

The pivot base 420 of FIGS. 29 and 30 also includes a slot or channel 423 located in the area of the central portion 427, adjacent to the cavity 426. This slot 423 is configured to accept a temporary binding strap (e.g., the hook and loop strap 248 discussed above).

Figure 31:
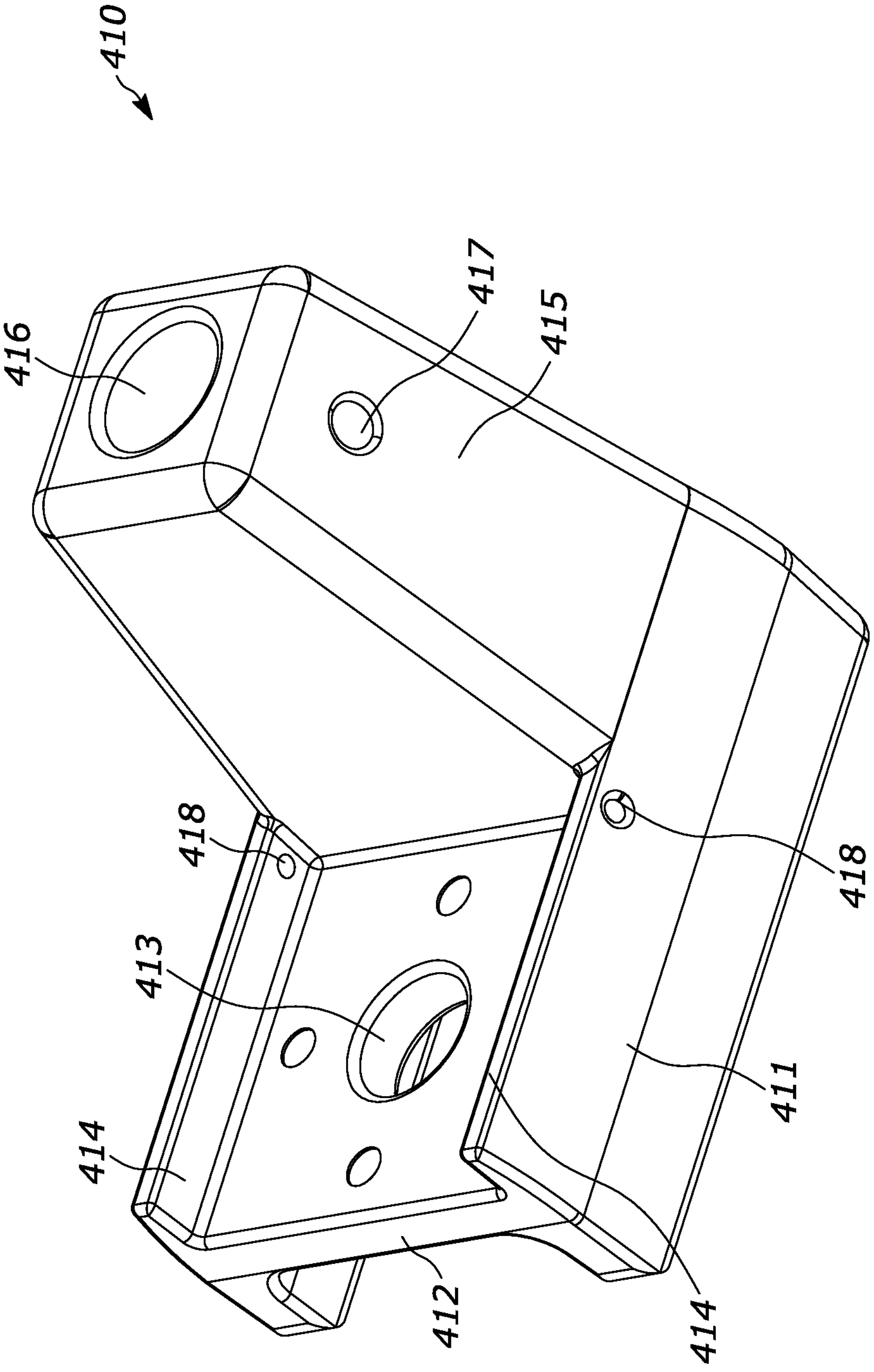
FIG. 31 illustrates a perspective view of a pole holder plate of a mounting bracket assembly according to various arrangements.

FIG. 31 illustrates a perspective view of the pole holder 410 of a mounting bracket assembly 400 according to various arrangements. The pole holder 410 includes a pole holder support (e.g., pole holder portion) 415, a surface 411 that contacts the base plate, a pair of side walls 414, an aperture 413 through which the screw or bolt 440 passes when the mounting bracket assembly 400 is assembled, an opening or hole 416 configured to receive a banner pole, an opening 417 through the pole holder support 415, and one or more openings 418. Each opening 418 passes through a sidewall 414. The pole holder support 415 has a truncated pyramid shape, with a square or trapezoidal base tapering to a square where the opening 416 is located. The opening 416 includes a hole configured to receive the end of a banner pole and has a diameter sized to accommodate commonly used banner poles. The depth of the hole associated with opening 416 is sufficient to ensure that the banner pole will transfer force from a banner supported by the pole to the banner holder 410 in a way which will cause the banner holder 410 to move from side to side instead of urging the banner pole out of the hole. To help ensure a banner pole does not get pulled out of the hole associated with opening 416, an opening 417 through the pole holder support 415 is configured to accept a pin or rod which would also pass through the banner pole, thus preventing the banner pole from separating from the pole holder support 415. The hole or opening 418 is configured to receive a ring or other fitting which operably connects to the pin or rod that fits in the opening 417. An arrangement for the banner mounting assembly including a quick-release retaining pin is described further and references FIGS. 50-53.

The aperture 413 is sized to tightly surround the screw 440 such that relative movement between the screw 440 and the pole holder 410 is minimal during use. That is to say that the aperture 413 is circular or a rounded square and not a slot that allows side-to-side movement of the screw 440. The screw 440 would be able to move through the aperture 413 during assembly of the banner mounting bracket assembly 400, but would be held in place relative to the pole holder 410 by biasing device 430. Because the screw 440 passes through both the pivot base 420 and the pole holder 410, and because the screw 440 is held in place relative to the pole holder 410, the screw 440 holds the assembly 400 together and works with the springs of the biasing device 430 to allow the assembly 400 to rotate a banner about a light pole. The relative position of the screw 440, the pivot base 420, and the pole holder 410, along with the biasing device 430 is shown in greater detail in FIGS. 32-39.

Figure 32:
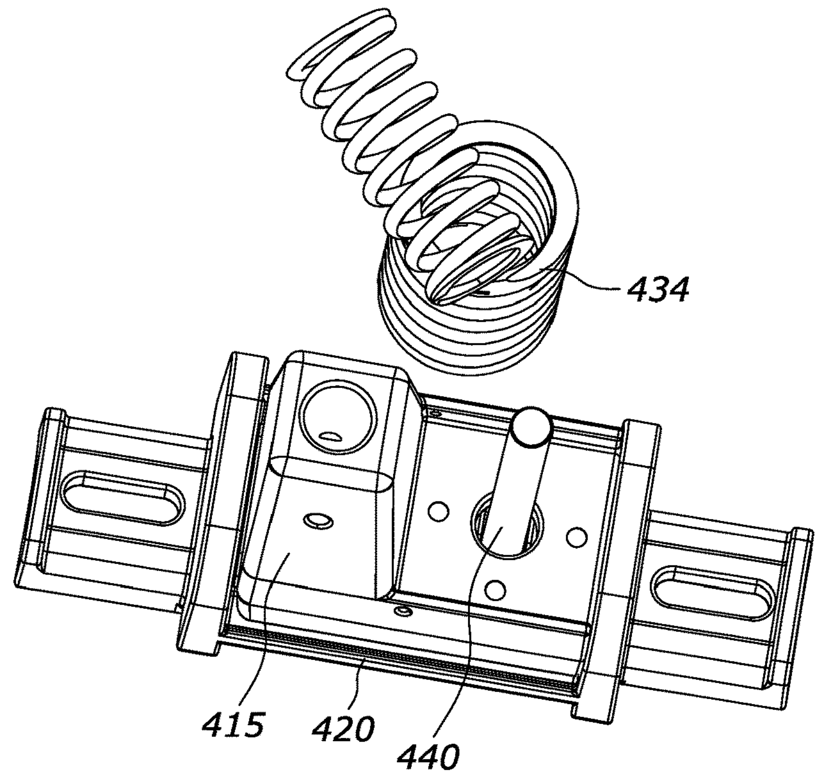
FIG. 32 illustrates the installation of a first, inner spring around a securing screw in a spring assembly of a mounting bracket assembly according to various arrangements.
Figure 33:
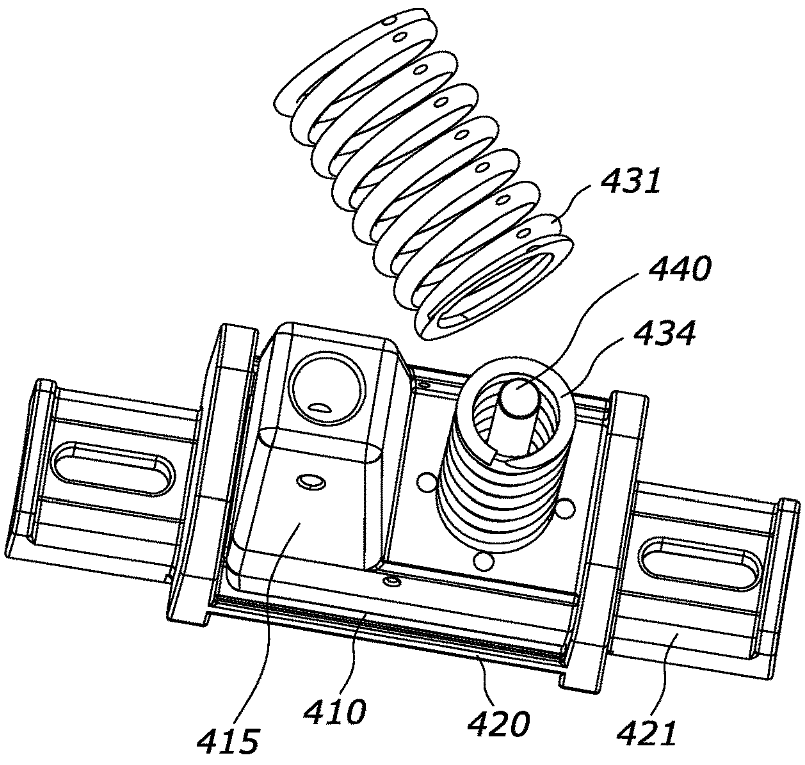
FIG. 33 illustrates a second, outer spring around the first spring and securing screw in the mounting bracket assembly shown in FIG. 32.
Figure 34:
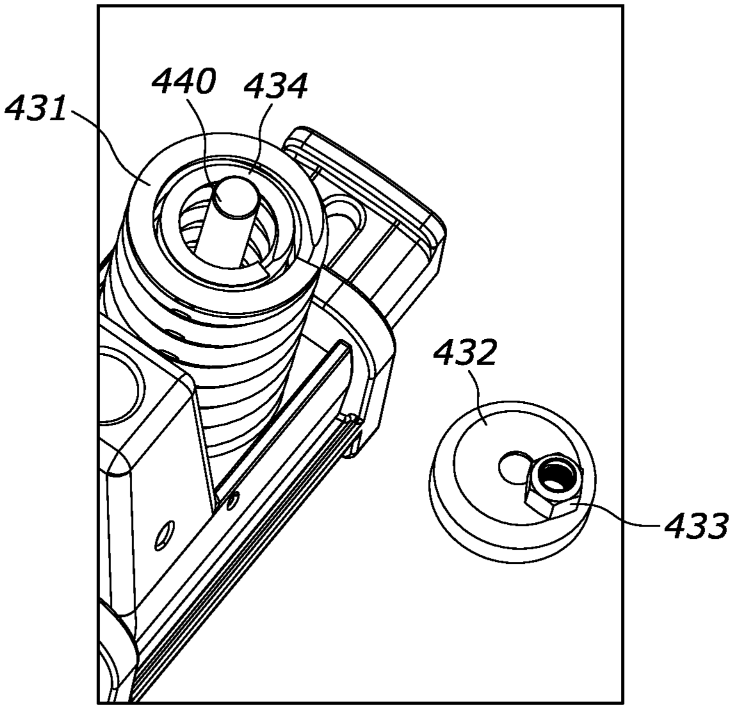
FIG. 34 illustrates a perspective view of the mounting bracket assembly shown in FIG. 43, in which the mounting bracket assembly does not have the spring assembly fully installed.
Figure 35:
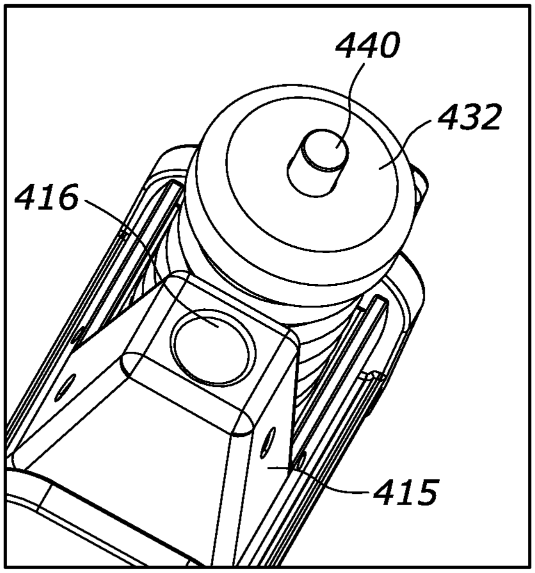
FIG. 35 illustrates the mounting bracket assembly of FIG. 34 with the spring assembly fully installed.

The assembly of the biasing device 430 according to some arrangements are shown in FIGS. 32-35. FIG. 32 illustrates the installation of a first, inner spring 434 around a securing screw 440 in a biasing device 430 of a mounting bracket assembly 400. FIG. 33 illustrates a second, outer spring 431 around the first spring 434 and securing screw 440 in the mounting bracket assembly 400 shown in FIG. 32. FIG. 34 illustrates a perspective view of the mounting bracket assembly 400 shown in FIG. 33, in which the mounting bracket assembly 400 does not have the biasing device 430 fully installed. FIG. 35 illustrates the mounting bracket assembly 400 of FIG. 34 with the biasing device 430 fully installed. A cap washer 432 is shown installed over the springs, with the distal end of the securing screw 440 in the center of the washer 432. The biasing device 430 is located adjacent to the banner pole portion 415. The banner pole holder portion 415 is shown with an opening 416 to a recess that is in the same vertical plane as the screw 440. This biasing device 430 has an inner 434 and outer spring 431 placed coaxially about the securing screw 440 so that should one spring become over fatigued and fail, the other screw in the assembly will help the banner proceed to its predetermined rotational position. The predetermined rotational position may be a position about the single axis A, in the plane containing the X axis of the pivot base 420. The predetermined rotational position of the mounting bracket assembly may be the original position of the banner holder 415 about the street light pole, and the motion of the banner, and in turn the banner holder plate of the mounting bracket assembly about the street light pole may be consider an angular displacement θ degrees of the banner and pole holder 410 of the mounting bracket assembly 400 from the predetermined resting position.

The inner spring 434 and the outer spring 431 may have different materials and mechanical properties, in addition to different sizes. The differences in properties of the inner spring 434 and outer spring 431 may lead one of the springs to fatigue and fail at a faster rate than the other spring. As such, the springs are configured to be redundant to each other in terms of their function to return the pole holder 410 to its predetermined rotational position after deformation or motion of the banner, such as that due to strong wind.

The assembly of the biasing device 430 according to some arrangements are shown in FIGS. 36-39. The biasing device 430 shown in FIGS. 36-39 includes a cylindrical spacer 435 which aids in preventing over compressions of the springs 431, 434, as well as limiting the range of motion of the biasing device 430, and in turn limiting the range of motion of the pole holder 410.

Figure 36:
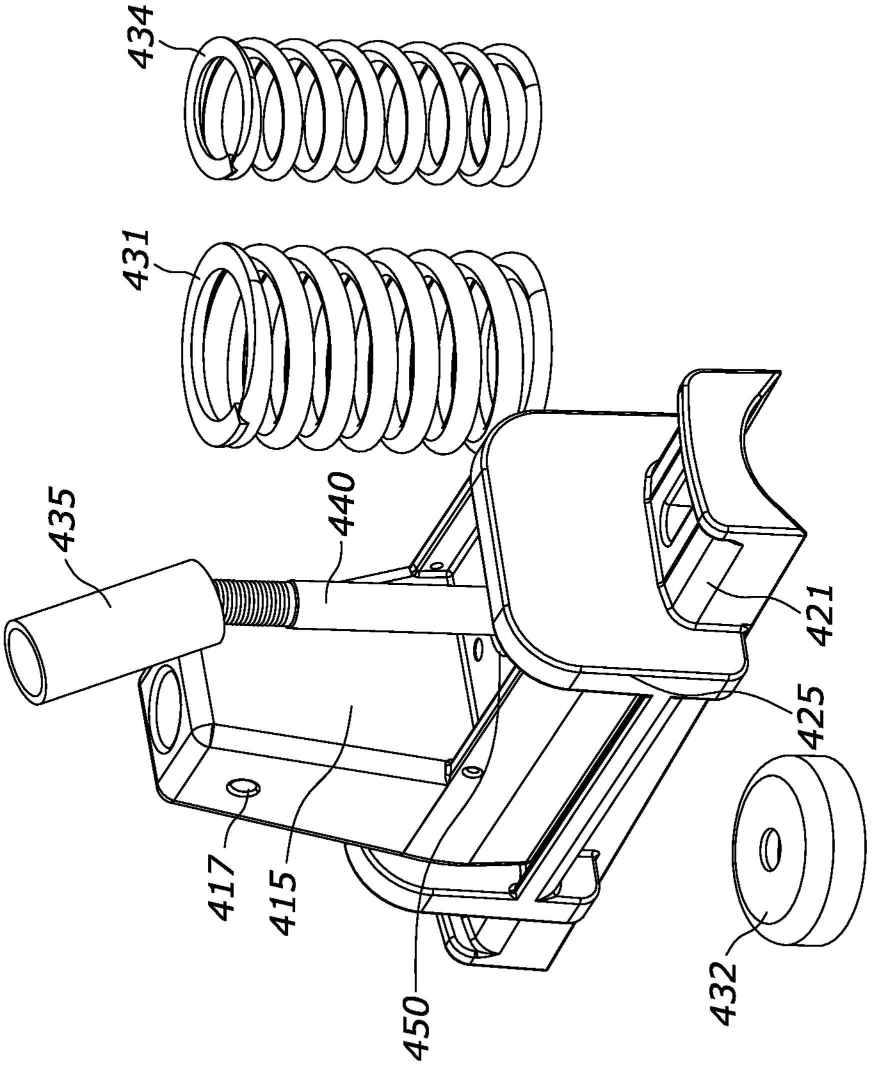
FIG. 36 illustrates installation of a cylindrical spacer on a mounting bracket assembly according to various arrangements.
Figure 37:
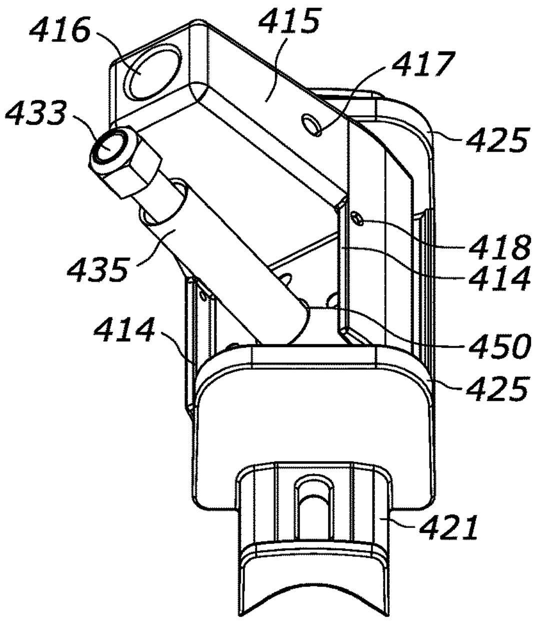
FIG. 37 illustrates the cylindrical spacer shown in FIG. 36 after installation.

FIG. 36 illustrates installation of a cylindrical spacer 435 on the mounting bracket assembly 400. The mounting bracket assembly is shown with the banner holder 410 mated with the pivot base 420. The pivot base 420, as shown, includes the protrusions (e.g., walls) 425A, 435B which, as discussed above, limit the pole holder 410 to rotating around the single axis. The bracket assembly is also shown with screw 440 over which the cylindrical spacer 435 is fitted. FIG. 36 shows the components of the assembly 400. Springs 434, 431, as well as a cap washer 432, are shown adjacent to the assembly 400 in FIG. 36. FIG. 37 illustrates the cylindrical spacer 435 shown in FIG. 32 after installation. FIG. 37 further includes a lower washer 450 at the base of the screw 440, sitting under the cylindrical spacer 435. A nut 433 is shown mated to the threaded portion of the screw 440. Various openings 416, 417, and 418 are also identified in FIG. 37. These openings 416, 417, 418 will be described in greater detail herein below.

Figure 38:
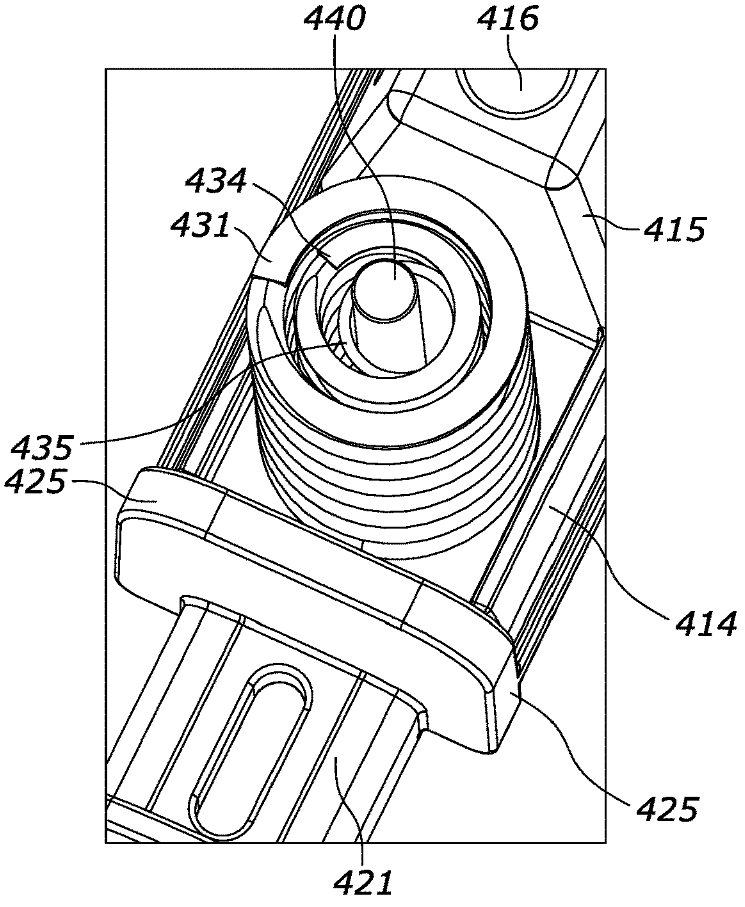
FIG. 38 illustrates a top-down view of a spring assembly of a mounting bracket assembly showing the cylindrical spacer of FIGS. 36 and 37, as well as a securing screw and springs according to various arrangements.
Figure 39:
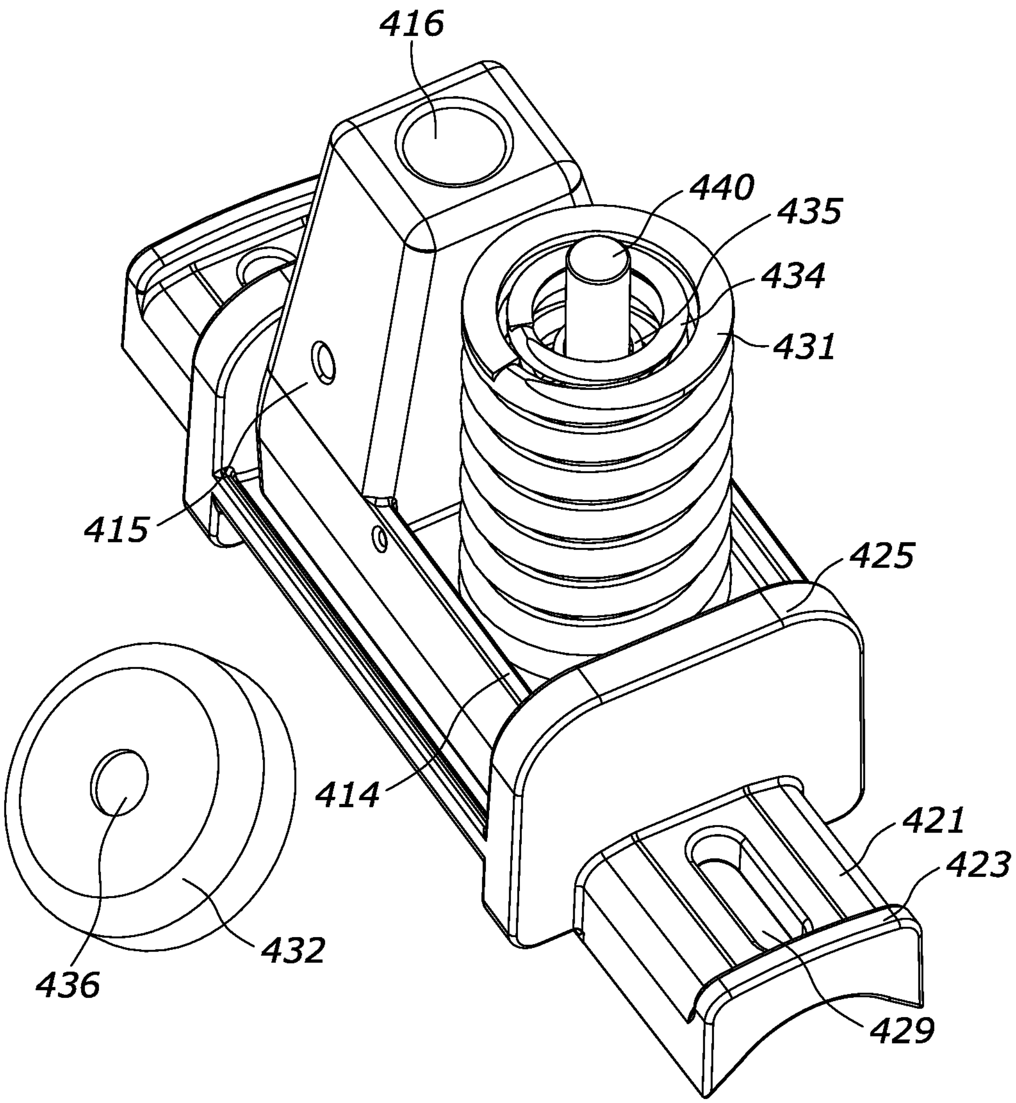
FIG. 39 illustrates a mounting bracket assembly according to various arrangements during installation of a cap washer at the distal end of a securing screw.

FIG. 38 illustrates a top-down view of a biasing device 430 of a mounting bracket assembly 400 showing the cylindrical spacer 435 of FIGS. 36 and 37, as well as a securing screw 440 and springs 431, 434. The securing screw 440, cylindrical spacer 435, and springs 431, 434 are situated coaxially in a position adjacent to the pole holder support 415. FIG. 39 illustrates a mounting bracket assembly 400 according to various arrangements during installation of a cap washer 432 at the distal end of a securing screw 440. The cap washer 432 can be fitted to the threaded distal end of the securing screw 440 until the springs 431, 434 keep the pole holder 410 tight against the pivot base 420, such that the pole holder 410 moves across an upper surface of the pivot base 420 when in use, for example, when an attached banner sways. The cylindrical spacer 435 is of a length that limits the compression of the springs 431, 434. This means that the cylindrical spacer 435 is shorter than the uncompressed length of the springs 431, 434. The length of the cylindrical spacer 435 may be selected to prevent compression of the springs 431, 434 beyond a predetermined percentage of the uncompressed length of the springs. Alternatively, or additionally, the length of the cylindrical spacer 435 may be selected to limit the side to side motion of the biasing device 430. That is to say the cylindrical spacer 435 may limit the rotation of the banner pole holder 410 about the single axis A when the mounting assembly 400 is in use. A longer cylindrical spacer 435 will be more restrictive of the compression of the springs 431, 434, and thus prevent rotation of the banner pole holder 410 beyond a predetermined amount. Reduction of the length of the cylindrical spacer 435 allows for greater compression of the springs 431, 434, and in turn greater rotation of the banner pole holder 410.

Figure 40:
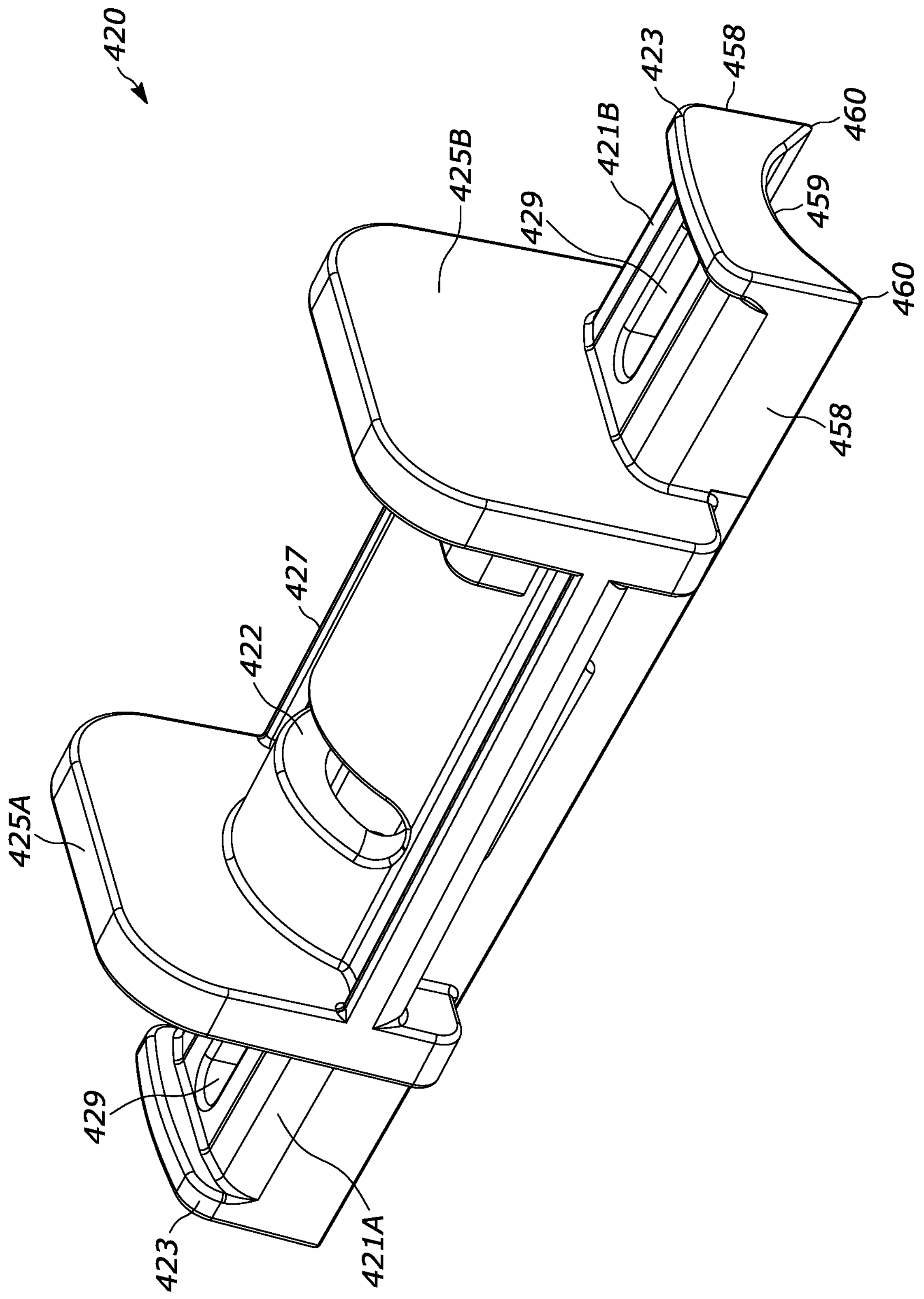
FIG. 40 illustrates a perspective view of a base plate of a mounting bracket assembly according to various arrangements.

FIG. 40 illustrates a perspective view of a pivot base 420 of a mounting bracket assembly 400 according to various arrangements. The pivot base 420 includes grooves 421 configured to accept securing bands for affixing the pivot base 420 to a light pole. In use, the pivot base 420 is affixed to a light pole after a pole holder plate 415 is connected to the base plate via a securing screw 440 and a biasing device 430. The pivot base 420 also includes a center portion 427 that is bounded by protrusions (e.g., walls or raised portions)

425A, 425B. The grooves 421A, 421B are each bounded by a protrusion 425A, 425B on one side and a retaining portion 4210A, 4210B. The center portion 427 is separated from first groove 421A by first protrusion 425A and from second groove 421B by second protrusion 425B. 425A being closer to the slot 422 than 425B. The pivot base 420 has a retaining portion 4210A, 4210B at each extremity. The center portion 427 of the pivot base 420 includes a slot 422 through which a securing screw 440 passes to connect the pivot base 420 to the banner pole holder 410 when the banner mounting bracket assembly 400 is in use.

The pivot base 420 shown in FIG. 40 also has sharp edges 460. The sides 458 of the pivot base 420 along the length of the plate are substantially straight. The underside 459 of the pivot base 420 as shown in FIG. 40 is curved. Sharp edges 460 are formed where the curved underside 459 meets the sides 458 of the pivot base 420. Each of the sharp edges 460 has an angle between one of the sides 458 of the pivot plate to the underside 459 of the pivot plate of 50 degrees or less. These sharp edges 460 are further shown and described with respect to function and configuration in FIGS. 41-44 and the associated paragraphs of description.

Figure 41:
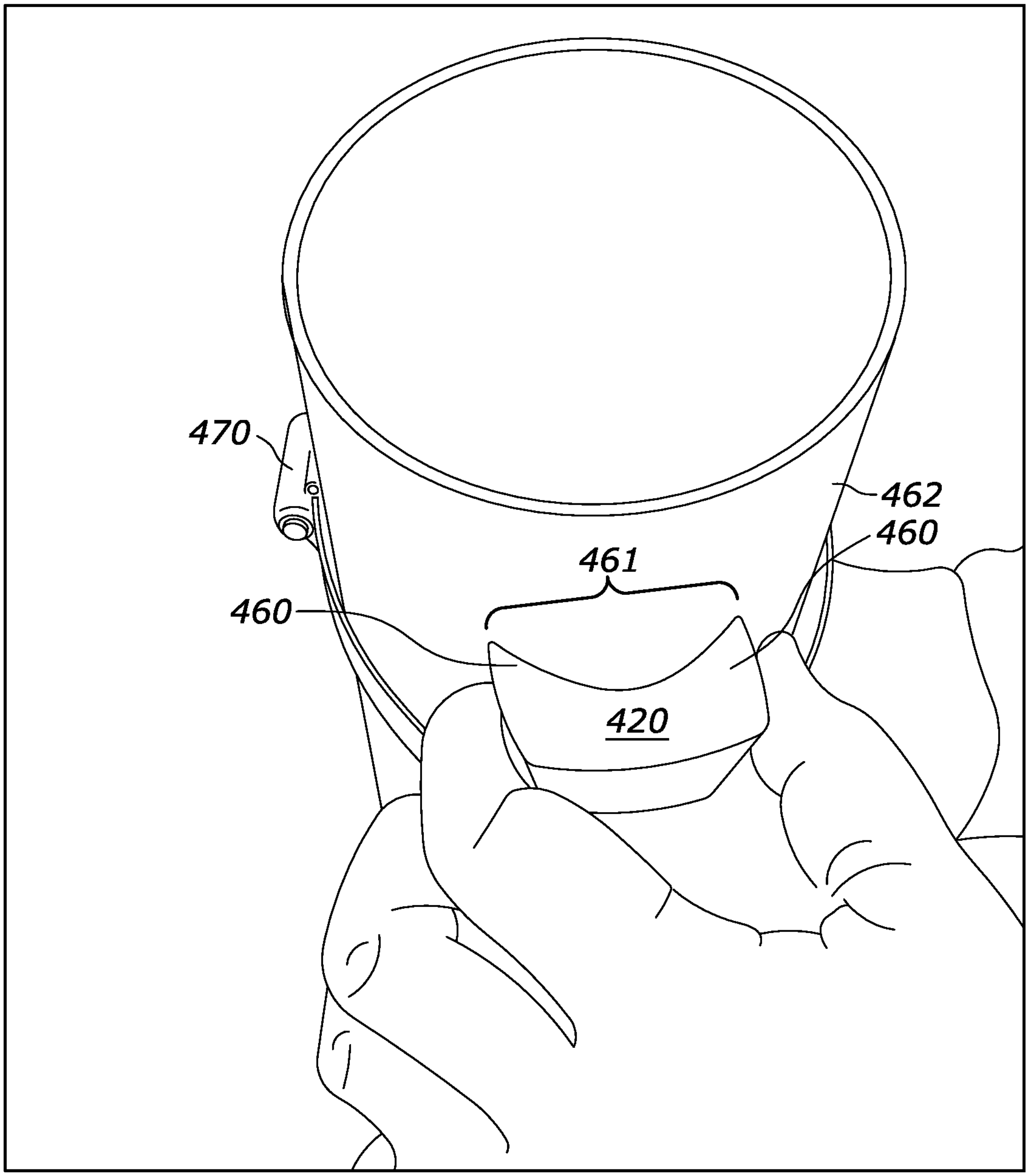
FIG. 41 illustrates a perspective view of a base plate, similar to that shown in FIG. 35, secured to an exemplar pole with metal straps according to various arrangements.

FIG. 41 shows the pivot base 420 attached to a tube 461 that is standing in for a street light pole. The pivot base 420 is held in place by mounting straps 470. The sharp edges 460 of the pivot base 420 are in contact with the tube 461 (e.g., light pole). When the pivot base 420 is made of a material that is softer than the material of the light pole, the sharp edges 460 of the base plate may slightly deform to better hold on to the light pole and prevent rotation of the mounting assembly around the pole. When the light pole is made of a material that is softer than that of the sharp edges 460 of the base plate, the sharp edges may indent the light pole, thus preventing rotation of the banner mounting assembly 400. An arched portion 461 of the pivot base 420 separates the sharp edges 460 of the baseplate 420. The arched portion 461 does not usually make contact with a street light pole when the assembly 400 is in use, and the pivot base 420 will remain substantially rigid when the banner mounting assembly is in use.

Figure 42:
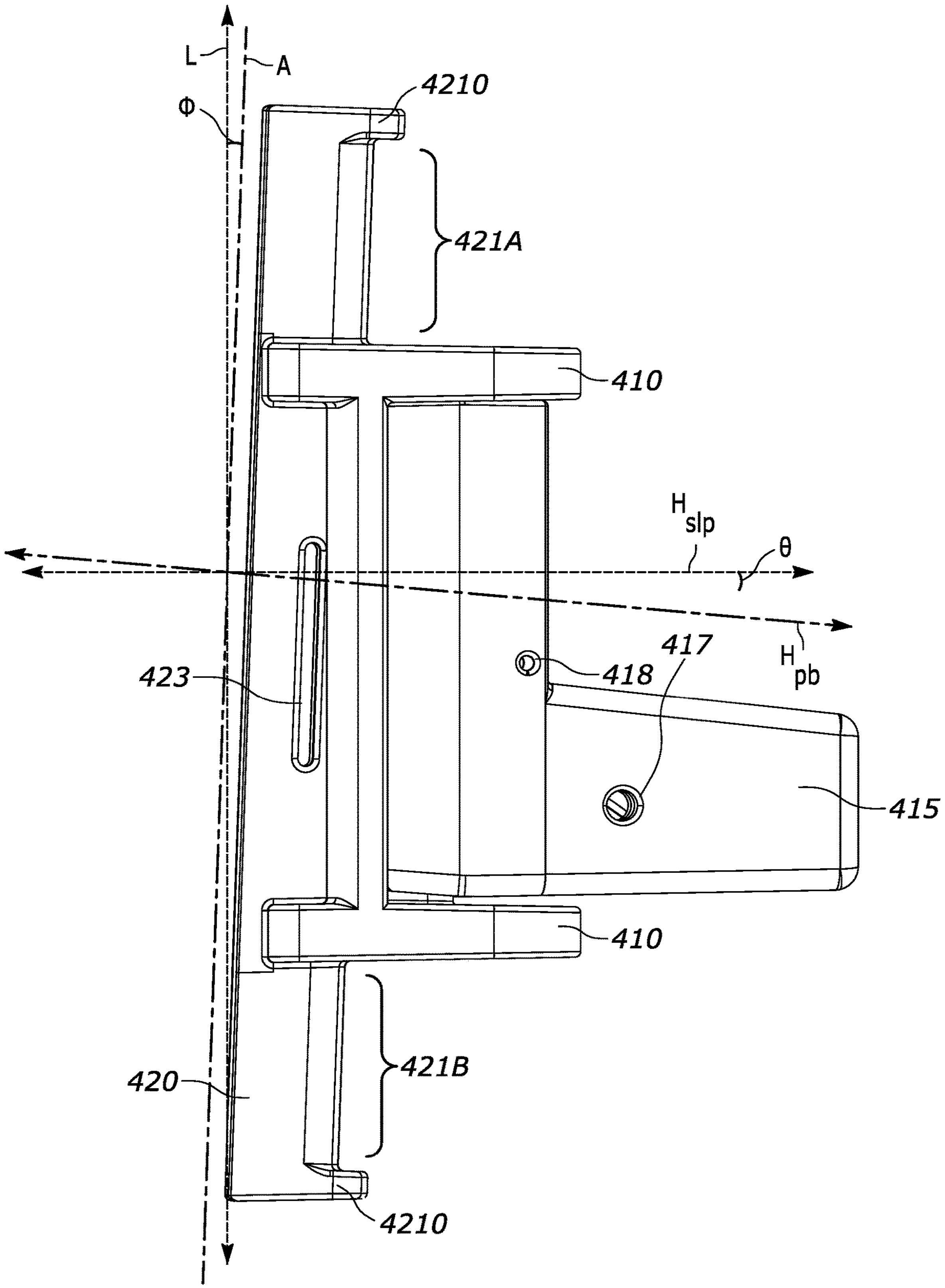
FIG. 42 illustrates a side view of a base plate and a pole holder plate of a mounting bracket assembly according to various arrangements.

In FIG. 42, a side view of a pivot base 420 and pole holder 410 according to some arrangements is shown. The pole holder 410 has a pole holder portion 415, an opening 417 for a pin or post to hold a banner pole in place, and a retaining opening 418. The opening 417 for a pin or post to hold a banner pole in place is situated on the pole holder portion and is configured to accept a pin, narrow screw, post or the like, which would also pass through a banner pole to maintain the position of the proximal end of the banner pole in the pole holder portion 415.

The pivot base 420 of FIG. 42 includes portions (e.g., grooves) 421 configured to accept binding bands when the assembly 400 is attached to a street light pole. These portions, or grooves, 421 are flanked by raised portions 423 of the base plate at the outer edges of the pivot base 420. The pivot base 420 shown in FIG. 42 also includes a slot or channel 423. The slot 423 can accommodate a removeable strap, such as strap made of hook and loop material, that can be used as a temporary binding between the mounting assembly 400 and a light pole while positioning the mounting assembly 400 along the light pole. After finalizing the location of the banner mounting assembly 400 along a light pole, more permanent mounting straps, such as metal bands, may be used in each groove 421 to affix the assembly 400 to the light pole. The removable strap may be left in place or removed once the more permanent mounting straps (e.g., metal bands) are put in place.

In FIG. 42, a vertical line is shown, with one end of the vertical line in contact with the portion of the pivot base 420 that is closest to the banner pole holder portion 415 of the assembly 400. The other end of the pivot base 420 is shown to be separated from the vertical line L. An angle, ϕ is shown to represent the incline of the assembly compared to the surface of a light pole to which the assembly 400 is attached. The angle ϕ may range from 2° to 5°, including from 3° to 4°. In use, a pair of banner mounting assemblies 400 would be used to secure a banner to a street light pole, with a first mounting assembly connecting to a pole that is inserted into an upper seam of the banner and a second mounting assembly connected to a pole which is inserted into a scam at the foot of the banner. The assemblies 400 are mounted so that the banner poles will pull the banner taut, with the upper banner pole being positioned θ° upward of horizontal, and the lower banner pole being positioned θ° downward from horizontal due to the configuration of the pivot base 420 and banner pole holder 410. As seen in FIG. 42, a first horizontal plane $H_{slp}$, perpendicular to the vertical line L (representing the surface of a street light post), and a second horizontal plane $H_{pb}$. perpendicular to the bottom of the pivot base 420, are separated by an angle θ. The angle θ may range from 1° to 5°, such as from 3° to 4°. This angle θ corresponds to the aforementioned positioning of the upper and lower banner poles to pull a banner taut.

Figure 43:
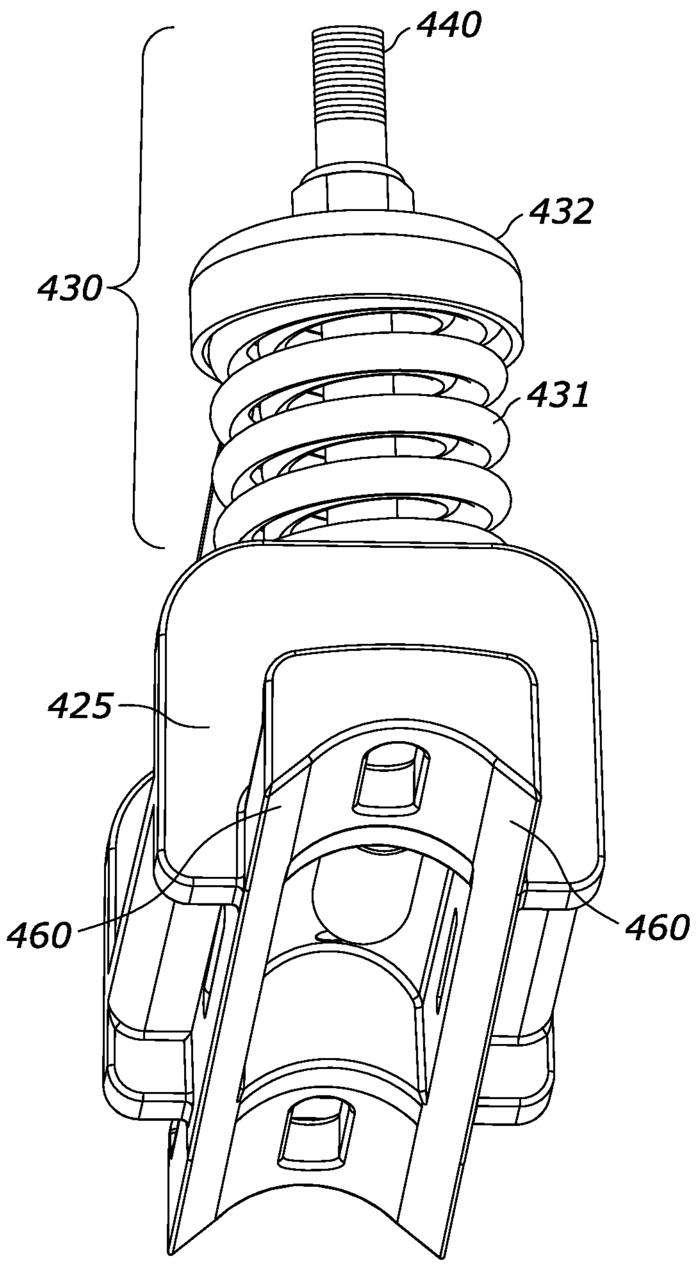
FIG. 43 illustrates a perspective view of a mounting bracket assembly according to various arrangements.
Figure 44:
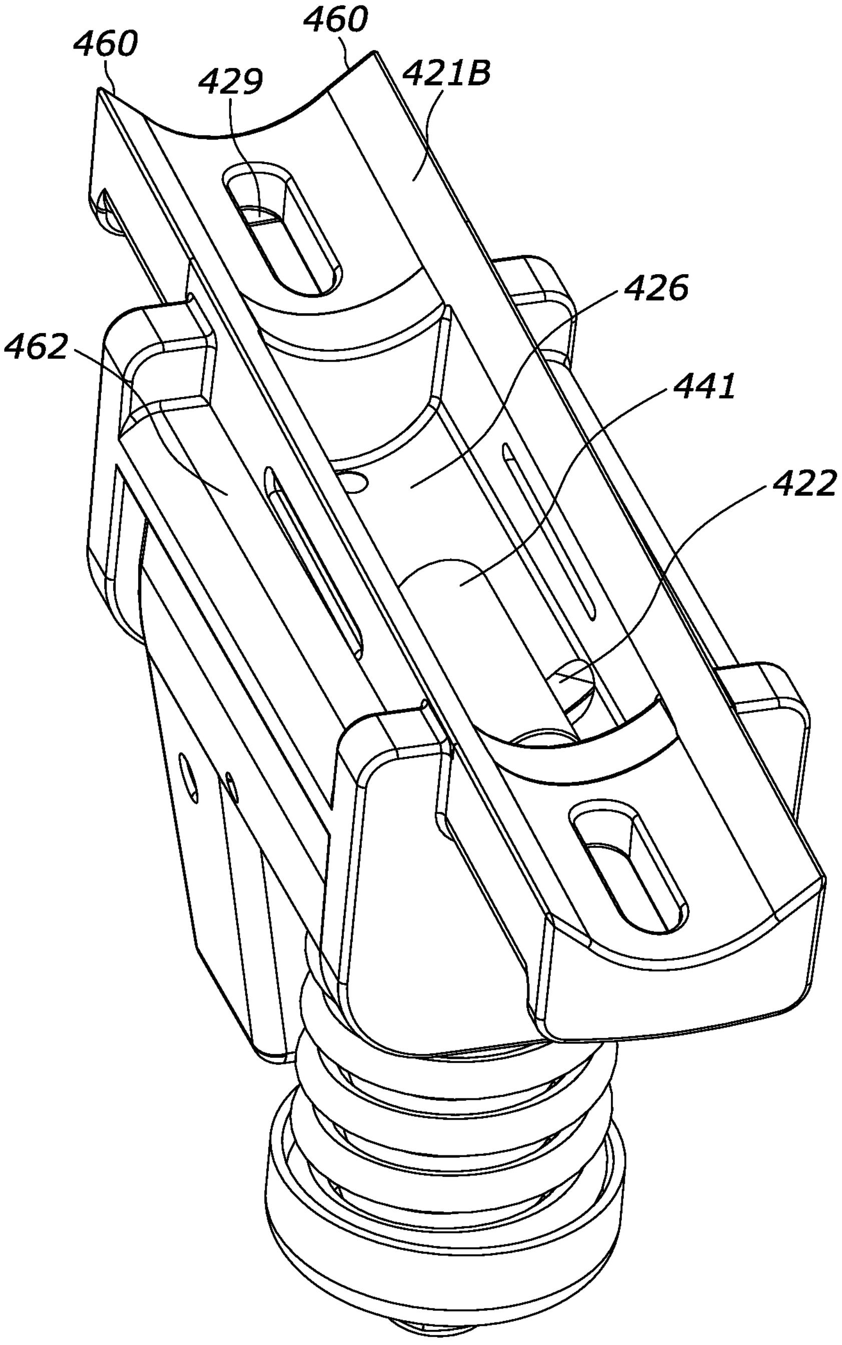
FIG. 44 illustrates a view of the side of the mounting bracket assembly of FIG. 39 which contacts a light pole when the mounting bracket assembly is in use.

Turning to FIGS. 43 and 44, part of a banner mounting assembly 400 is shown in a perspective view, with the pivot base 420 and the pole holder 410 connected by a screw 440 and biasing device 430. The screw 440 and biasing device 430 has a spring 431 surrounding the length of the screw 440. The spring 431 is held in place with a cap washer 432 and a nut (not visible) at the distal portion of the screw 440, that is the portion of the screw 440 which is furthest from the pivot base 420, as seen in FIG. 43. This figure also shows the portion of the pivot base 420 that contacts a street light pole when the assembly is installed or in use. This portion of the pivot base 420 is in arcuate in shape with sharp edges 460 that meet the edges of the base plate at acute angles. These sharp edges 460 aid in the ability of the mounting assembly 400 to remain in substantially the same location respect to the circumference of a light pole when in use. The arcuate portion of the pivot base 420 forms a cavity similar to the cavity 426 in FIG. 30 (in which the sharp edges 460 are not included). The cavity of FIG. 43 is also shaped like a cylinder portion, similar to a cylinder cut in half lengthwise, with an upper surface along which is along the portion of the pivot base 420 which faces the street light pole when the assembly 400 is in use.

FIG. 44 provides a view of the pivot base 420 and pole holder 410 with the screw 440 in place. The view of the pivot base 420 shown in FIG. 44 allows for examination of the surface of the pivot base 420 which is closest to a street light post when the banner mounting assembly is in use. In this view, the portion of the screw 441 which contacts the rear portion of the base plate along the upper surface of the cavity 426 is shown. This proximal portion 441 of the screw (i.e., the portion of the screw closest to the base plate and the light pole when the assembly is in use) is a cylindrical bar which is aligned along the longitudinal axis of the pivot base 420. The screw's proximal end terminates in a "T" shape, with the long part of the T being the length of the screw and cross portion being the cylindrical bar 441 shown in FIG. 44. This figure shows that the cavity 426 in which the cylindrical bar 441 is situated includes a slot 422 along which the screw 440 slides when wind pushes an attached banner and in turn pushes the pole holder 410 in a direction around a single axis A that is parallel to the longitudinal axis L of the banner mounting assembly 400. The single axis A may be offset from the longitudinal axis of an attached street slight pole by ϕ degrees, where the angle ϕ may range from 2° to 5°, including 3° to 4°.

Figure 45:
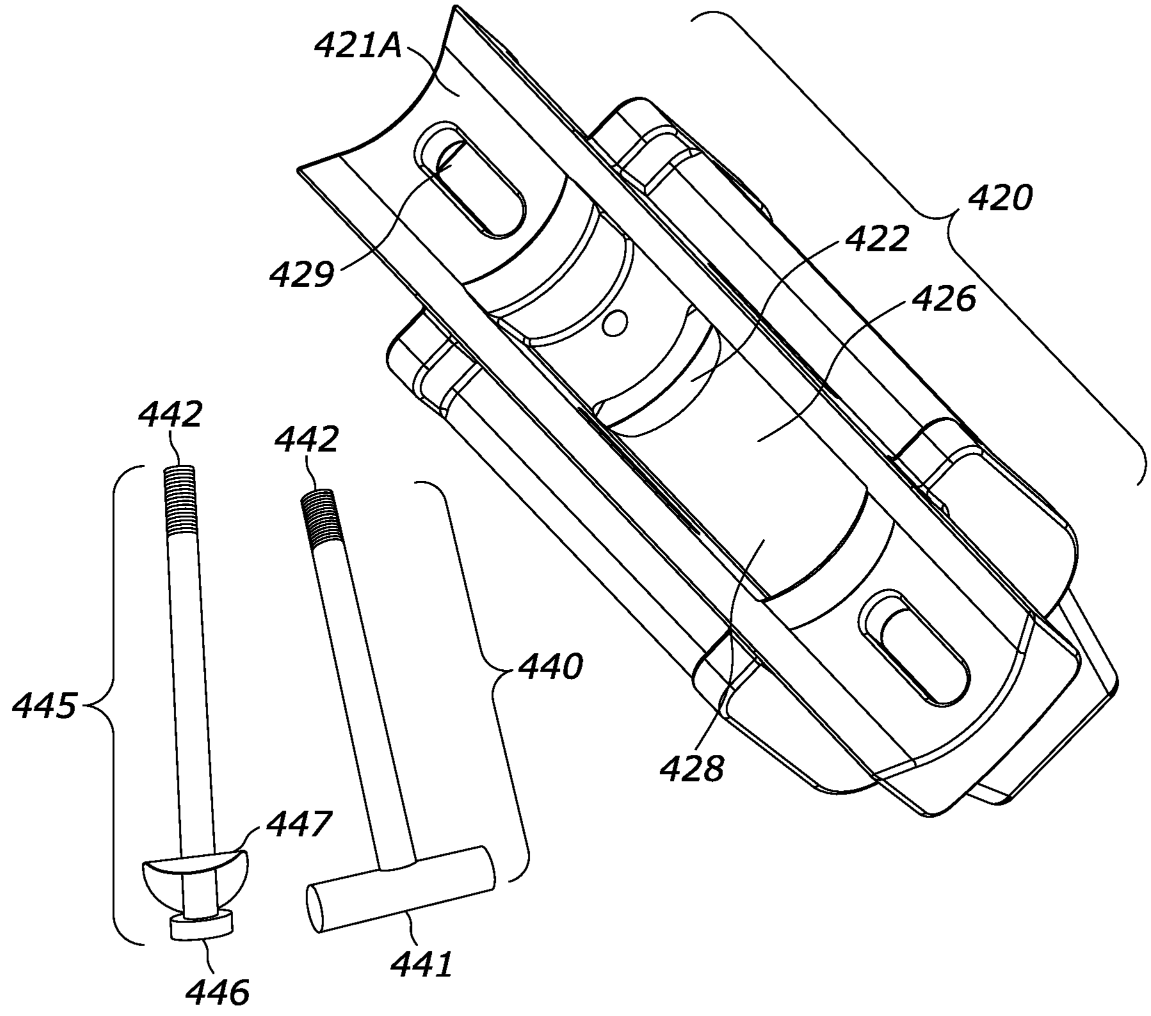
FIG. 45 illustrates possible configurations for a securing screw for use with a mounting bracket assembly according to various arrangements.

Referring now to FIG. 45, possible configurations for a securing screw 440 for use with a mounting bracket assembly 400 are shown. The pivot base 420 with the features discussed with respect to FIG. 44 is also shown in FIG. 45. A first configuration of a securing screw is the screw 440 shown in FIG. 45. This screw 440 has a proximal end that has a "T" shape 441 and a threaded distal end 442. The "T" shaped screw 440 was described with respect to FIG. 40. A second configuration of a securing screw is the screw 445, with a proximal end 446 and a threaded distal end 442. This second configuration screw 445 utilizes a conventionally shaped screw with a bolt shaped head at the proximal end 446. The screw 445 is used in conjunction with a washer 447 that has been deformed into a saddle shape such that the rounded (i.e., bent or deformed) washer 447 can slide along the rounded cavity 426 of the pivot base 420.

While shown as a cylindrical bar in FIGS. 44 and 45, the portion of the screw which contacts the rear of the base plate may be a half cylinder or any shape suitable to smoothly move along the rear surface of the base plate within the cavity 426. An advantage of the "T" shape of the proximal end of the screw is that when tightening the nut at the distal end of the spring and screw assembly, the portion of the screw within the cavity will not completely rotate. This resistance to rotation by the screw allows for adjustment of the pivoting device 430 even while the assembly 400 is installed.

Figure 46:
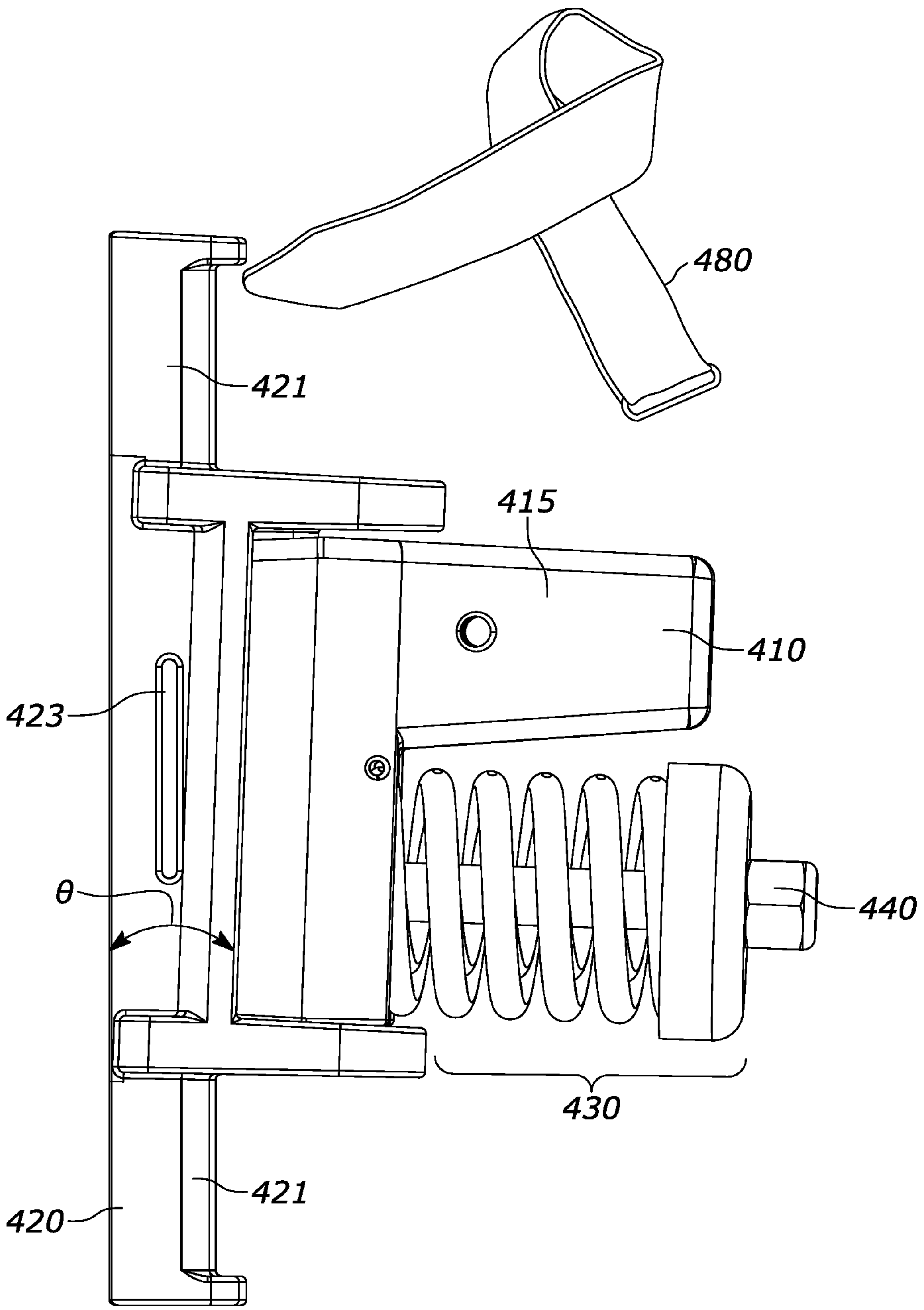
FIG. 46 illustrates a mounting bracket assembly with a fitting strap according to various arrangements.
Figure 47:
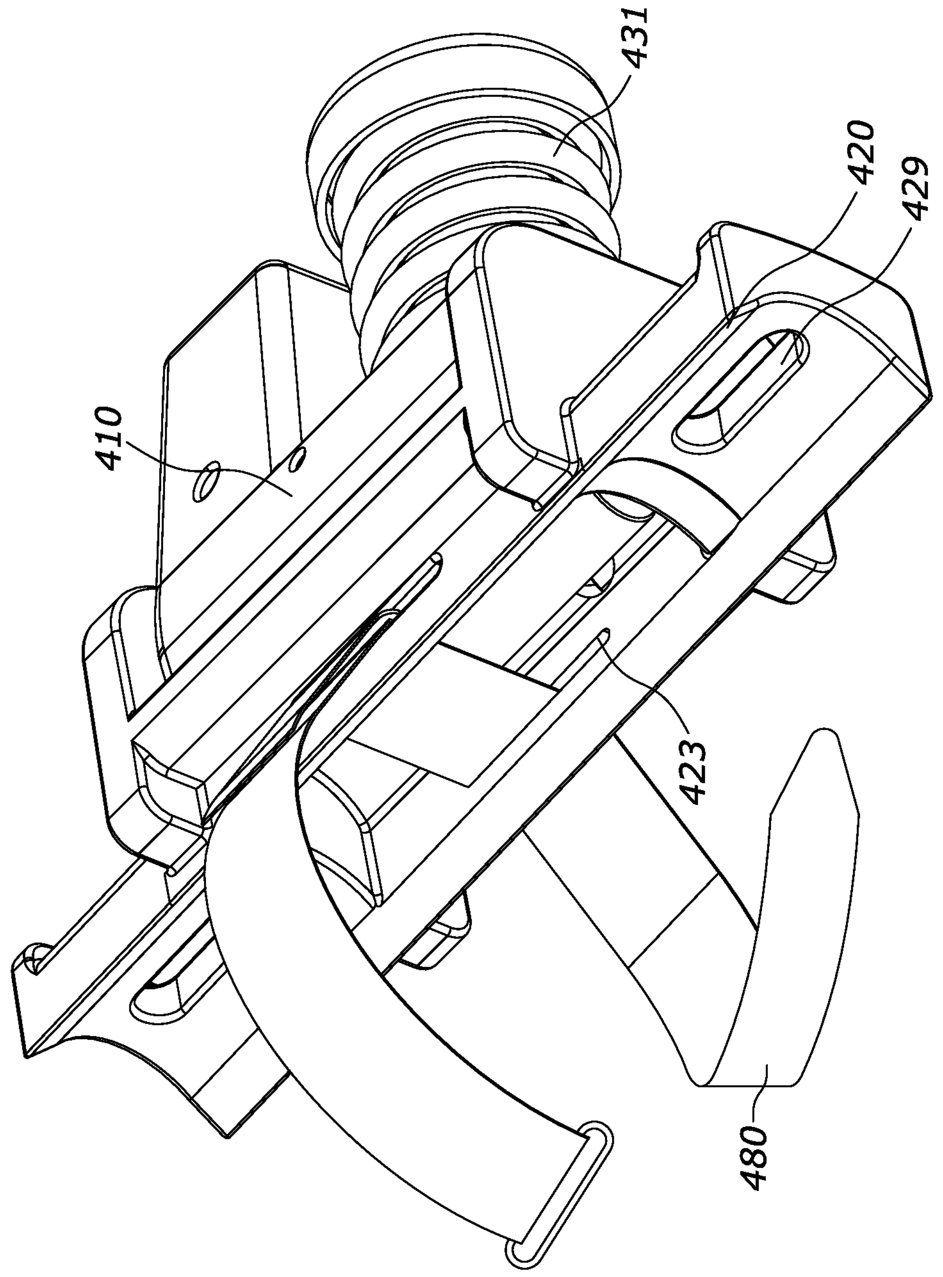
FIG. 47 illustrates the mounting bracket assembly shown in FIG. 46 with the fitting strap inserted through slots in the base plate of the mounting bracket assembly.

FIG. 46 illustrates a mounting bracket assembly 400 with a fitting strap 480 according to various arrangements. The mounting bracket assembly includes a pole holder 410, a pivot base 420, a biasing device 430, and a connecting screw 440. The pole holder 410 includes a pole holder portion 415. The pivot base 420 includes a slot or channel 423 configured to accommodate the fitting strap 480. The slot 423 is oriented with its length generally parallel to the base of the pivot base 420. The slot 423 would also be oriented with its length generally parallel to the vertical axis of a light pole to which the assembly is attached. The top surface of the central portion 427 of the pivot base 420 is oriented at an angle ϕ° from the bottom portion of the pivot base 420. This offset of ϕ° biases a banner pole attached to the mounting bracket assembly 400 in a manner that keeps a banner taut when the banner is attached by a pair of mount bracket assemblies to a light pole. FIG. 47 illustrates the mounting bracket assembly 400 shown in FIG. 46 with the fitting strap 480 inserted through slots 423 in the pivot base 420 of the mounting bracket assembly 400.

Figure 48:
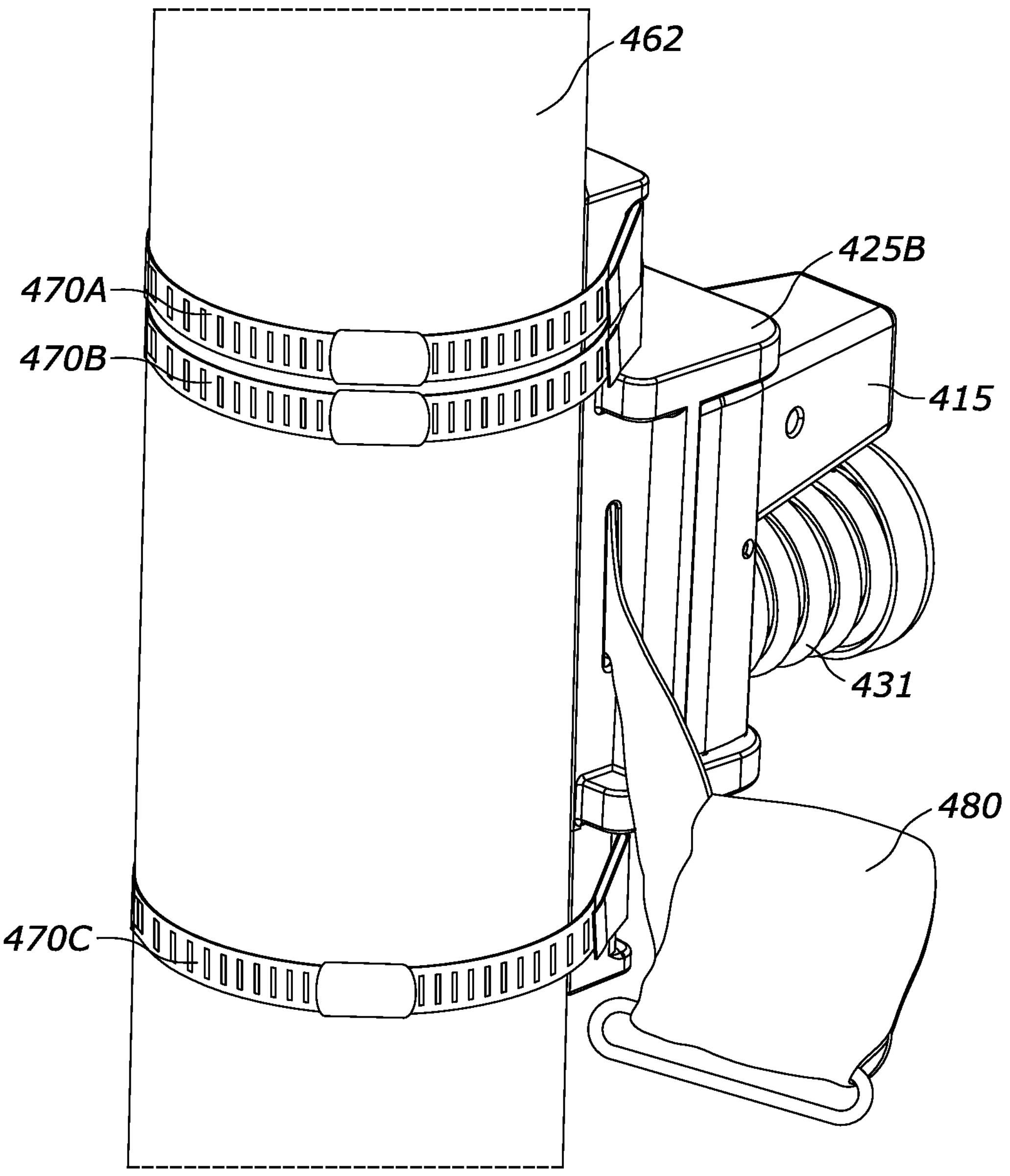
FIG. 48 illustrates a mounting bracket assembly, according to various arrangements, installed on a pole with a fitting strap shown inserted through slots in the illustrated mounting bracket assembly, according to various arrangements.

FIG. 48 illustrates a mounting bracket assembly 400, according to various arrangements, installed on a pole 462 with a fitting strap 480 shown inserted through slots 423 in the illustrated mounting bracket assembly 400, according to various arrangements. The pole holder support 415; a larger, outer spring 431; and protrusions (e.g., walls) 425B (425 is not visible) of the mounting bracket assembly 400 can also be seen in FIG. 48. Metal securing bands (e.g., mounting straps) 470A, 470B, and 470C encircle both the pole 462 and the mounting assembly 400. The protrusions 425A, 425B hold the pole holder 410 and the bands 470A, 470B, and 470C in place.

Figure 49:
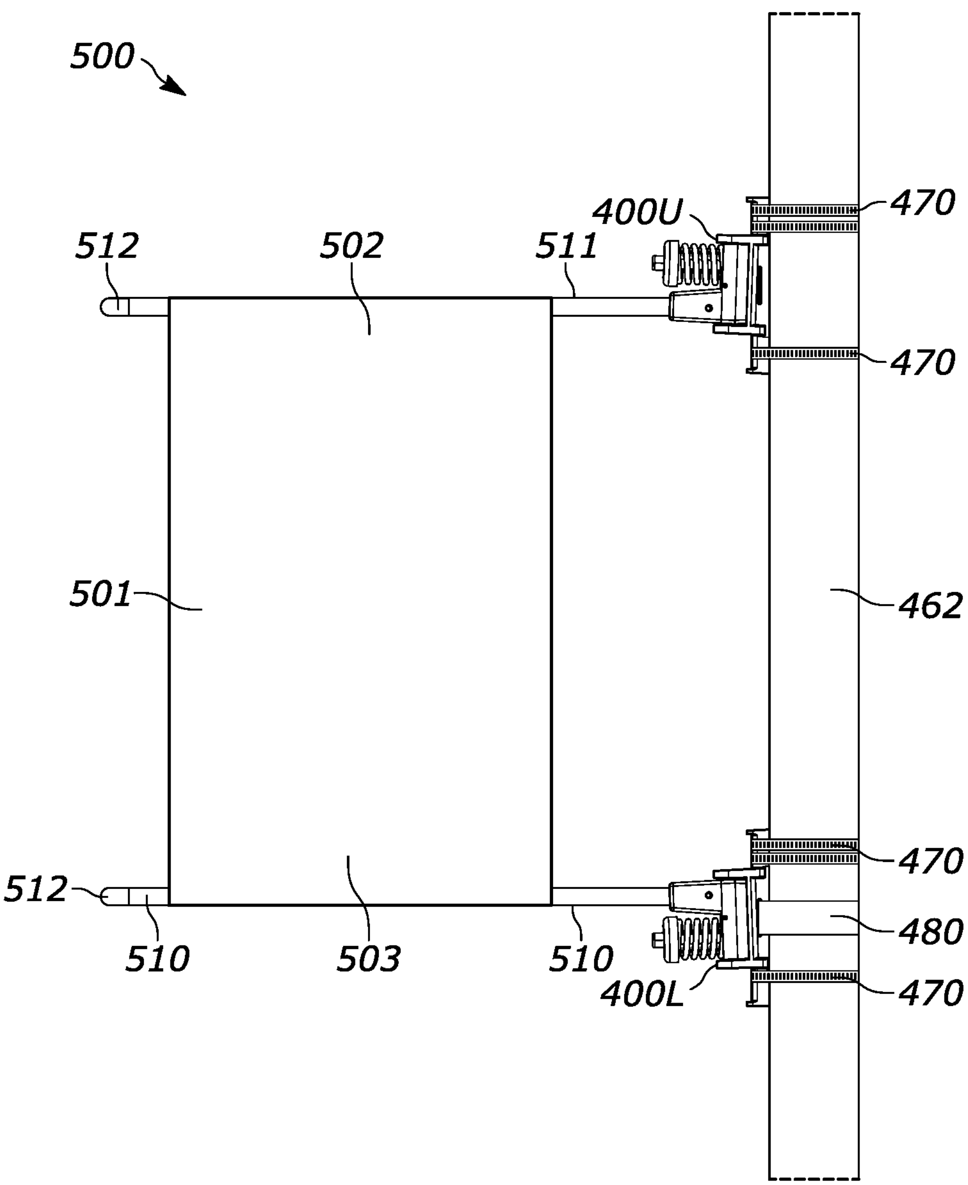
FIG. 49 illustrates a banner connected to a pole employing a pair of mounting bracket assemblies according to various arrangements.

FIG. 49 illustrates a complete pair of banner assemblies 500 with a banner connected 501 to a pole 462 employing a pair of mounting bracket assemblies 400U, 400L according to various arrangements. The banner 501 is held at a top portion 502 by a banner pole 511 with a retaining portion 512 at a distal end of the banner pole 511. The proximal end of the banner pole 511 is attached to a mounting assembly 400U which is held to the pole 462 by securing bands 470. At a bottom portion 503, the banner 501 is held by a banner pole 510 with a retaining portion 512 at a distal end of the banner pole 510. The proximal end of the banner pole 510 is attached to a mounting assembly 400L which is held to the pole 462 by securing bands 470. A fitting strap 480, which is removeable, as shown in FIGS. 47 and 48, is also shown in use with the mounting assembly 400L. It can be seen in FIG. 49 that in a pair of banner assemblies 500, each mounting assembly 400U, 400L are oriented differently. That is to say that for the upper assembly 400U, the biasing device is located above the banner pole, and for the lower assembly 400L, the biasing device is located below the supported banner pole.

Figure 50:
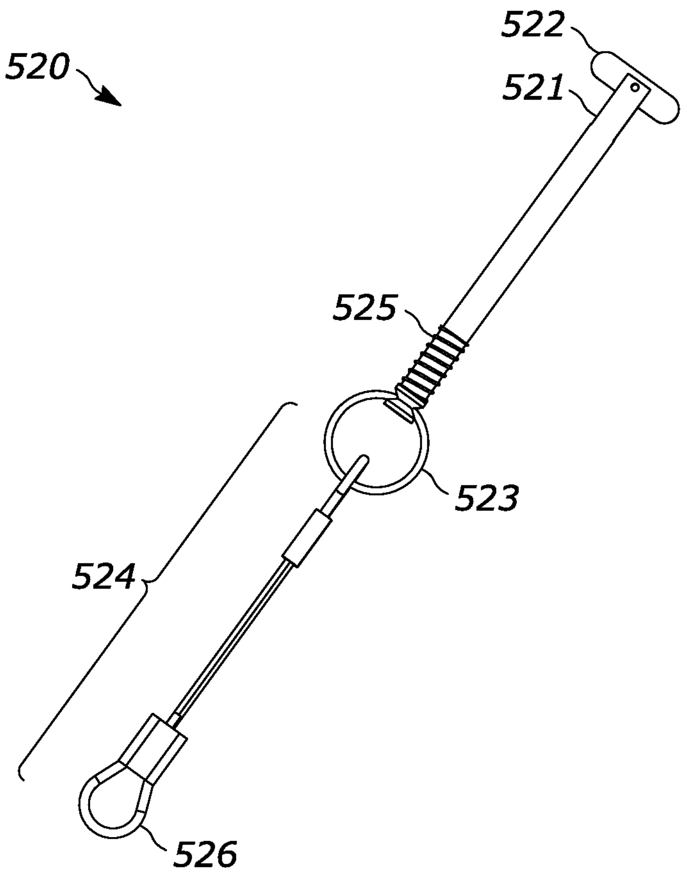
FIG. 50 illustrates a quick-release pin with lanyard according to various arrangements.

FIG. 50 illustrates a quick-release pin 520 with lanyard 524 according to various arrangements. The quick-release pin 520, also known as a detent pin, is a hand operated and non-threaded cylindrical fastener that is quick and easy to operate with a shaft 521, a pivoting end 522, and a spring 525 that pushes against a body into which the pin 520 is inserted so that the pivoting end does not move from a configuration perpendicular to the shaft 521 (which keeps the pin 520 retained) to a configuration in line with the shaft 521 (which allow the pin 520 to become loose, removed from the body into which it was inserted). The quick-release pin 520 includes a ring 523 which is attached to the shaft 521 at the end with the biasing spring 525. The ring 523 is attached to a lanyard 524 which has an eye 526 at another end. The eye 526 can be used to attach the quick-release pin 520 to a body, such as a mounting bracket assembly.

Figure 51:
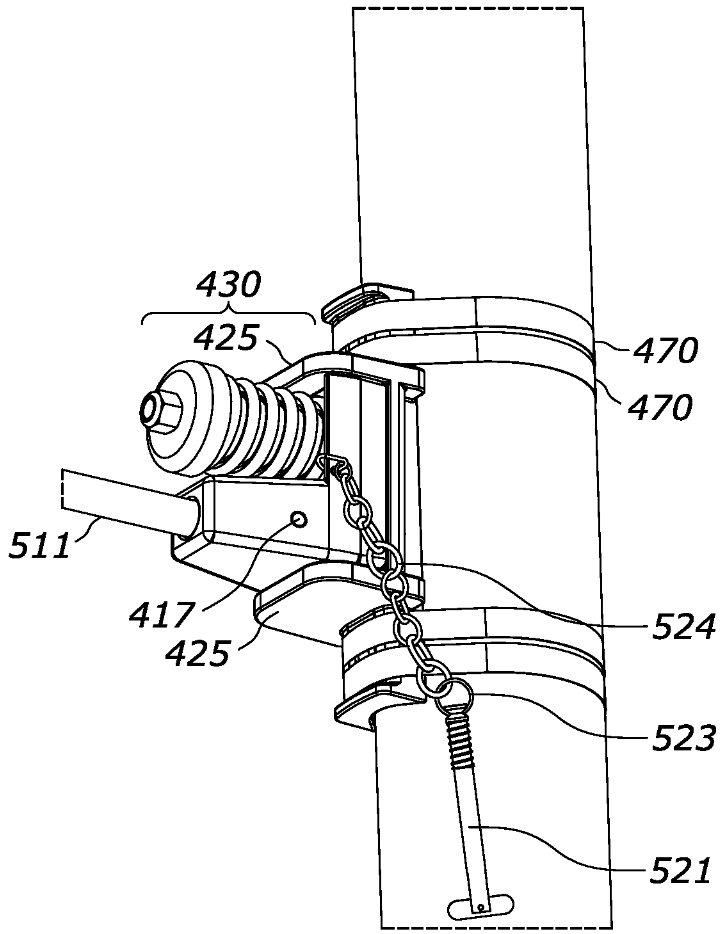
FIG. 51 illustrates a mounting bracket assembly with a connected quick-release pin, according to various arrangements, installed on a model street light pole.
Figure 52:
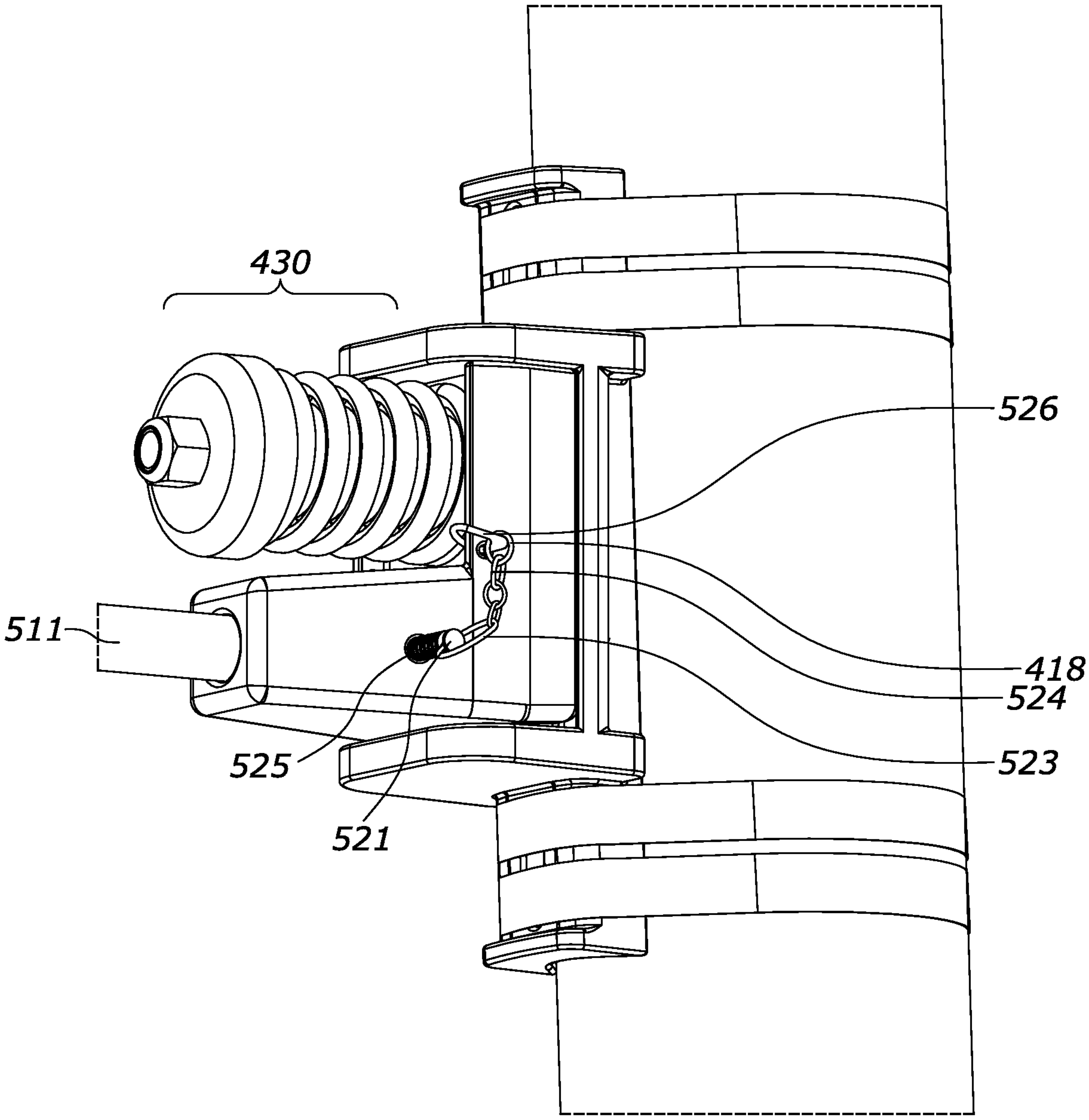
FIG. 52 illustrates the mounting bracket assembly shown in FIG. 51 with the quick-release pin inserted into an opening in the pole holder plate which allows the quick-release pin to insert into an opening through a banner supporting pole with the purpose of holding the banner supporting pole in place, seated in the pole holder.

FIGS. 51 and 52 illustrate a mounting bracket assembly 400U with a connected quick-release pin 520, according to various arrangements, installed on a model street light pole. The mounting bracket assembly 400U includes a biasing device 430 attached to pole holder plate and a base plate with protrusions 425. In FIGS. 51 and 52, the assembly 400U is attached to a pole with securing bands 470.

FIG. 52 shows the quick-release pin shaft 521 inserted into an opening 417 in the pole holder 410 which allows the quick-release pin shaft 521 to insert into a second opening (not shown) through a banner supporting pole 511 with the purpose of holding the banner supporting pole 511 in place. The pin 520 retains the banner supporting pole 511 seated in the pole holder support 415. A ring 523 attached to a lanyard 524 (shown here as a chain of metal links) is attached to a shaft 521 of the quick-release pin 520. The quick-release pin 520 includes a spring 525 that helps to keep the pivoting end 522 (not seen in FIG. 52) against the pole holder portion 415 of the mounting bracket assembly. The lanyard 524 is affixed at an eye 526 to an opening 418 in the mounting bracket assembly.

Figure 53:
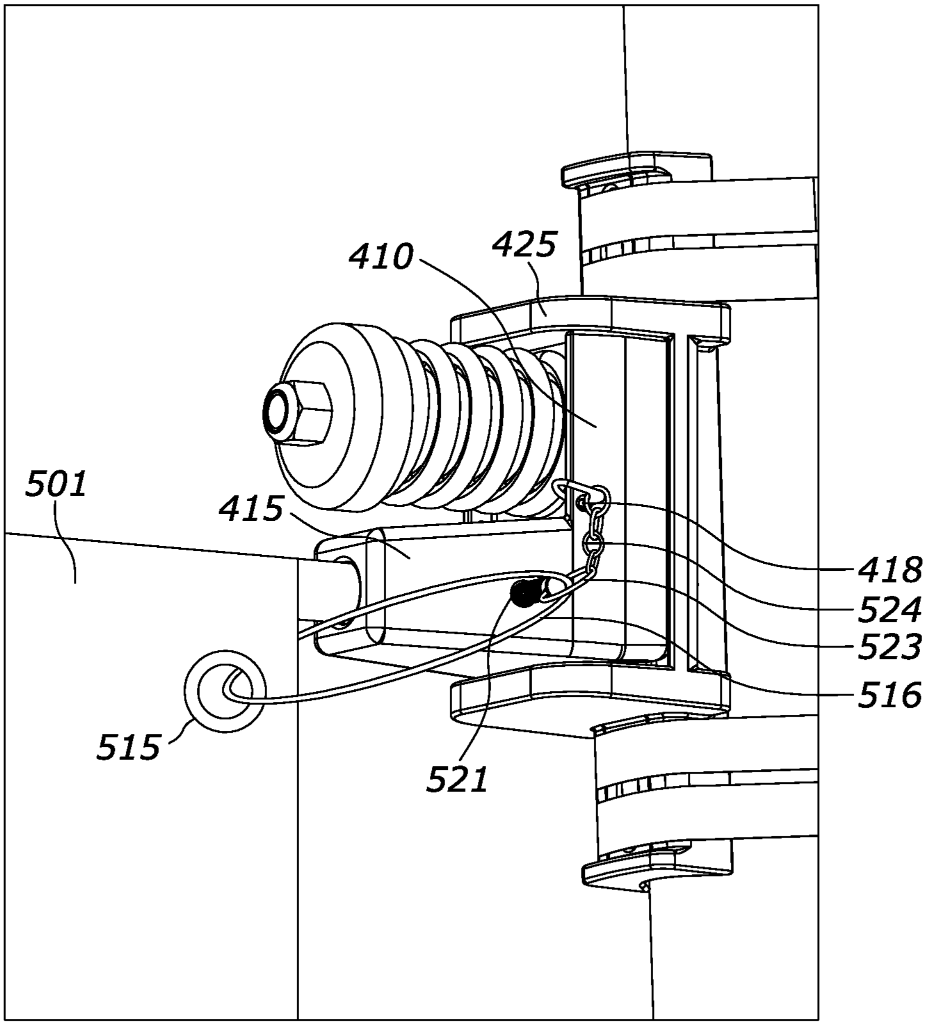
FIG. 53 illustrates the mounting bracket assembly shown in FIG. 52 with a tie that connects a ring of the quick-release pin to a grommet of a banner, according to various arrangements.

FIG. 53 illustrates the mounting bracket assembly (shown as 400U in FIG. 52) with tie 516 that connects ring 521 of the quick-release pin 520 to a grommet 515 of a banner 501, according to various arrangements. While the quick-release pin 520 with a lanyard attached to the mounting assembly 400U is shown with a pivoting end 522, other types of quick-release pins may be used. Also, the lanyard may be braided wire or chain. While the tie used to hold a banner through a grommet to the mounting bracket assembly is shown as a cable tie (e.g., zip tie), other suitable, robust ties may be used, such as nylon line, or line composed of other polymer, a line made of metal or glass reinforced polymer.

Further, a banner may not include a grommet, and when connecting to such a banner, a tie may attach to a banner along a seam of the banner as well to the mounting assembly, such as at a ring of the quick-release pin.

When the assembly is the upper assembly 400U, the biasing device will necessarily be located above the connected banner pole so that the tie 516 can connect the ring 521 and pass through the grommet 515. When the assembly is the lower assembly 400L, the biasing device will be located below the connected banner pole for the same reason.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed is:

1. A mounting bracket for hanging a banner comprising:
a pole holder configured to secure a banner pole;
a pivot base pivotably connected to the pole holder, the pivot base including:
a central portion in which the pole holder is disposed, and
a first protrusion and a second protrusion spaced from the first protrusion along a direction that is parallel to a longitudinal axis of the pivot base, the central portion positioned between the first protrusion and the second protrusion, the first and second protrusions configured to limit movement of the pole holder to rotating only around a single axis; and
a biasing device disposed between the pivot base and the pole holder, the biasing device configured to bias the pole holder to a predetermined rotational position around the single axis.

2. The mounting bracket of claim 1, wherein the biasing device includes one or more springs.

3. A banner mounting assembly comprising:
a pole holder including a pole holder support and an aperture;
a pivot base including a central portion in which the pole holder is disposed, the central portion positioned between a first protrusion and a second protrusion spaced from the first protrusion along a direction that is parallel to a longitudinal axis of the pivot base, the central portion including a slot positioned substantially perpendicular to the longitudinal axis;
a biasing device including a securing screw, the securing screw positioned through the aperture of the pole holder and positioned within the slot of the pivot base such that the pole holder rotates only around a single axis, and springs secured around the securing screw to bias the pole holder to a predetermined rotational position.

4. The banner mounting assembly of claim 3, the securing screw having a T-shape including a short portion configured to move along the underside of the pivot base.

5. The banner mounting assembly of claim 4,
wherein the pole holder further comprises:
a first opening configured to retain an end of a banner supporting pole; and
a second opening configured to accept a quick-release pin, the quick-release pin being configured to pass through an opening in the banner supporting pole and to be retained by a pivoting end of the quick-release pin.

6. The banner mounting assembly of claim 5, wherein the quick-release pin comprises a ring connecting the quick-release pin and a lanyard, further wherein the ring is configured to attach to a tie that attaches a banner to the ring.

7. The banner mounting assembly of claim 3, wherein the pivot base further comprises sharp edges formed between one of a plurality of sides of the pivot base and a curved underside of the pivot base, the sharp edges configured to contact a mounting surface when the banner mounting assembly is in use, each sharp edge having an angle between the one of the plurality of sides of the pivot base and the curved underside that is less than or equal to 50 degrees.

8. The banner mounting assembly of claim 3, wherein the pole holder is constrained by the first protrusion and the second protrusion to ensure that the pole holder rotates only around the single axis.

9. The banner mounting assembly of claim 3, wherein the spring assembly comprises a first spring and a second spring, the first spring and second spring situated coaxially about the securing screw.

10. The banner mounting assembly of claim 9, wherein the spring assembly further comprises a cylindrical spacer, the cylindrical spacer positioned coaxially around the securing screw interior to the first and second springs.

11. The banner mounting assembly of claim 10, wherein the first spring comprises a different material than the second spring.

12. The banner mounting assembly of claim 3, wherein the pivot base further comprises a fitting strap slot located between the central portion of the pivot base and a portion of the pivot base configured to contact a mounting surface when the pivot base is in use, the fitting strap slot configured to accept a fitting strap for use when adjusting a position of a banner mounting assembly along a mounting surface.

13. The mounting bracket of claim 1, wherein the pivot base includes a curved underside and the single axis is a center of rotation of the curved underside.

14. The mounting bracket of claim 1, wherein the pivot base includes sharp edges formed between one of a plurality of sides of the pivot base and a curved underside of the pivot base, the sharp edges configured to contact a mounting surface when the mounting bracket is in use, each sharp edge having an angle between the one of the plurality of sides of the pivot base and the curved underside that is less than or equal to 50 degrees.

15. The mounting bracket of claim 1, wherein the biasing device further comprises a securing screw, and further wherein the pivot base includes a slot is configured to accept a proximal end of the securing screw and the slot is configured to allow a longer portion of the securing screw to pass through for connection to the pole holder.

16. The mounting bracket of claim 1, wherein the biasing device includes a first spring and a second spring, further wherein the first spring and the second spring are configured coaxially, with the first spring surrounding the second spring.

17. The mounting bracket of claim 16, wherein the biasing device further includes a cylindrical spacer located interior to the second spring, the cylindrical spacer configured to limit compression of the first and second springs when the banner mounting assembly is in use.

18. The mounting bracket of claim 1, wherein the pivot base includes a slot configured to accept a hook and loop strap.

19. The mounting bracket of claim 1, wherein the pole holder includes an opening configured to accept a quick-release pin, the quick release pin connected to a lanyard and a ring.

20. The mounting bracket of claim 19, wherein the ring is configured to accept a tie which passes through a grommet of a banner.

* * * * *